United States Patent
Minikey, Jr. et al.

(10) Patent No.: US 8,339,526 B2
(45) Date of Patent: Dec. 25, 2012

(54) VEHICLE REARVIEW MIRROR ASSEMBLY INCLUDING A HIGH INTENSITY DISPLAY

(75) Inventors: Danny L. Minikey, Jr., Fenwick, MI (US); Mark W. Newton, Holland, MI (US); Ethan J. Lee, Byron Center, MI (US); William L. Tonar, Holland, MI (US); Darin D. Tuttle, Byron Center, MI (US); David J. Cammenga, Zeeland, MI (US); John S. Anderson, Holland, MI (US); John B. Ostreko, Hudsonville, MI (US); Christian M. Kemperman, Grand Haven, MI (US); David A. Blaker, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 45 days.

(21) Appl. No.: 11/684,366

(22) Filed: Mar. 9, 2007

(65) Prior Publication Data

US 2008/0068520 A1 Mar. 20, 2008

Related U.S. Application Data

(60) Provisional application No. 60/780,655, filed on Mar. 9, 2006, provisional application No. 60/804,351, filed on Jun. 9, 2006.

(51) Int. Cl.
*G02F 1/1335* (2006.01)
*B60R 1/12* (2006.01)
(52) U.S. Cl. .............. 349/11; 349/67; 362/247
(58) Field of Classification Search .......... 349/11, 349/57, 114, 67; 359/871, 599; 362/247
See application file for complete search history.

(56) References Cited

U.S. PATENT DOCUMENTS

| | | | |
|---|---|---|---|
| 4,109,235 A | 8/1978 | Bouthors |
| 4,214,266 A | 7/1980 | Myers |
| 4,257,703 A | 3/1981 | Goodrich |
| 4,277,804 A | 7/1981 | Robison |
| 4,310,851 A | 1/1982 | Pierrat |
| 4,638,287 A | 1/1987 | Umebayashi et al. |
| 4,665,430 A | 5/1987 | Hiroyasu |
| 4,692,798 A | 9/1987 | Seko et al. |
| 4,740,838 A | 4/1988 | Mase et al. |
| 4,910,591 A | 3/1990 | Petrossian et al. |
| 5,005,213 A | 4/1991 | Hanson et al. |
| 5,027,200 A | 6/1991 | Petrossian et al. |
| 5,121,200 A | 6/1992 | Choi et al. |

(Continued)

FOREIGN PATENT DOCUMENTS

JP 2002352611 A * 12/2002

(Continued)

*Primary Examiner* — Mark Consilvio
(74) *Attorney, Agent, or Firm* — Price Heneveld LLP; Scott P. Ryan

(57) ABSTRACT

An inventive rearview assembly for a vehicle may comprise a mirror element and a display including a light management subassembly. The subassembly may comprise an LCD placed behind a transflective layer of the mirror element. Despite a low transmittance through the transflective layer, the inventive display is capable of generating a viewable display image having an intensity of at least 250 cd/m$^2$ and up to 3500 cd/m$^2$. The display includes a novel backlighting subassembly and novel optical components including a magnifying system, a depolarizer, a reflector, and a reflective polarizer. The display may be configured to display an image having edges contoured to correspond to the edges of the mirror element.

55 Claims, 29 Drawing Sheets

U.S. PATENT DOCUMENTS

| | | | |
|---|---|---|---|
| 5,197,562 A | 3/1993 | Kakinami et al. | |
| 5,230,400 A | 7/1993 | Kakinami et al. | |
| 5,243,417 A | 9/1993 | Pollard | |
| 5,289,321 A | 2/1994 | Secor | |
| 5,296,924 A | 3/1994 | Blancard et al. | |
| 5,304,980 A | 4/1994 | Maekawa | |
| 5,386,285 A | 1/1995 | Asayama | |
| 5,408,357 A * | 4/1995 | Beukema | 359/493 |
| 5,414,461 A | 5/1995 | Kishi et al. | |
| 5,418,610 A | 5/1995 | Fischer | |
| 5,424,952 A | 6/1995 | Asayama | |
| 5,469,298 A | 11/1995 | Suman et al. | |
| 5,475,494 A | 12/1995 | Nishida et al. | |
| 5,483,453 A | 1/1996 | Uemura et al. | |
| 5,485,378 A | 1/1996 | Franke et al. | |
| 5,488,496 A | 1/1996 | Pine | |
| 5,515,448 A | 5/1996 | Nishitani | |
| 5,523,811 A | 6/1996 | Wada et al. | |
| 5,530,421 A | 6/1996 | Marshall et al. | |
| 5,535,144 A | 7/1996 | Kise | |
| 5,541,590 A | 7/1996 | Nishio | |
| 5,574,443 A | 11/1996 | Hsieh | |
| 5,576,975 A | 11/1996 | Sasaki et al. | |
| 5,602,542 A | 2/1997 | Widmann et al. | |
| 5,615,023 A | 3/1997 | Yang | |
| 5,617,085 A | 4/1997 | Tsutsumi et al. | |
| 5,634,709 A | 6/1997 | Iwama | |
| 5,642,238 A | 6/1997 | Sala | |
| 5,646,614 A | 7/1997 | Abersfelder et al. | |
| 5,650,765 A | 7/1997 | Park | |
| 5,670,935 A | 9/1997 | Schofield et al. | |
| 5,680,123 A | 10/1997 | Lee | |
| 5,708,410 A | 1/1998 | Blank et al. | |
| 5,708,857 A | 1/1998 | Ishibashi | |
| 5,729,194 A | 3/1998 | Spears et al. | |
| 5,745,050 A | 4/1998 | Nakagawa | |
| 5,751,211 A | 5/1998 | Shirai et al. | |
| 5,754,099 A | 5/1998 | Nishimura et al. | |
| 5,760,828 A | 6/1998 | Cortes | |
| 5,764,139 A | 6/1998 | Nojima et al. | |
| 5,767,793 A | 6/1998 | Agravante et al. | |
| 5,793,308 A | 8/1998 | Rosinski et al. | |
| 5,793,420 A | 8/1998 | Schmidt | |
| 5,844,505 A | 12/1998 | Van Ryzin | |
| 5,850,176 A | 12/1998 | Kinoshita et al. | |
| 5,883,739 A | 3/1999 | Ashihara et al. | |
| 5,904,729 A | 5/1999 | Ruzicka | |
| 5,940,011 A | 8/1999 | Agravante et al. | |
| 5,949,331 A | 9/1999 | Schofield et al. | |
| 5,956,079 A | 9/1999 | Ridgley | |
| 5,956,181 A | 9/1999 | Lin | |
| 5,959,555 A | 9/1999 | Furuta | |
| 6,009,359 A | 12/1999 | El-Hakim et al. | |
| 6,025,872 A | 2/2000 | Ozaki et al. | |
| 6,046,766 A | 4/2000 | Sakata | |
| 6,060,989 A | 5/2000 | Gehlot | |
| 6,061,002 A | 5/2000 | Weber et al. | |
| 6,067,111 A | 5/2000 | Hahn et al. | |
| 6,072,391 A | 6/2000 | Suzuki et al. | |
| 6,078,355 A | 6/2000 | Zengel | |
| 6,106,121 A | 8/2000 | Buckley et al. | |
| 6,111,498 A | 8/2000 | Jobes et al. | |
| 6,115,651 A | 9/2000 | Cruz | |
| 6,122,597 A | 9/2000 | Saneyoshi et al. | |
| 6,128,576 A | 10/2000 | Nishimoto et al. | |
| 6,151,065 A | 11/2000 | Steed et al. | |
| 6,151,539 A | 11/2000 | Bergholz et al. | |
| 6,154,149 A | 11/2000 | Tyckowski et al. | |
| 6,157,294 A | 12/2000 | Urai et al. | |
| 6,166,628 A | 12/2000 | Andreas | |
| 6,167,755 B1 | 1/2001 | Damson et al. | |
| 6,172,600 B1 | 1/2001 | Kakinami et al. | |
| 6,172,601 B1 | 1/2001 | Wada et al. | |
| 6,175,300 B1 | 1/2001 | Kendrick | |
| 6,184,781 B1 | 2/2001 | Ramakesavan | |
| 6,185,492 B1 | 2/2001 | Kagawa et al. | |
| 6,191,704 B1 | 2/2001 | Takenaga et al. | |
| 6,200,010 B1 | 3/2001 | Anders | |
| 6,218,934 B1 | 4/2001 | Regan | |
| 6,222,447 B1 | 4/2001 | Schofield et al. | |
| 6,249,214 B1 | 6/2001 | Kashiwazaki | |
| 6,250,766 B1 | 6/2001 | Strumolo et al. | |
| 6,259,475 B1 | 7/2001 | Ramachandran et al. | |
| 6,265,968 B1 | 7/2001 | Betzitza et al. | |
| 6,268,803 B1 | 7/2001 | Gunderson et al. | |
| 6,269,308 B1 | 7/2001 | Kodaka et al. | |
| 6,281,804 B1 | 8/2001 | Haller et al. | |
| 6,289,332 B2 | 9/2001 | Menig et al. | |
| 6,300,879 B1 | 10/2001 | Regan et al. | |
| 6,304,173 B2 | 10/2001 | Pala et al. | |
| 6,317,057 B1 | 11/2001 | Lee | |
| 6,320,612 B1 | 11/2001 | Young | |
| 6,324,295 B1 | 11/2001 | Valery et al. | |
| 6,330,511 B2 | 12/2001 | Ogura et al. | |
| 6,335,680 B1 | 1/2002 | Matsuoka | |
| 6,344,805 B1 | 2/2002 | Yasui et al. | |
| 6,348,858 B2 | 2/2002 | Weis et al. | |
| 6,356,206 B1 | 3/2002 | Takenaga et al. | |
| 6,357,883 B1 | 3/2002 | Strumolo et al. | |
| 6,363,326 B1 | 3/2002 | Scully | |
| 6,396,397 B1 | 5/2002 | Bos et al. | |
| 6,408,247 B1 | 6/2002 | Ichikawa et al. | |
| 6,412,959 B1 * | 7/2002 | Tseng | 359/839 |
| 6,415,230 B1 | 7/2002 | Maruko et al. | |
| 6,421,081 B1 | 7/2002 | Markus | |
| 6,424,272 B1 | 7/2002 | Gutta et al. | |
| 6,424,273 B1 | 7/2002 | Gutta et al. | |
| 6,424,892 B1 | 7/2002 | Matsuoka | |
| 6,428,172 B1 | 8/2002 | Hutzel et al. | |
| 6,433,680 B1 | 8/2002 | Ho | |
| 6,437,688 B1 | 8/2002 | Kobayashi | |
| 6,438,491 B1 | 8/2002 | Farmer | |
| 6,441,872 B1 | 8/2002 | Ho | |
| 6,447,128 B1 | 9/2002 | Lang et al. | |
| 6,452,533 B1 | 9/2002 | Yamabuchi et al. | |
| 6,463,369 B2 | 10/2002 | Sadano et al. | |
| 6,466,701 B1 | 10/2002 | Ejiri et al. | |
| 6,472,977 B1 | 10/2002 | Pöchmüller | |
| 6,473,001 B1 | 10/2002 | Blum | |
| 6,476,731 B1 | 11/2002 | Miki et al. | |
| 6,483,429 B1 | 11/2002 | Yasui et al. | |
| 6,483,438 B2 | 11/2002 | DeLine et al. | |
| 6,487,500 B2 | 11/2002 | Lemelson et al. | |
| 6,498,620 B2 | 12/2002 | Schofield et al. | |
| 6,501,387 B2 | 12/2002 | Skiver et al. | |
| 6,515,581 B1 | 2/2003 | Ho | |
| 6,515,597 B1 | 2/2003 | Wada et al. | |
| 6,520,667 B1 | 2/2003 | Mousseau | |
| 6,522,969 B2 | 2/2003 | Kannonji | |
| 6,542,085 B1 | 4/2003 | Yang | |
| 6,542,182 B1 | 4/2003 | Chutorash | |
| 6,545,598 B1 | 4/2003 | de Villeroche | |
| 6,572,233 B1 | 6/2003 | Northman et al. | |
| 6,575,643 B2 | 6/2003 | Takashashi | |
| 6,580,373 B1 | 6/2003 | Ohashi | |
| 6,581,007 B2 | 6/2003 | Hasegawa et al. | |
| 6,583,730 B2 | 6/2003 | Lang et al. | |
| 6,591,192 B2 | 7/2003 | Okamura et al. | |
| 6,594,583 B2 | 7/2003 | Ogura et al. | |
| 6,594,614 B2 | 7/2003 | Studt et al. | |
| 6,611,202 B2 | 8/2003 | Schofield et al. | |
| 6,611,227 B1 | 8/2003 | Nebiyeloul-Kifle | |
| 6,611,759 B2 | 8/2003 | Brosche | |
| 6,614,387 B1 | 9/2003 | Deadman | |
| 6,616,764 B2 | 9/2003 | Krämer et al. | |
| 6,618,672 B2 | 9/2003 | Sasaki et al. | |
| 6,630,888 B2 | 10/2003 | Lang et al. | |
| 6,636,258 B2 | 10/2003 | Strumolo | |
| 6,642,840 B2 | 11/2003 | Lang et al. | |
| 6,642,851 B2 | 11/2003 | Deline et al. | |
| 6,648,477 B2 | 11/2003 | Hutzel et al. | |
| 6,665,592 B2 | 12/2003 | Kodama | |
| 6,670,207 B1 | 12/2003 | Roberts | |
| 6,670,910 B2 | 12/2003 | Delcheccolo et al. | |
| 6,674,370 B2 | 1/2004 | Rodewald et al. | |
| 6,675,075 B1 | 1/2004 | Engelsberg et al. | |
| 6,683,539 B2 | 1/2004 | Trajkovic et al. | |

| | | |
|---|---|---|
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarthy et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjönell |
| 6,846,098 B2 * | 1/2005 | Bourdelais et al. ............ 362/330 |
| 6,847,487 B2 | 1/2005 | Burgner |
| 6,930,737 B2 | 8/2005 | Weindorf et al. |
| 7,046,448 B2 | 5/2006 | Burgner |
| 7,292,208 B1 * | 11/2007 | Park et al. .......................... 345/8 |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0044065 A1 * | 4/2002 | Quist et al. ................. 340/815.4 |
| 2002/0191127 A1 * | 12/2002 | Roberts et al. .................. 349/61 |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 * | 6/2004 | Homma et al. .................. 345/82 |
| 2004/0202001 A1 | 10/2004 | Roberts et al. |
| 2005/0140855 A1 | 6/2005 | Utsumi |
| 2005/0237440 A1 * | 10/2005 | Sugimura et al. ............... 349/13 |
| 2006/0007550 A1 | 1/2006 | Tonar et al. |
| 2006/0139953 A1 * | 6/2006 | Chou et al. .................... 362/613 |
| 2006/0158899 A1 * | 7/2006 | Ayabe et al. .................. 362/602 |
| 2007/0171037 A1 | 7/2007 | Schofield et al. |
| 2009/0015736 A1 * | 1/2009 | Weller et al. .................... 349/11 |
| 2009/0141516 A1 * | 6/2009 | Wu et al. ....................... 362/609 |

FOREIGN PATENT DOCUMENTS

| | | | |
|---|---|---|---|
| JP | 2005148119 A | * | 6/2005 |
| JP | 2005-189569 | | 7/2005 |
| JP | 2005327600 A | * | 11/2005 |
| KR | 2004-98051 | | 11/2004 |
| KR | 2005-45816 | | 5/2005 |

* cited by examiner

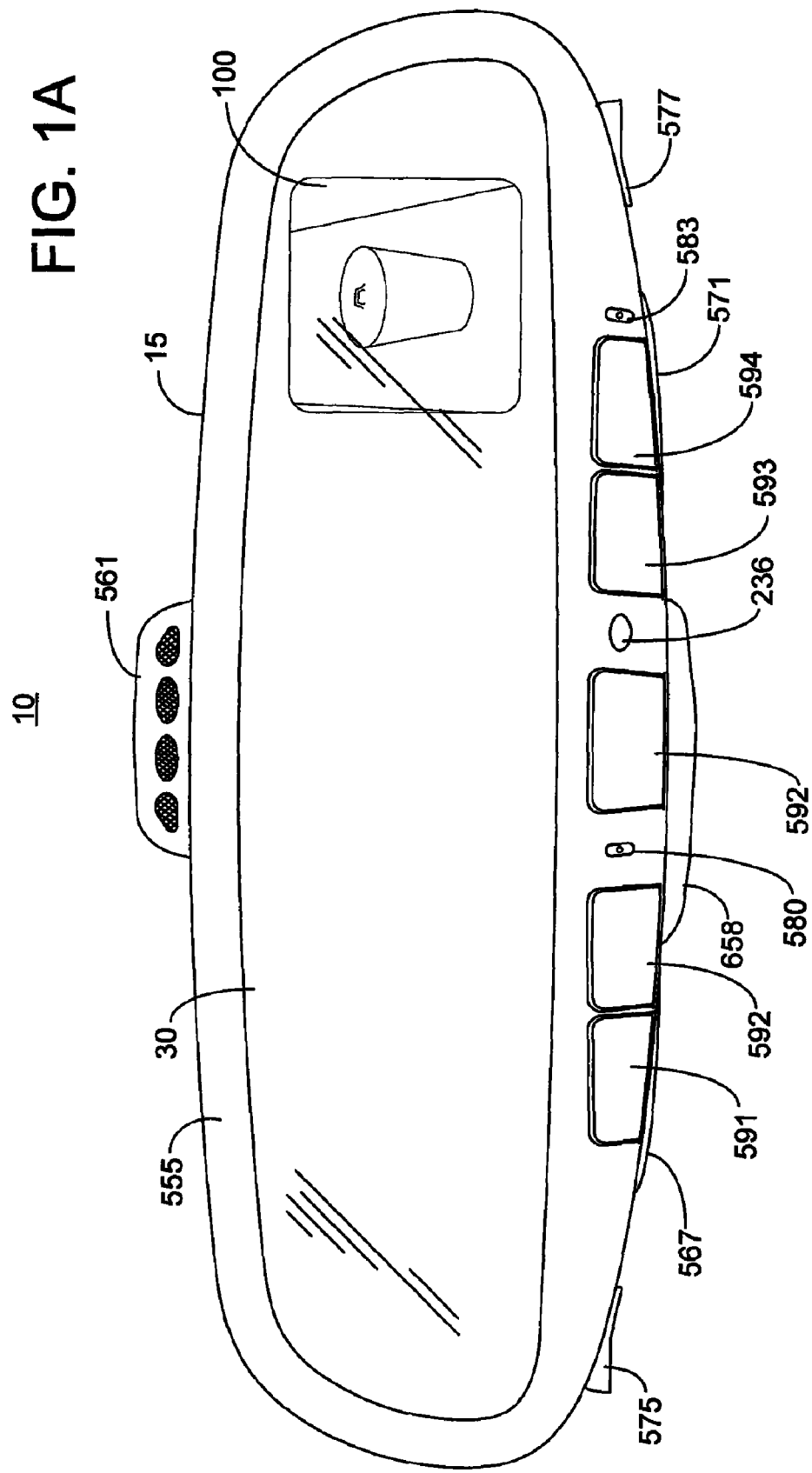

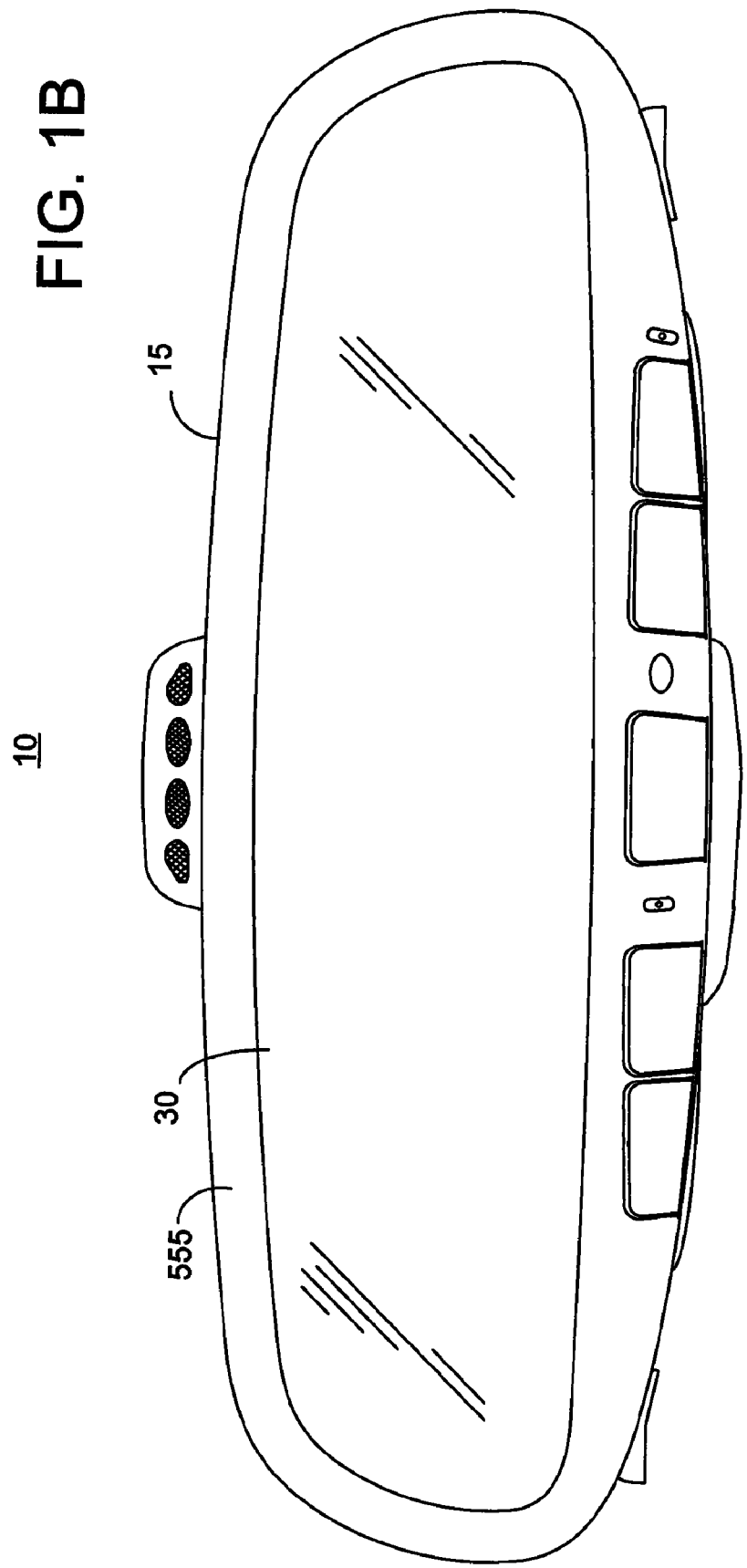

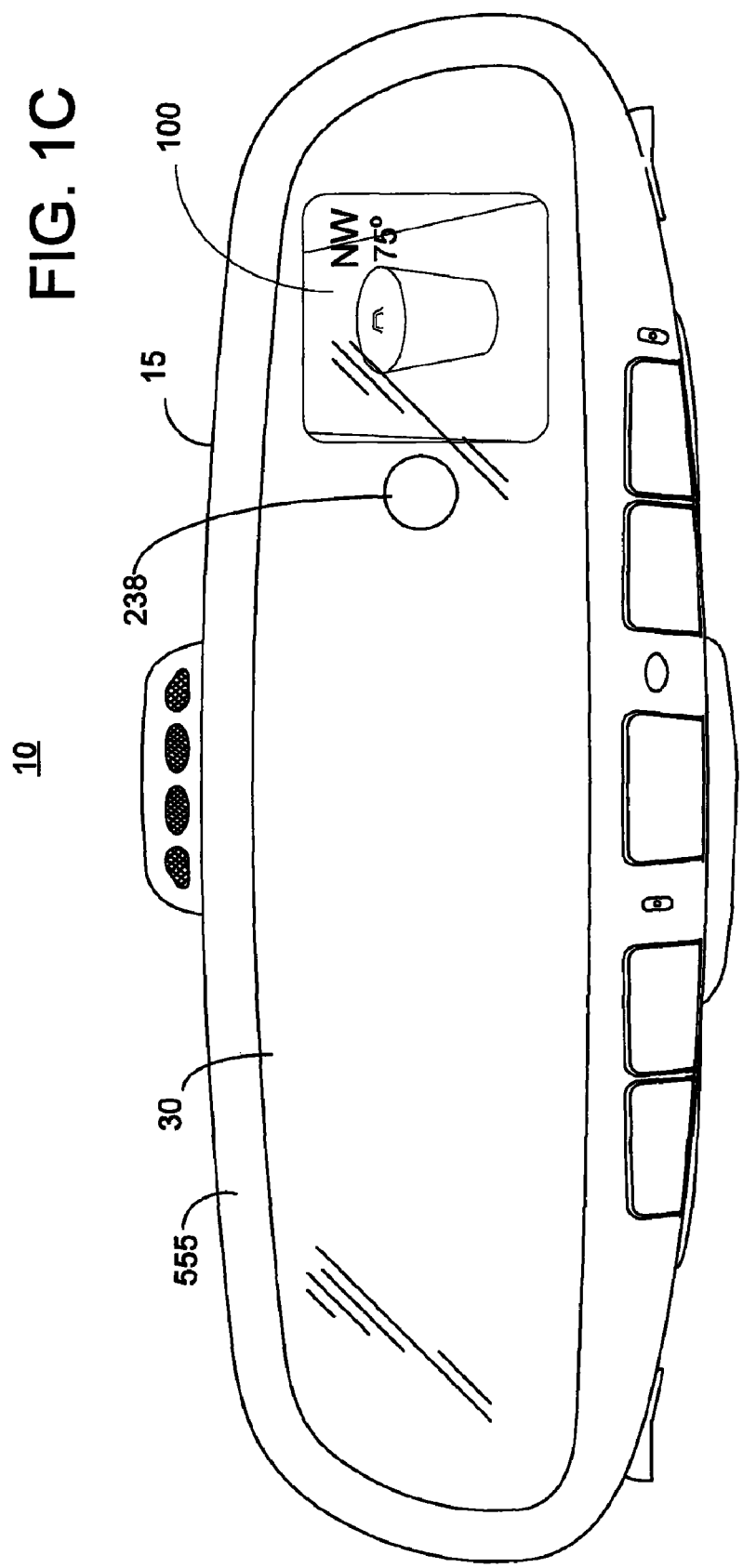

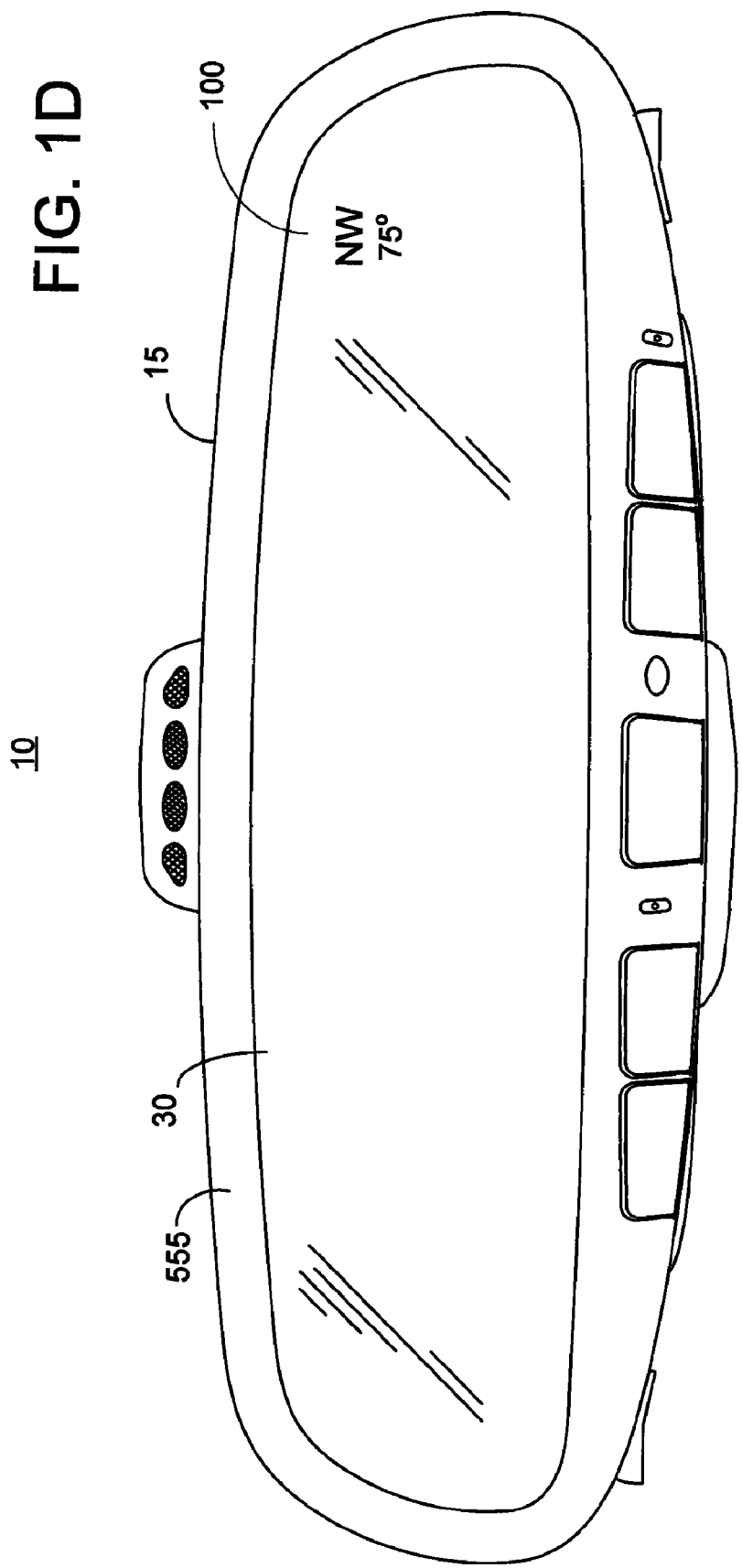

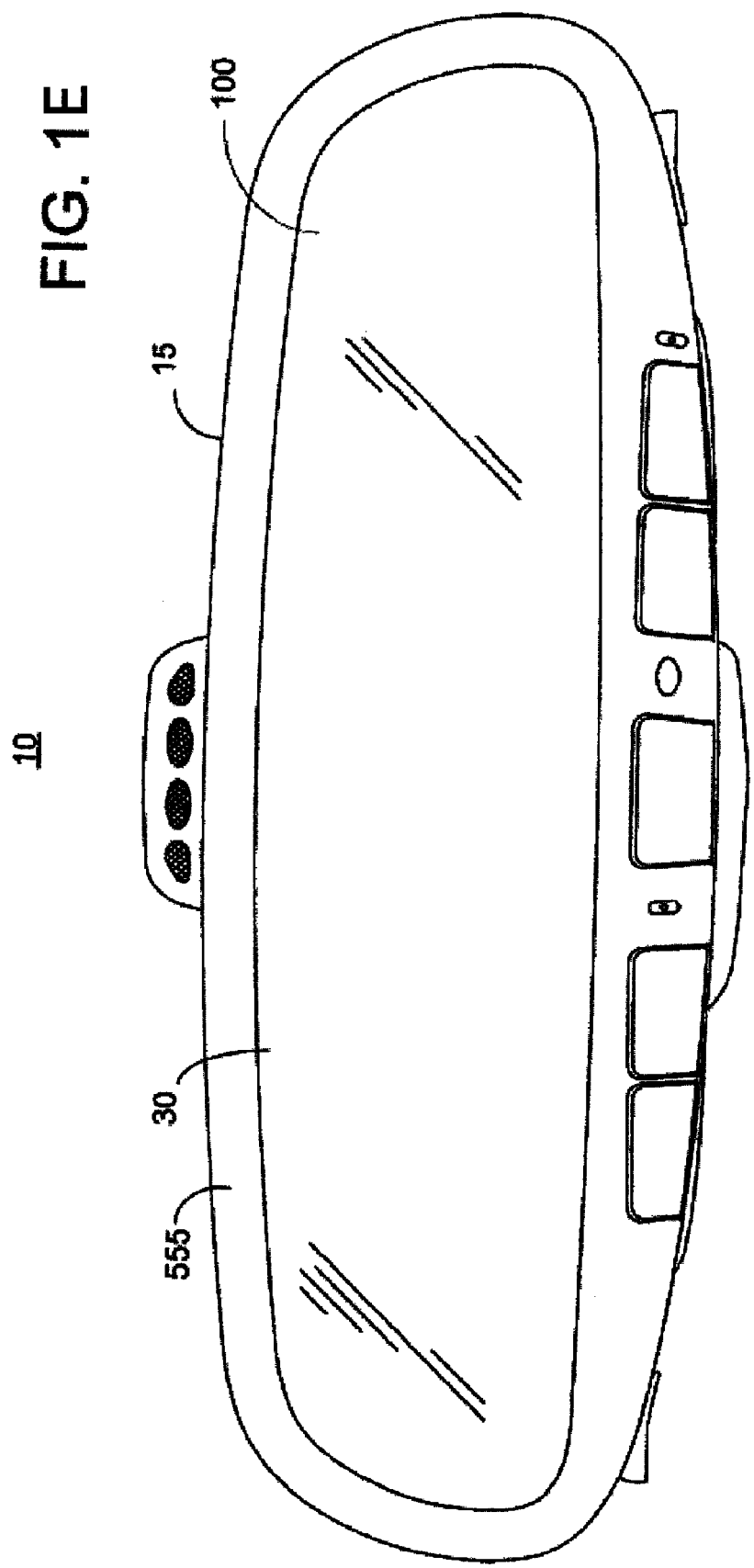

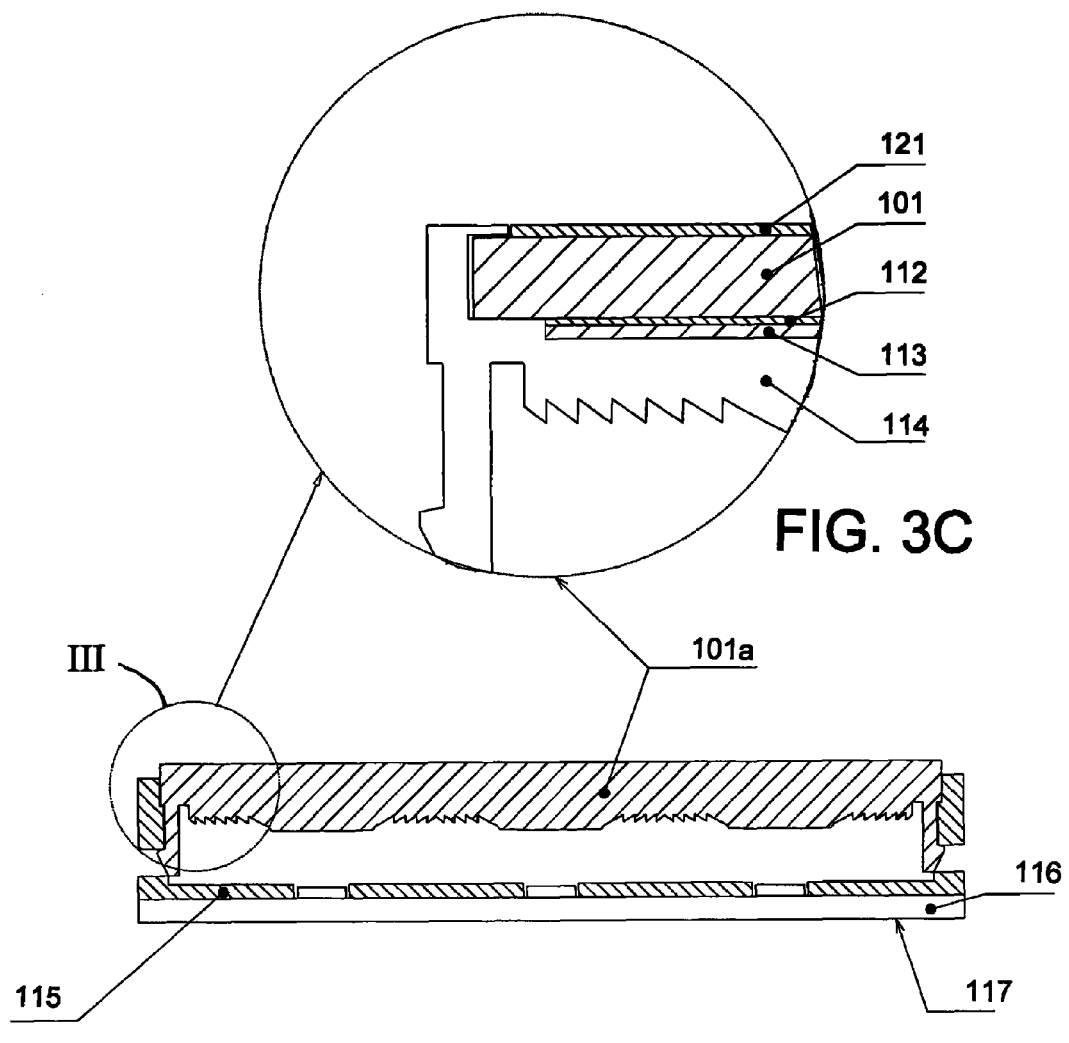

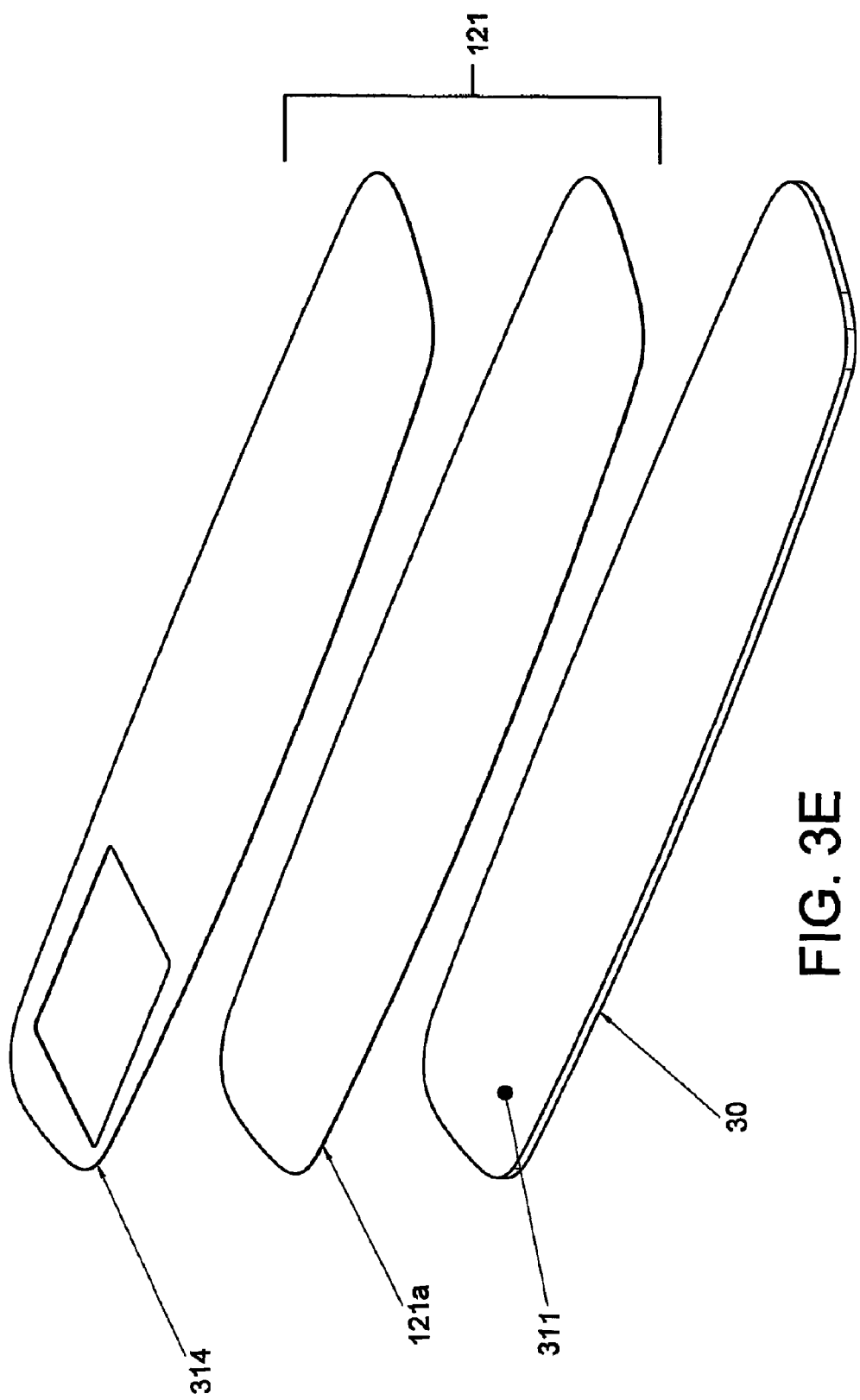

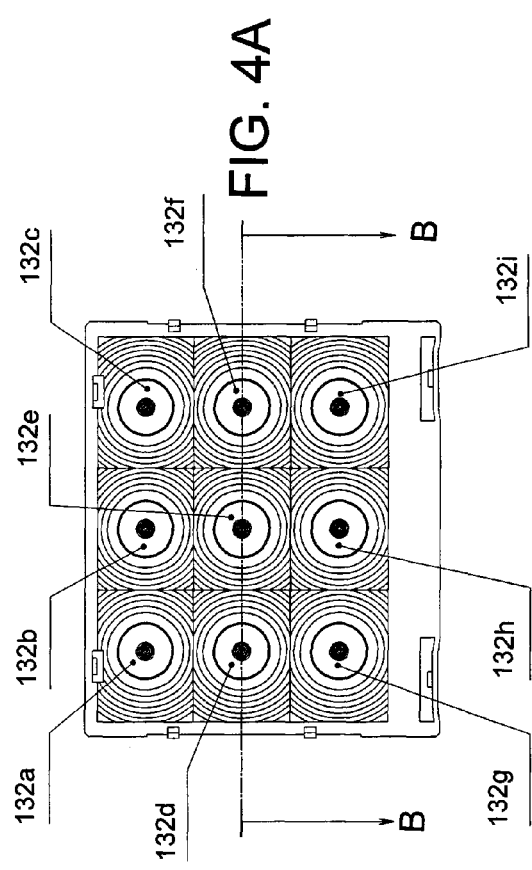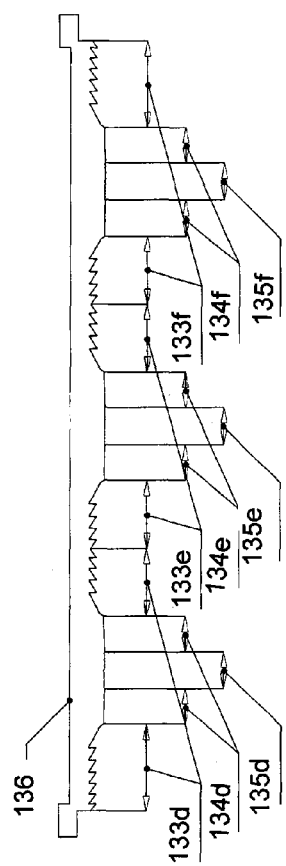
FIG. 4A
FIG. 4B

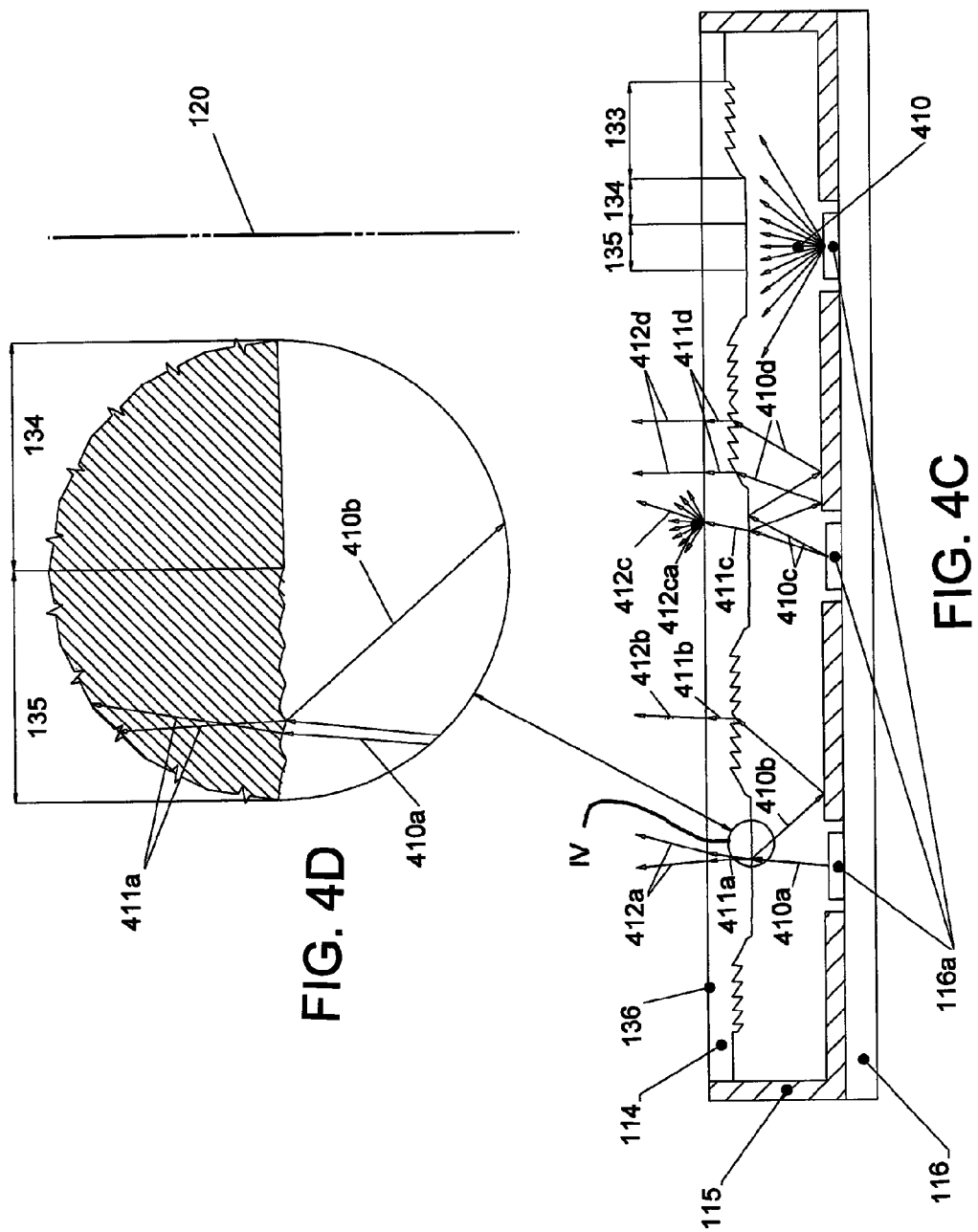

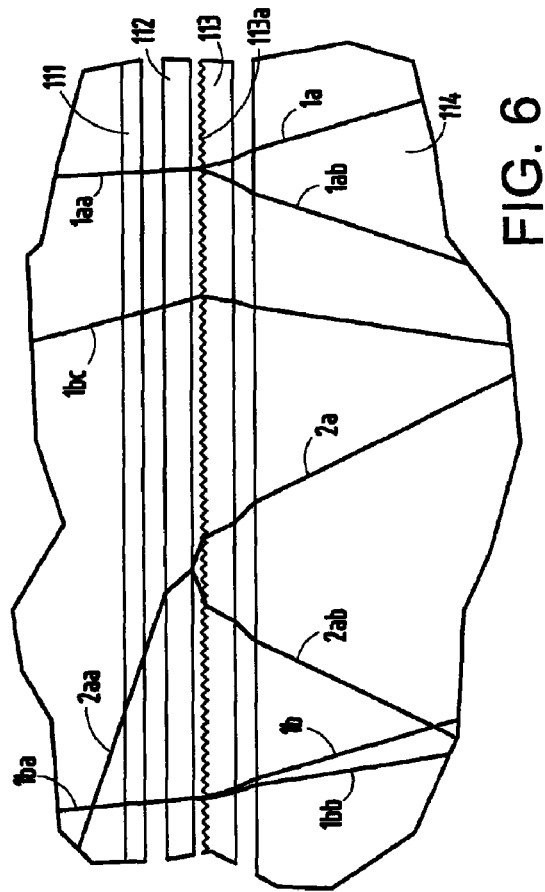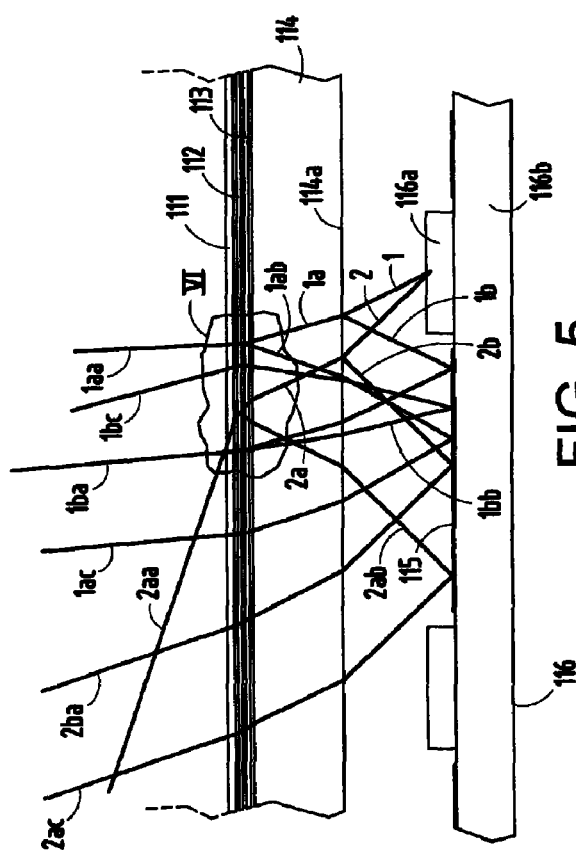

VEHICLE REARVIEW MIRROR ASSEMBLY INCLUDING A HIGH INTENSITY DISPLAY

CROSS-REFERENCE TO RELATED APPLICATIONS

This application claims priority under 35 U.S.C. §119(e) to both U.S. Provisional Application No. 60/780,655 filed on Mar. 9, 2006 and U.S. Provisional Application No. 60/804,351 filed on Jun. 9, 2006. The entire disclosures of each of these applications are incorporated herein by reference.

BACKGROUND OF THE INVENTION

The present invention generally relates to vehicle rearview assemblies and vehicle displays. More particularly, the present invention relates to vehicle rearview assemblies including a transflective (i.e., partially reflective, partially transmissive) mirror element and a high intensity display.

One vehicle accessory that has recently become popular is a back-up assist display which provides a video image to the driver of a scene to the rear of the vehicle where the driver's view may otherwise be obstructed. Sport utility vehicles and trucks have larger areas that are obstructed, and thus particularly benefit from this feature. This feature is a significant safety feature insofar as it helps to eliminate the possibility that someone may back-up over a child or pet playing behind the vehicle or otherwise back-up over an object left behind the vehicle.

In those vehicles that offer this option, the display is typically provided in the instrument panel. More particularly, the display is often provided in the same display that otherwise provides navigation and other information. This enables a single liquid crystal display (LCD) to be utilized in the instrument panel for multiple purposes. Such back-up displays are only activated, and thus viewable, when a driver places the vehicle in reverse. There, it is not practical or economical to provide a large LCD display in the instrument panel that is solely used for the purpose of a back-up display. Another problem associated with placing a back-up assist display in the instrument panel, is that a driver typically looks in the rearview mirror while backing up and not at the instrument panel. In any event, it is difficult to look at both the rearview mirror and the display in the instrument panel at the same time.

Accordingly, it has been proposed to place the back-up assist display in the rearview mirror assembly such that the driver may readily view the images provided by the mirror element and the back-up assist display at the same time. The provision of a video display in a rearview assembly for providing images of a scene to the rear of a vehicle has been disclosed in commonly assigned U.S. Pat. No. 6,550,949 and U.S. Patent Application Publication No. 2003/0103141 A1. Although it has been proposed to incorporate such video displays in a rearview mirror assembly, such proposals have not been adopted by the auto industry for several reasons.

In such proposals, it has been proposed to remove the reflective layer of the mirror element in the region in front of the LCD video display in order to enable an image of sufficient brightness to be displayed to a driver during high ambient conditions such as daytime. However, this leaves a large area of the mirror surface without a reflective layer such that when the mirror element is being used in the conventional sense, it appears much smaller to the driver. Thus, another proposal is to place the display behind what is known as a "transflective" layer provided on a mirror element. A "transflective" layer is a mirror layer that is partially reflective and partially transmissive generally across the entire visible spectrum so as to enable the full color display to be fully visible by the driver. While this latter proposal is very advantageous in that the mirror appears as a normal mirror when the display is not utilized, a difficulty arises insofar as commercially available automotive grade LCD displays are not bright enough to provide a sufficiently bright image to the driver of the vehicle. This is because a significant percentage of the light emitted from the display is attenuated by the transflective layer. A further problem results in that the transflective layer reflects a high percentage of the ambient light striking the mirror from the rear of the vehicle, and such reflected ambient light tends to wash out the image from the LCD display. This results in the display not having sufficient contrast ratio for the driver to pick out possible obstructions to the rear of the vehicle.

To be utilized as a video display in a rearview mirror assembly, an LCD display must be "automotive grade" and generally should provide a high contrast image of greater than 400 candelas per square meter ($cd/m^2$). It should be noted that navigational LCD displays generally have light outputs of 500 $cd/m^2$. Again, however, given that an interior rearview mirror assembly is typically required to have a reflectance of at least 60 percent, a transflective mirror would normally have a transmission of 20 percent, meaning that the placement a conventional LCD display having an output of 500 $cd/m^2$ would only produce a light output of 100 $cd/m^2$ at most when placed behind the transflective mirror element. This is unacceptable given the additional problem of the decreased contrast ratio resulting from providing a mirrored surfaced in front of the LCD display.

It should further be noted that not all LCD displays are "automotive grade." To be "automotive grade" means that the LCD display must be designed to operate in an automotive environment. Such displays are ruggedized and have a high tolerance for shock and vibration, wide operating and storage temperature ranges, high radiated emissions susceptibility, and high brightness. Typical specifications for "automotive grade" displays are:
  a. Operating Temperature Range −35° C. to +85° C.
  b. Storage Temperature Range −40° C. to 95° C.

SUMMARY OF THE INVENTION

According to one embodiment of the present invention, a rearview assembly for a vehicle is provided that comprises: a mirror element having a partially reflective, partially transmissive coating; a video display positioned behind the mirror element such that a display image is viewable through the partially reflective, partially transmissive coating, the video display having an output intensity such that the viewable display image has an intensity of at least 250 $cd/m^2$.

According to another embodiment of the present invention, a rearview assembly for a vehicle is provided that comprises: a housing; and a video display positioned in the housing, the video display including a magnifying system for magnifying the size of a display image viewable to a vehicle occupant.

According to another embodiment of the present invention, a rearview assembly for a vehicle is provided that comprises: a housing having an opening with curved edges; and a video display positioned in the housing, the video display generating a display image that extends along and abuts at least a portion of the curved edges of the housing.

According to another embodiment of the present invention, a display is provided that comprises: a display device for generating a polarized display image; a depolarizing device positioned in front of the display device to depolarize the polarized display image to thereby eliminate the effect of losing the displayed image when being viewed by an observer viewing through a polarized viewing window.

According to another embodiment of the present invention, a rearview assembly for a vehicle is provided that comprises: a housing; a video display positioned in the housing for generating a polarized display image; and a depolarizing device positioned in front of the video display for depolarizing the polarized display image.

According to another embodiment of the present invention, a liquid crystal display is provided that comprises: a first substrate having a front surface and a rear surface; a second substrate having a front surface and a rear surface, the front surface of the second substrate and the rear surface of the first substrate being juxtaposed in spaced relation; a liquid crystalline material disposed between the first and second substrates; and a specularly reflective coating applied to a surface of the first substrate.

According to another embodiment of the present invention, a rearview assembly for a vehicle is provided that comprises: a housing; and an integrated mirror element and liquid crystal display disposed in the housing. The integrated mirror element and liquid crystal display comprises: a first substrate having a front surface and a rear surface; a second substrate having a front surface and a rear surface, the front surface of the second substrate and the rear surface of the first substrate being juxtaposed in spaced relation; a third substrate having a front surface and a rear surface, the front surface of the third substrate and the rear surface of the first substrate being juxtaposed in spaced relation; a liquid crystalline material disposed between the first and second substrates; an electrochromic medium disposed between the first and third substrates; and a specularly reflective coating applied to a surface of the second substrate.

According to another embodiment of the present invention, a rearview assembly for a vehicle is provided that comprises: a housing; a rearview element disposed in the housing; a forward facing light sensor for sensing a first light level forward of the vehicle; a rearward facing light sensor for sensing a second light level to the rear of the vehicle; a control circuit for comparing the first and second light levels and generating an warning signal when the second light level exceeds the first light level by at least threshold amount.

According to another embodiment of the present invention, a liquid crystal display is provided that comprises: a liquid crystal display device; and a backlight subassembly for back lighting the liquid crystal display device. The backlight subassembly comprises: a plurality of light emitting diode devices disposed on a substrate; a diffuser spaced from the plurality of light emitting diode devices such that light from the plurality of light emitting diode devices is refracted through the diffuser and reflected back towards the substrate; and a reflector provided over the substrate and around and between the plurality of light emitting diode devices so as to receive light reflected back from the diffuser and to reflect that light back towards the diffuser.

BRIEF DESCRIPTION OF THE DRAWINGS

In the drawings:

FIG. 1A is an elevational view of the front of a rearview assembly constructed according to an embodiment of the present invention with the rear vision display turned on and the compass display turned off;

FIG. 1B is an elevational view of the front of a rearview assembly constructed according to an embodiment of the present invention with the entire display turned off;

FIG. 1C is an elevational view of the front of a rearview assembly constructed according to an embodiment of the present invention with the rear vision display turned on and the compass display turned on;

FIG. 1D is an elevational view of the front of a rearview assembly constructed according to an embodiment of the present invention with the rear vision display turned off and the compass display turned on;

FIG. 1E is an elevation view of the front of a rearview assembly constructed according to an embodiment of the present invention with the rear vision display that employs the entire surface of the mirror reflective area using a curved or non-rectangular shaped display;

FIG. 3B is a sectional view of a light management subassembly 101a shown in FIG. 3A;

FIG. 3C is an enlarged sectional view of area III shown in FIG. 3B;

FIG. 3E is an exploded isometric view of a portion of a subassembly of a rearview assembly constructed in accordance with another embodiment of the present invention;

FIG. 4A is a rear view of a diffuser optical block 114 for use in the subassembly shown in FIG. 3A;

FIG. 4B is a cross-sectional view of the diffuser optical block 114 taken along line B-B in FIG. 4A;

FIG. 4C is a section view of a light ray tracing for the diffuser optical block shown in FIG. 3B;

FIG. 4D is an enlarged section view of area IV of the light ray tracing of FIG. 4C;

FIG. 5 is an elevational side view of a portion of a display device 100 for use in the subassembly shown in FIG. 3A;

FIG. 6 is an enlarged elevational side view of a portion of a display device 100 corresponding to area VI shown in FIG. 5;

DETAILED DESCRIPTION OF THE PREFERRED EMBODIMENTS

Figure 2:
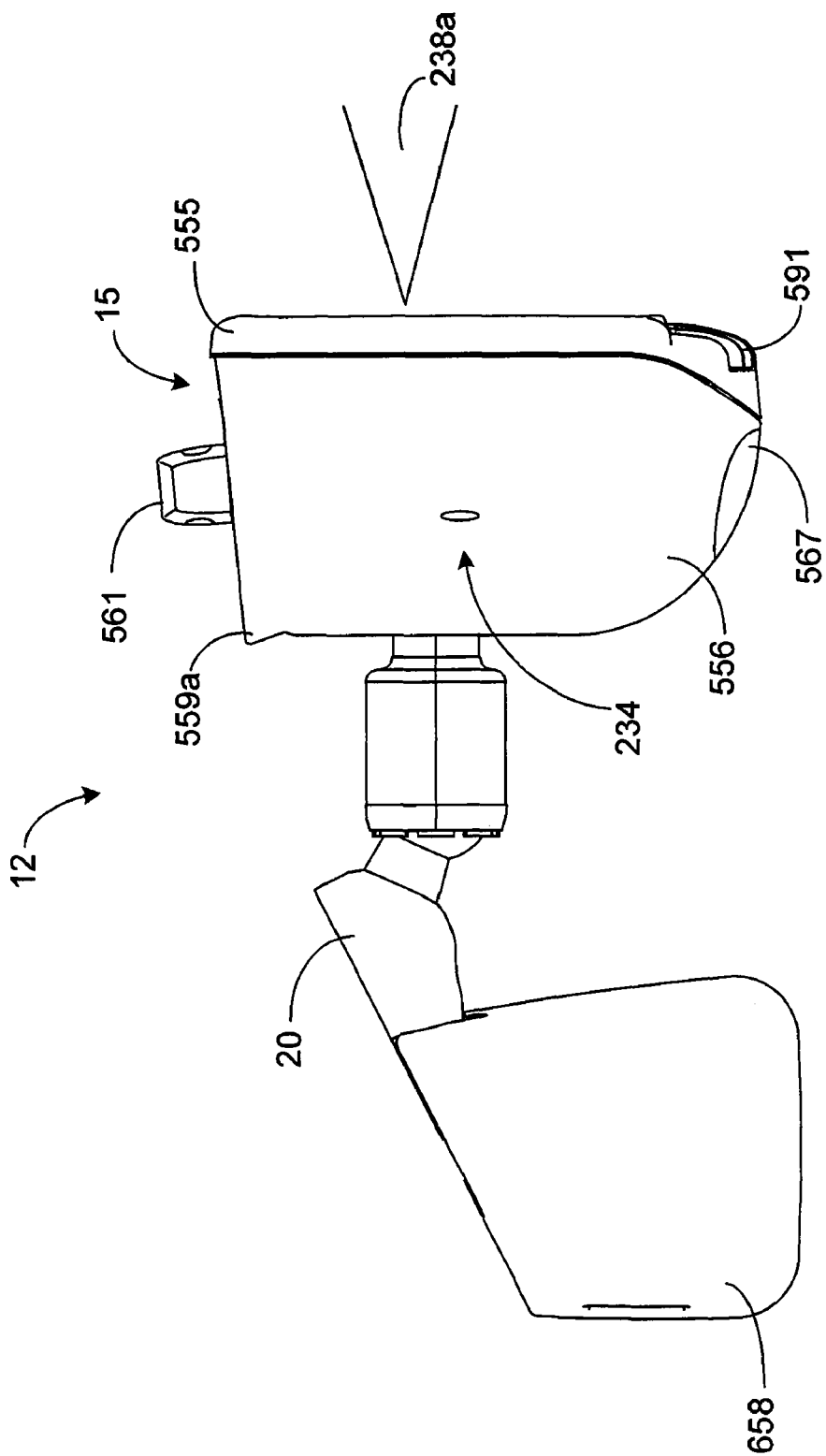
FIG. 2 is an elevational view of a side of the rearview assembly shown in FIGS. 1A-1D.

As discussed above, the present invention generally relates to vehicle rearview assemblies and vehicle displays. FIGS. 1A-1E and FIG. 2 show an example of a rearview assembly 10, which generally includes a mounting structure 12 including a housing 15 and a mount 20 for mounting the housing to the vehicle. In FIG. 2, the mount is shown as being the type of mount to use the rearview assembly 10 to a vehicle windshield, however, it will be appreciated that mount 20 may be of the type that mounts the rearview assembly 10 to the roof, headliner, or overhead console of a vehicle. Rearview assembly 10 may include various other components and features as will be discussed further below.

Rearview assembly 10 further includes a mirror element 30 and a display device 100 positioned within housing 15 and behind mirror element 30. Display device 100 may be positioned anywhere behind mirror element 30 and may be of any shape or size and may constitute all or a portion of the area of the mirror element 30.

When used as an inside rearview mirror, mirror element 30 preferably exhibits a high end reflectance of at least about 60 percent while also exhibiting a transmittance of at least 5 percent in at least the area in front of display device 100. As described further below, mirror element 30 is preferably an electrochromic element. Nevertheless, mirror element 30 could be a prismatic mirror element as commonly used in the automotive industry.

Display device 100 is preferably a liquid crystal display (LCD) that, together with mirror element 30, is configured to provide a luminosity when viewed through mirror element 30 of at least about 250 cd/m$^2$, more preferably of at least about 400 cd/m$^2$, more preferably of at least about 500 cd/m$^2$, more preferably of at least about 600 cd/m$^2$, more preferably of at least about 750 cd/m$^2$, more preferably of at least about 1000 cd/m$^2$, more preferably of at least about 1500 cd/m$^2$, more preferably of at least about 2750 cd/m$^2$, and even more preferably at least about 3500 cd/m$^2$. Further, display device 100 should be automotive grade.

As mentioned above, commercially available LCDs that are automotive grade, do not have sufficient luminosity to be utilized behind a mirror element of the type described above and as described in further detail below. Accordingly, a novel LCD 100 has been constructed for this purpose. An example of an LCD 100 suitable for use behind such mirror element 30 is shown in FIG. 3A and described further below.

Figure 3A:
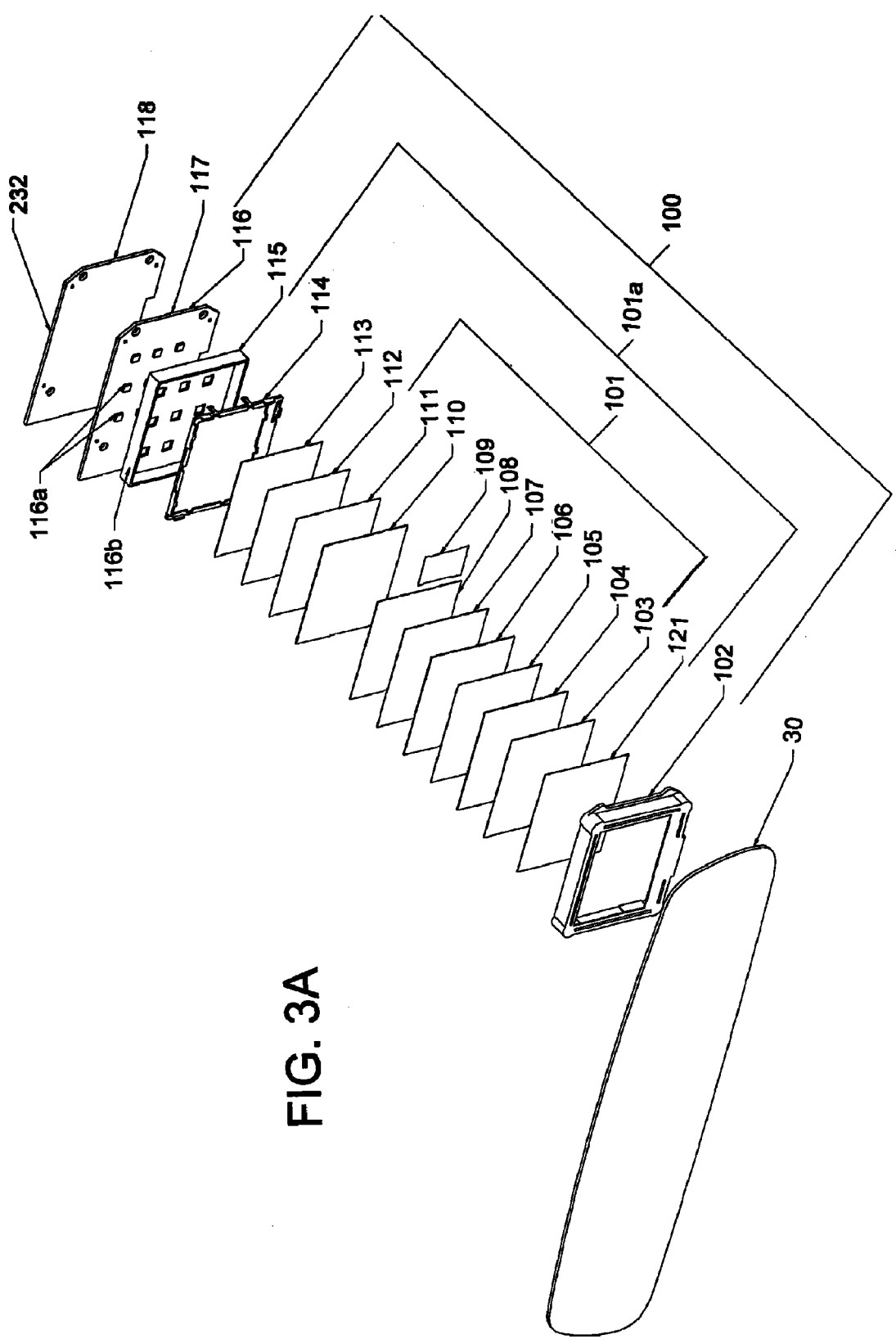
FIG. 3A is an exploded isometric view of a first embodiment of a subassembly that may be used in the rearview assembly shown in FIGS. 1A-1D wherein the subassembly includes a mirror element and a display.

As shown in FIG. 3A, display device 100 is positioned within a frame 102. Display device 100 may be a liquid crystal display including at least one or all of the following liquid crystal display components provided in order from the back of mirror element 30 (if provided): a first polarizing film 103, a first glass layer 104, a first alignment film 105, a liquid crystal material 106, a second alignment film 107, a thin-film transistor film 108, a flex cable assembly 109, a second glass layer 110, a second polarizing film 111, a first optical film 112, a second optical film 113, a diffuser 114, a reflector 115, a backlight 116, a first video electronic circuit subassembly 117, a second video electronic circuit subassembly 118, and a depolarizing device 121. Each of these components will be discussed in further detail below.

Frame 102 is designed to capture and contain the core components of display device 100. Frame 102 can be manufactured from aluminum or other metal stamping, thermal plastic molded materials, thermoset molded materials, ceramic materials, or rubber materials.

First polarizing film 103 is provided on an outer surface of first glass layer 104. First polarizing film 103 preferably has viewing angle compensation to allow for the widest possible viewing angle of active matrix video displays and may have a high transmittance of greater than about 40 percent. First polarizing film 103 may have a polarizing efficiency of at least about 99.95 percent, a thickness of 200 μm or less with an added function of high grade anti-glare, and a haze of 10 percent or less. A suitable commercially available polarizing film is Part No. NWF-SEG-142AG30G available from Nitto Denko, or an equivalent.

First glass layer 104 may have a minimum thickness of 0.3 mm with the side furthest from mirror element 30, coated with an indium tin oxide (ITO) transparent conductive coating that is patterned to form the individual pixels of the active matrix display and to act as an electrode.

First alignment film 105 is preferably a polymer material film with a series of parallel microscopic grooves which function to align liquid crystal molecules in a preferred direction.

Liquid crystal material 106 is preferably a twisted nematic liquid crystalline material having elongated shaped molecules in which the long axis of the molecules will align in a long range orientation order when electrically energized between the layers 104 and 110 of conductive glass.

Second alignment film 107 is preferably similar to first alignment film 105 and thus may be made of a polymer material film with a series of parallel microscopic grooves that function to align the liquid crystal molecules in a preferred direction.

Thin-film transistor film 108 is preferably a polymer material film with a transistor located at each pixel intersection to act as an electrode in a structure defined as staggered amorphous-silicon (a-Si). Thin-film transistor film 108 is preferably designed to reduce cross-talk between pixels and to improve image stability.

Flex cable 109 is preferably a flexible cable assembly with an included chip-on-flex LCD driver circuit to energize the active matrix display with a conventional interface connection.

Second glass layer 110 may have a minimum thickness of 0.3 mm with the side closest to mirror element 30 coated with an ITO transparent conductive coating patterned to form the individual pixels of the active matrix display and to act as an electrode.

Second polarizing film 111 may have viewing angle compensation to allow for the widest possible viewing angle available for active matrix video displays. Second polarizing film 111 may also have a high transmittance of greater than about 40 percent and a polarizing efficiency of about 99.95 percent in a thickness of 200 µm or less. A suitable commercially available polarizing film is Part No. NWF-SEG-1425 available from Nitto Denko, or an equivalent.

Components 103-111 of display device 100 are designated together as a subassembly 101. A suitable commercially available subassembly 101 that may be purchased as a single part is available from Optrex, as Part No. T-51981GD024H-T-ABN.

First optical film 112 is preferably a thin film reflective polarizer made of a combination of acrylic and polyester that employs the principle of polarization recycling to increase the on-axis brightness of display 100. Such polarization recycling may be achieved by reflecting non-polarized light continuously away from the viewer until it is correctly polarized prior to allowing the light to enter the viewing cone exiting toward the viewer. This film is preferably a minimum thickness 130 µm brightness enhancement film. This optical film may be implemented using Part No. DBEF-E45 Degree available from 3M Corporation, or its functional equivalent.

Second optical film 113 is also preferably a brightness enhancement film made of a combination of acrylic and polyester. Second optical film 113 preferably employs the principles of refraction and reflection to increase the on-axis brightness of display 100. More specifically, second optical film 113 increases the on-axis brightness by refracting light within the viewing cone toward the viewer and reflecting light outside the viewing cone, using total internal reflecting (TIR) optics, away from the viewer so that the reflected light may be recycled until it enters the viewing cone exiting toward the viewer. This film preferably has a minimum of 254 µm thickness with a prism angle of 90° typical and a prism pitch of 24 µm typical. Part No. BEF III-10T available from 3M Corporation or its equivalent, provides a suitable commercially available optical film 113.

Diffuser 114 may be an optic block made of thermal plastic materials or rubber materials and contain a diffusant material designed to widen and make more uniform the lighting emitted by backlight 116. An example of a suitable diffuser 114 is described further below with reference to FIG. 4A.

Reflector 115 is preferably a molded plastic that is vacuum metallized and acts as a reflector of light that is recycled from first and second optical films 112 and 113 and from diffuser lens 114. Reflector 115 may also act as a means of attaching light management subassembly 101a to backlight 116. Reflector 115 can also be comprised of a brightness enhancement film made of a non-metallic polymer that is a minimum of 65 µm in thickness and acts as a reflector of light that is recycled from first and second optical films 112 and 113 and from diffuser lens 114. Reflector 115 may be implemented using 3M Corporation's Enhanced Specular Reflector, or its equivalent.

Backlight 116 preferably comprises a plurality of light sources 116a (FIG. 5), which are preferably up to nine light sources. Such light sources are preferably light emitting diodes (LEDs), particularly white-light emitting LEDs such as Part No. NFSW036BT available from Nichia Rigel LED, or an equivalent LED available from Osram, Cree, Lumileds, or other manufacturers. Such LEDs are preferably high powered white light emitting LEDs capable of drawing a current of 90 mA or more. Although nine LEDs are disclosed as being preferred relative to a display having a 2.4 inch backlight, any number or arrangement of LEDs may be utilized.

Video electronic circuit assemblies 117 and 118 preferably contain the video driver circuitry designed to interface between a camera (or other source of video signals) and the active matrix video display. Such circuitry is described further below with reference to FIG. 9

Depolarizing device 121 is preferably made of a material exhibiting a transmission level of at least 88 percent and optical properties such that it depolarizes light exiting polarizing film 103. The purpose of the depolarizing device is to eliminate the effect of losing the displayed image from the display device when being viewed by an observer viewing through a polarized viewing window, such as polarized sun glasses. When an injection molded material such as polycarbonate is used, stresses in the material from molding create undesired birefringence rings when the image is viewed by an observer through a polarized viewing window. The preferred depolarizing device consists of a quarter wave plate comprised of an industry standard optical film, a polymer film, or a layer of coatings on the fourth surface of a mirror element. If an optical film is used it should be an orientated birefringent clear polymer film. During the manufacturing of the film, it is stretched to achieve the required thickness. Through the stretching of the film, the polymers are orientated in such a way that the optical properties of the film are similar to that of a quarter wave plate. The ideal orientation of the quarter wave plate to the LCD polarizing film is 45 degrees with respect to an axis normal to the glass. When the image is viewed by an observer through a polarized viewing window using the quarter wave plate depolarizing device 121, the polarized viewing window can be rotated 360 around an axis normal to the glass without the loss of the image or the creation of birefringence rings. In a preferred form, a quarter wave plate is also used as a device to mask the opening for the LCD through either laminating to a second opaque film, or by being either printed or painted with an opaque ink or paint.

Depolarizing device 121 is preferably comprised of an orientated birefringent clear polymer film 121a, such as Flexcon Polyester M400, and an opaque film 314', such as 3M Black Vinyl, which is laminated to film 121a using an adhesive such as Flexcon clear V-29. The subassembly of films forming depolarizer device 121 as shown, is then applied to the fourth surface 311 of mirror element 30, as shown in FIG. 3E.

An example of a diffuser 114 is shown in FIG. 4A. As illustrated, the diffuser includes one optic 132a-132i for each of the light sources. Each optic 132a-132i preferably comprises a textured surface 136, center deviator surface 135, a planar surface 134 and a refracting portion 133 working in conjunction with reflector 115. The diffuser 114 may be constructed in a manner similar to that disclosed in U.S. Published Application Publication No. 2004/0202001 A1, the entire disclosure of which is hereby incorporated by reference.

With reference to FIG. 3A, 3B, and 3C there is shown an embodiment of a rearview mirror assembly comprising a display device subassembly 100 containing light management subassembly 101a. Light management subassembly 101a includes diffuser 114, optical film 113, optical film 112, subassembly 101 and depolarizing device 121. It should be understood that optical film 113 is placed into a depression in diffuser 114 and optical film 112 is placed on top of optical film 113 in the same depression of diffuser 114. Subassembly 101 is snapped into diffuser 114 capturing films 112 and 113 such that they cannot be removed from subassembly 101a. Depolarizing device 121 is attached to subassembly 101 or diffuser 114 through the use of snaps or an adhesive attachment method. A suitable commercially available subassembly 101a that may be purchased as a single part is available from Optrex as Part No. 30014AA.

Also with reference to FIG. 3B there is shown an embodiment of a display device comprising a two-sided printed circuit board with video electronic circuit 117 integrated with backlight board 116. The two-sided printed circuit board comprises a combination of video drive electronics, first through ninth light sources and a means for attaching a reflector or lens to the subassembly, such as compliant pins. The two-sided printed circuit board subassembly reduces the amount of space required to incorporate display device 100 into a rearview mirror assembly.

Figure 3D:
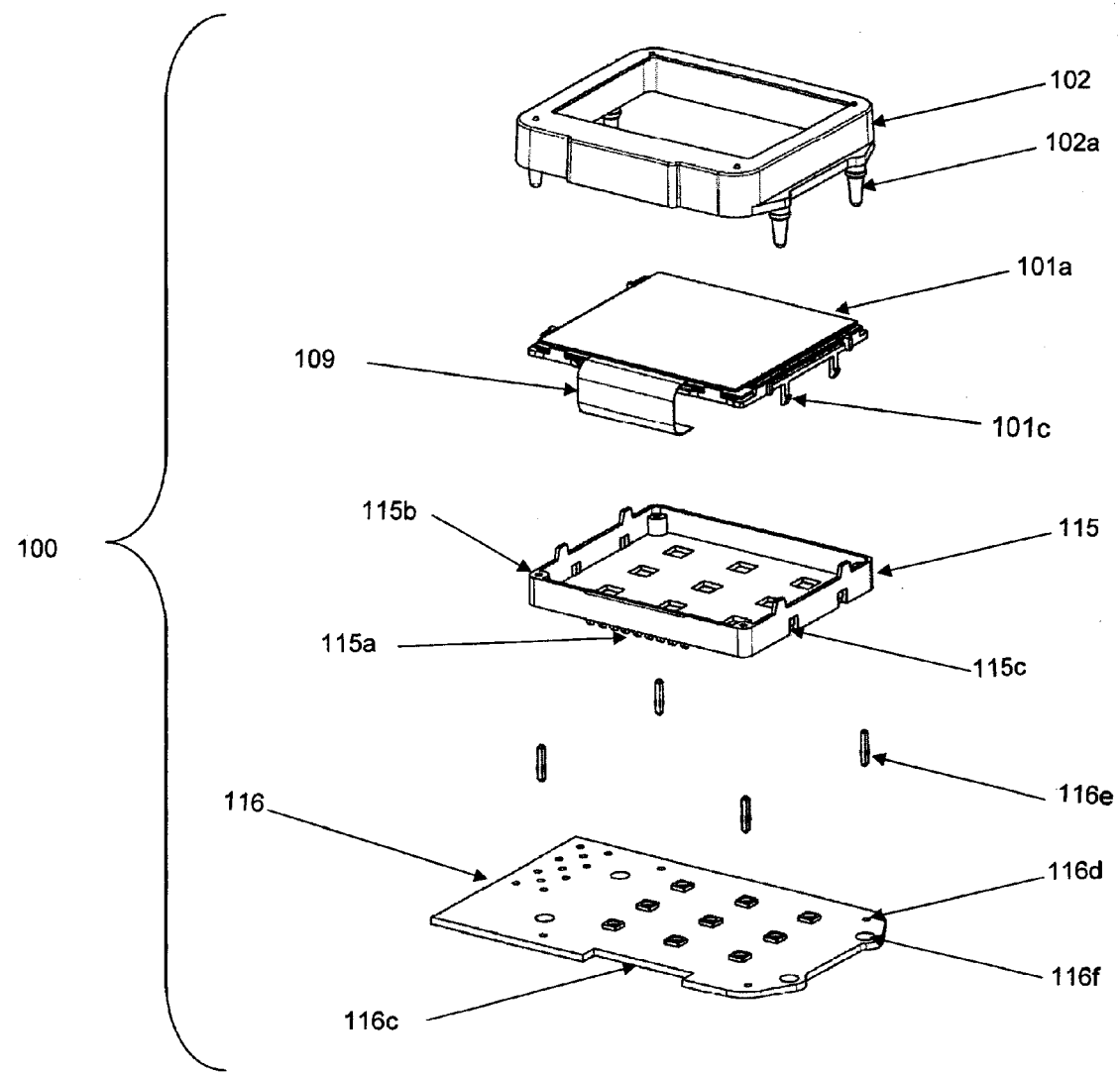
FIG. 3D is an exploded isometric view of the mechanical stack up and assembly method for display device 100 shown in FIG. 3A.

With reference to FIG. 3D there is shown an embodiment of the assembly method for display device 100 including: backlight board 116 having a reflector alignment slot 116c and alignment holes 116d, mounting pins 116e, frame mounting holes 116f and ribbon cable 109; reflector 115 having an anti-rotation tab 115a, alignment holes 115b and light management subassembly alignment slots 115c; light management subassembly 101a having mounting snaps 101c; and frame 102 having mounting tabs 102a. The mounting pins 116e are inserted into the backlight board alignment holes 116d and the alignment holes 115b of the reflector 115 are inserted onto the compliant mounting pins 116e such that the anti-rotation tab 115a of the reflector 115 aligns with the reflector alignment slot 116c in the backlight printed circuit board 116 and that the back surface of the reflector 115 is held against the front surface of the backlight board 116. The anti-rotation tab 115a also acts as a protective device to keep the ribbon cable portion 109 of the light management subassembly 101a from coming in contact with the potentially abrasive edges of the backlight board 116. The ribbon cable 109 is connected to the video electronics on the back surface of the backlight board 116. The light management subassembly 101a is then attached to the reflector 115 through the use of mounting snaps such that mounting snaps 101c are secured into the light management subassembly alignment slots 115c of the reflector 115 such that the light management subassembly 101a is attached to the reflector 115 in a desired relationship with respect to the backlight board 116. The frame 102 is attached to the backlight board 116 through the use of mounting tabs 102a that are pulled through the frame mounting holes 116f of the backlight board 116. It should be understood that the mounting pins 116e cause the backlight alignment holes 116d to cooperate with the reflector alignment holes 115b such that anti-rotation tab 115a of the reflector 115 cooperates with the reflector alignment slot 116c in the backlight board 116 and the mounting snaps 101c of the light management subassembly 101a cooperate with the light management alignment slots 115c of the reflector 115 to secure the backlight board 116 in a desired relationship with respect to the reflector 115 and light management subassembly 101a. It should be understood that accurate positioning of the light sources upon the circuit board is desirable to insure overall alignment with the associated light management subassembly.

Figure 3F:
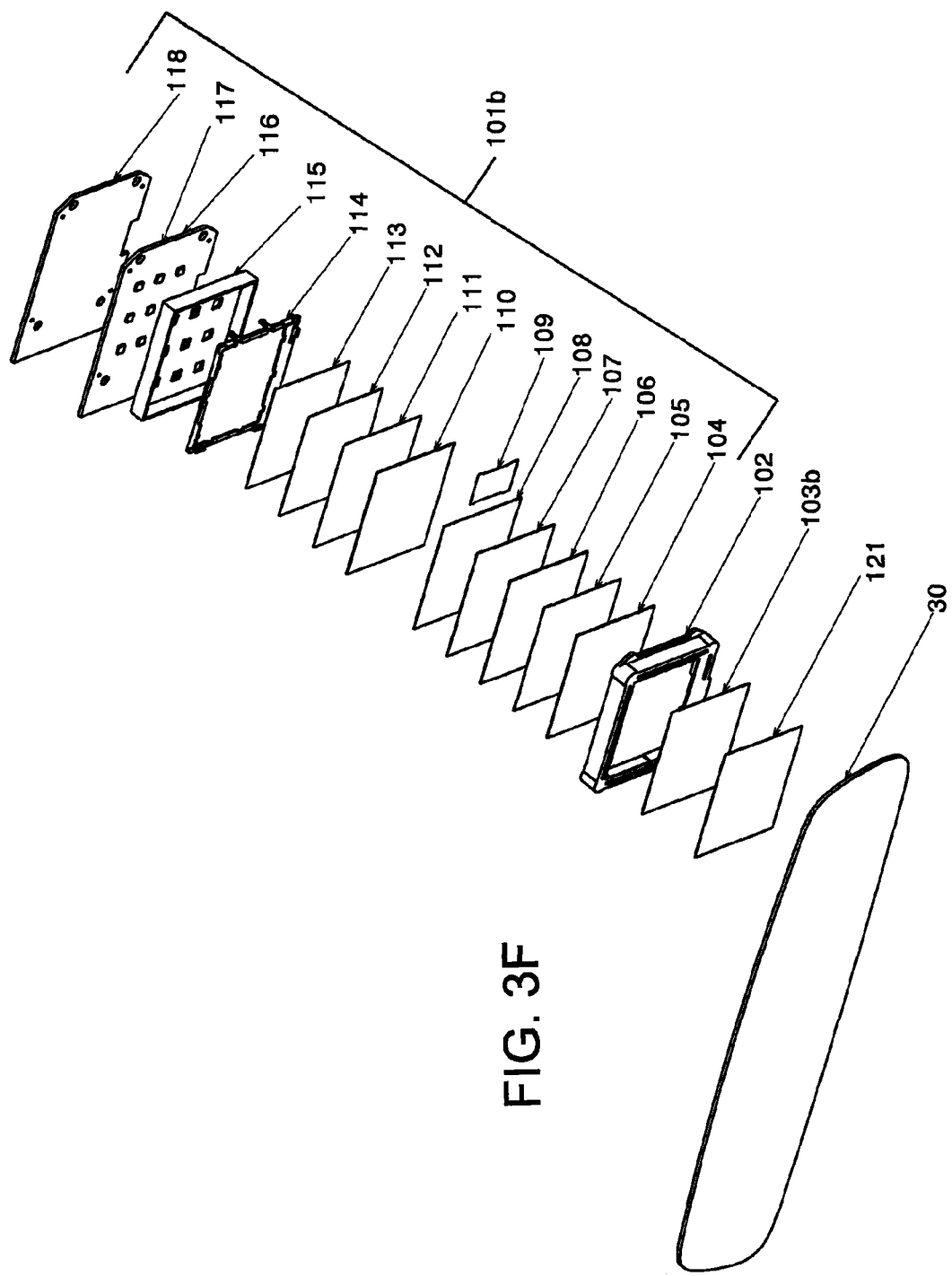
FIG. 3F is an exploded isometric view of another embodiment of a subassembly that may be used in the rearview assembly shown in FIGS. 1A-1D wherein the subassembly includes a mirror element and a display.
Figure 3G:
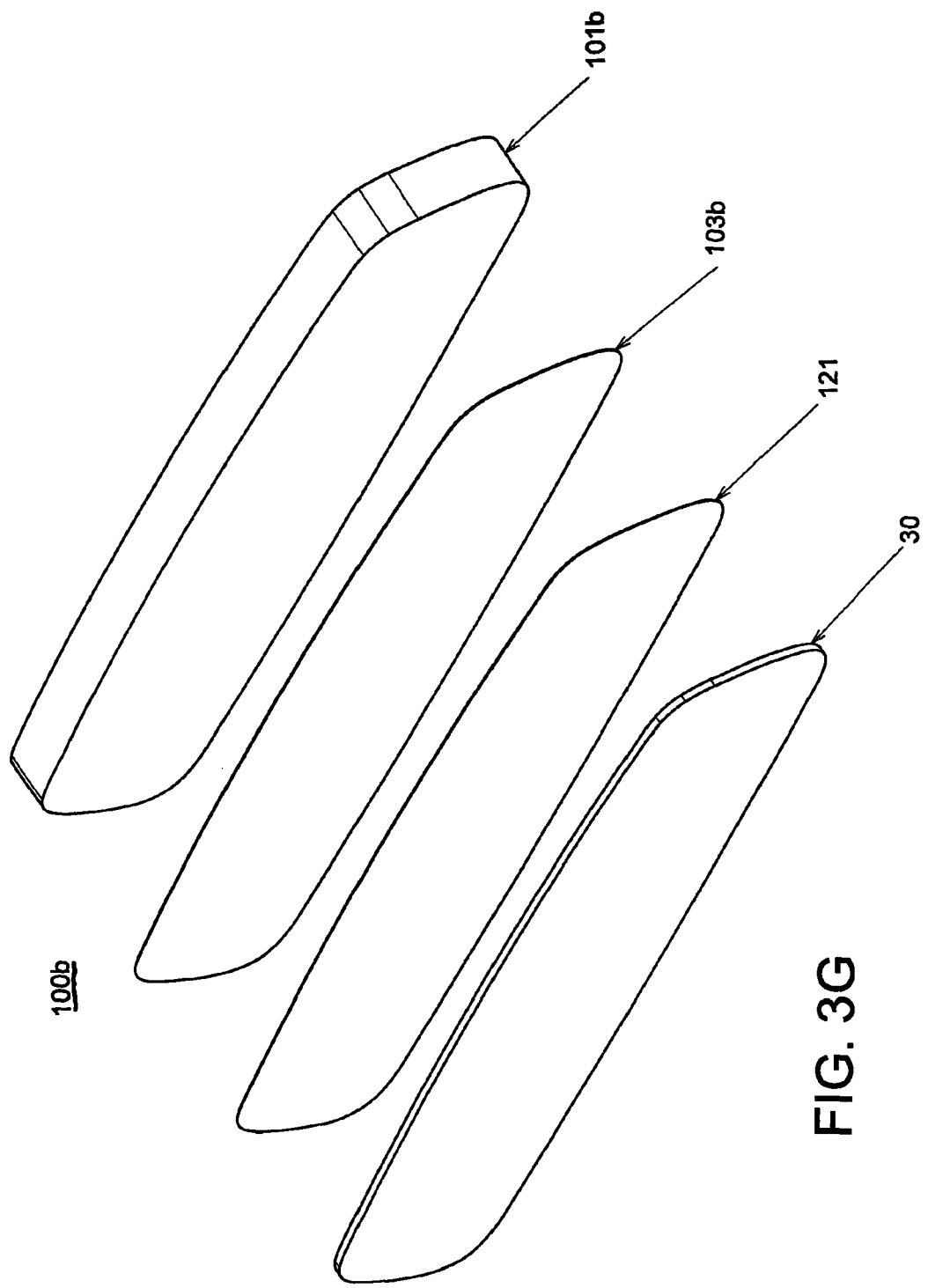
FIG. 3G is a partially exploded isometric view of another embodiment of a subassembly that may be used in the rearview assembly shown in FIGS. 1A-1D wherein the subassembly includes a mirror element and a display.

According to another embodiment of the present invention, a display device 100b, such as that shown in FIGS. 3F and 3G may be used. Display device 100b is an LCD that together with mirror element 30 and reflective polarizer 103b, is configured to provide a luminosity when viewed through mirror element 30 of at least about 2000 cd/m$^2$, more preferably of at least 2750 cd/m$^2$, and even more preferably in excess of 3500 cd/m$^2$. Through the combination of mirror element 30 and reflective polarizer 103b, the reflectance of the mirror assembly shall be greater than 45 percent. Further, display device 100b should be automotive grade. Through combining the reflective surface with the polarizer an increase in light output of up to 400 percent is produced when compared to a display device system as shown in FIG. 3B.

To increase the luminosity of the display device 100 shown in FIG. 3B, the exit polarizer 103 of the LCD subassembly 101 may be removed from the first glass layer 104 and is replaced with a reflective polarizer 103b, as shown in FIGS. 3F and 3G. Reflective polarizer 103b can be laminated to the top glass 104 of the LCD, laminated to the fourth surface of mirror element 30 over the display, laminated to the entire fourth surface of mirror element 30, consist of a wire grid polarizer or equivalent on the third or fourth surface of mirror element 30, or be laminated between depolarizing device 121 and top glass 104 of the LCD. In order for the image from the LCD to be viewable, the polarization axis of the reflective polarizer should be parallel with first alignment film 105. The transflective coating of mirror element 30 may be removed in the area of the reflective polarizer. In some instances it may be desirable to have a low reflectance coating on the third surface or fourth surface of the glass in the area of reflective polarizer to mask the opening. The reflective polarizer thus may replace the reflective surface of mirror element 30 insofar as it reflects unpolarized light back to the viewer. Reflective polarizer 103b may replace the exit polarizer 103 as they both exhibit the same light transmission properties. A suitable commercially available reflective polarizer film is Part No. DBEF-E45 Degree available from 3M Corporation, or its functional equivalent. Other suitable reflective polarizers are disclosed in commonly-assigned U.S. Patent Application Publication No. US 2006/0007550 A1, the entire disclosure of which is incorporated herein by reference.

As shown in FIG. 3F, display device 100b includes the following components provided in order from the back of mirror element 30: a depolarizing device 121, a reflective polarizing film 103b, a frame 102, and a light management subassembly 101b. Light management subassembly 101b consists of a first glass layer 104, a first alignment film 105, a liquid crystal material 106, a second alignment film 107, a thin-film transistor film 108, a flex cable assembly 109, a second glass layer 110, a second polarizing film 111, a first optical film 112, a second optical film 113, a diffuser 114, a reflector 115, a backlight 116, a first video electronic circuit subassembly 117, and a second video electronic circuit subassembly 118. Reflective polarizing film 103b may be laminated to depolarizing device 121 or to first glass layer 104 of the LCD.

As shown in FIG. 3G, display device 100b includes the following components provided in order from the back of mirror element 30: a depolarizing device 121, reflective polarizing film 103b, and light management subassembly 101b. The reflective polarizing film may be laminated to the depolarizing device or to the first glass layer of the LCD and employs the entire viewable area of the glass element with a curved or non-rectangular display.

With respect to FIGS. 3F and 3G, display device 100b includes the following components provided in order from the back of mirror element 30: mirror element 30 which includes the reflective polarizer on the third or fourth surface of the mirror element, and light management subassembly 101b, depolarizing device 121 is not used in this execution. The reflective polarizer is only shown as provided on the areas of the element in front of the LCD viewable area, but can be deposited across the entire mirror surface.

Also with respect to FIGS. 3F, 3G and 3H, second polarizing film 111 may be removed from the LCD and be replaced with first optical film 112. Moving the reflective polarizer to the second glass layer still transmits light through second alignment film 107 into the LCD subassembly and it also reflects light not transmitted into the LCD subassembly back into the optical system to increase the overall efficiency of display device 100*b*.

Figure 4E:
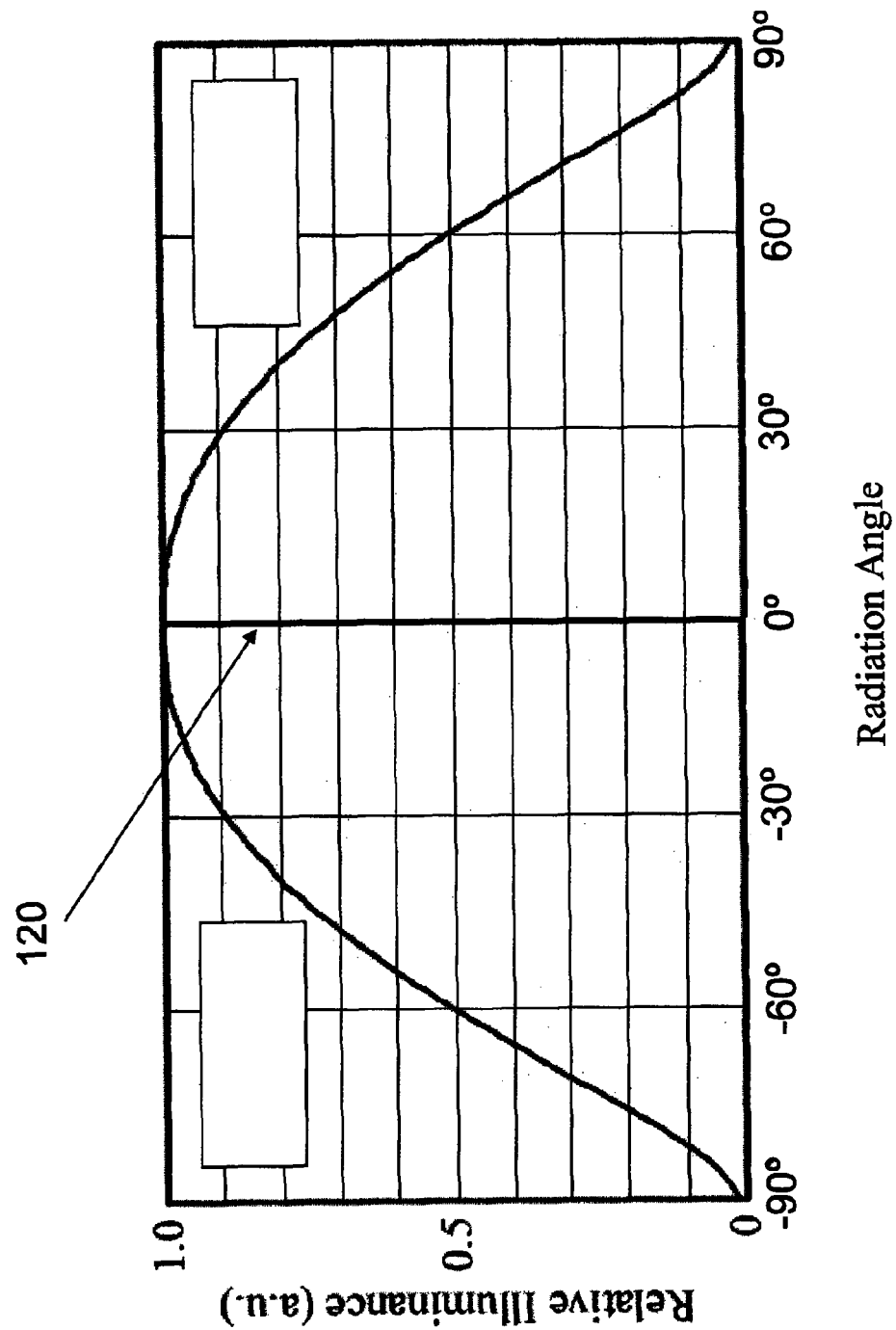
FIG. 4E depicts a graph of a light source radiation characteristic.

Turning now to FIGS. 4C, 4D, and 4E, light sources 116*a*, having a reflector 115 and a diffuser 114 are depicted to be mounted to circuit board 116. A typical light source will emit light rays 410 in a pattern as depicted in FIG. 4C. The x-axis of FIG. 4E represents the angular viewing position relative to the central optical axis of the light source and the y-axis represents a normalized radiation characteristic of the light source. As shown, light rays emitted by a typical light source will be minimally visible beyond some given viewing angle with respect to a central optical axis 120. Preferably a diffuser lens 114 and reflector 115 are provided to substantially redirect the light rays such that the luminance emitted through the display device is uniform with the lowest luminance level of the display device being at least 70 percent, more preferably 80 percent, of the maximum luminance level of the display device. Diffusing lens 114 may also employ a segmented structure whereby all or a selected subset of the light sources may be energized to illuminate all or a portion of the display 100. Preferably, diffuser lens 114 would employ a baffle between segmented areas to effectively separate areas associated with an energized light source from areas associated with light sources that are not energized. As an example, in the case of FIG. 1D, the light source in the area of the compass display may be energized, while the light sources under the remaining area of display 100 may not be energized. In this case, diffuser lens 114 would preferably employ a baffle structure to contain light in the area of the compass display.

With further reference to FIGS. 4A, 4B, 4C, and 4D there is shown a diffuser lens 114 with refracting portion 133, a planar surface 134, a deviator portion 135 and a textured surface 136. As shown in FIG. 4C, light rays 410*a* that pass through deviator portion 135 are refracted and reflected non parallel to optical axis 120. Through the use of a conic surface, redirected rays 411*a* travel through diffuser lens 114 and are further deviated from the optical axis as they pass through textured surface 136, such as Charmilles finish 24, as shown by rays 412*a*. Through the use of a radius between the deviating conic portions of the diffuser lens 114, rays can by redirected from the diffuser lens towards a desirable portion of the reflector 115 as shown by ray 410*b* and reflected towards refracting portion 133 of diffuser lens 114 where the light is redirected in such a way that it is substantially parallel to the optical axis 120 as shown by ray 412*b*. As can be seen light rays 410*c* that pass through planar surface 134 are reflected and refracted non parallel to optical axis 120. Due to the use of a diffusing material and a textured surface light rays that are refracted through diffuser lens 114 are deviated off of the optical path 412*c* as represented by rays 412*ca*. Light rays reflected off of planar surface 134 are redirected towards reflector 115 such that they are redirected towards refracting portion 133 of diffuser lens 114 as shown by rays 410*d*. As light rays pass through refracting portion 133 they are redirected to be substantially parallel to optical axis 120 as represented by rays 412*d*. As shown, the deviator portion 135 and planar surface 134 of the diffuser lens 114 are thicker than the refracting portion 133, this configuration is such that the higher intensity light rays emitted from 0 degrees to 41 degrees off of the LED optical axis 120 are passing through a thicker portion of diffuse material reducing the output at the center of each optic 132*a*-132*i*, thus creating a more uniformly lit appearance across diffuser 114.

Figure 4F:
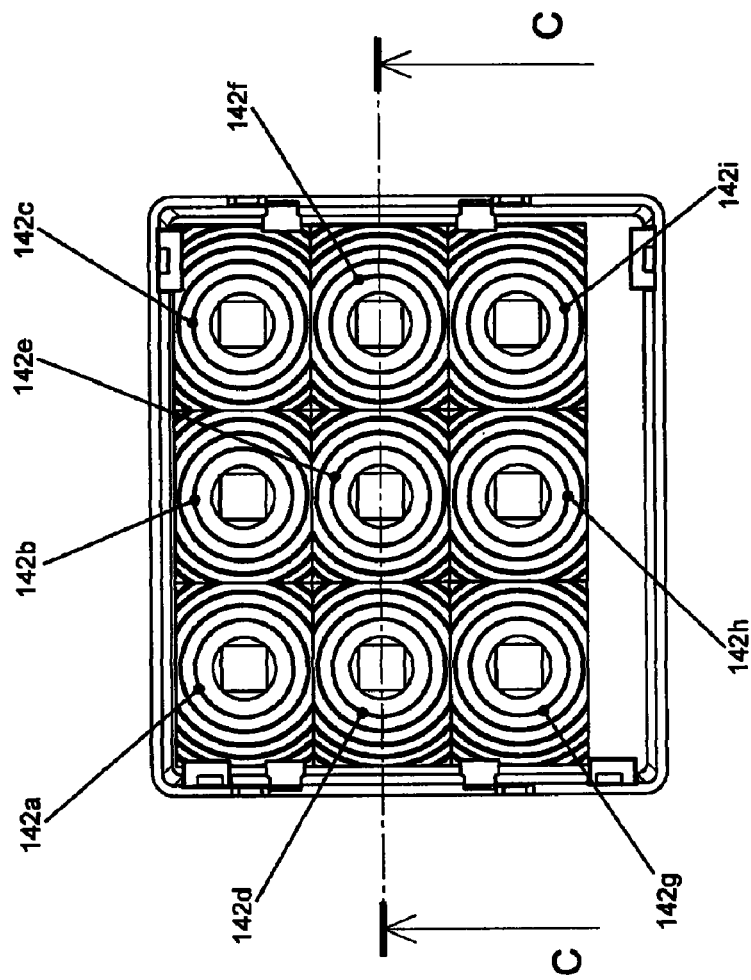
FIG. 4F is a rear view of an alternative reflector 115' for use in the subassembly shown in FIG. 3A.
Figure 4G:
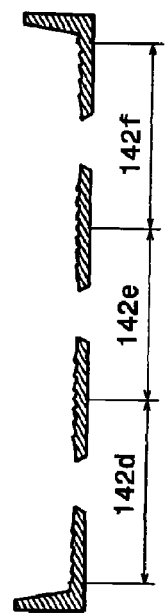
FIG. 4G is a cross-sectional view of the reflector optical block 115 taken along line C-C in FIG. 4F.
Figure 4H:
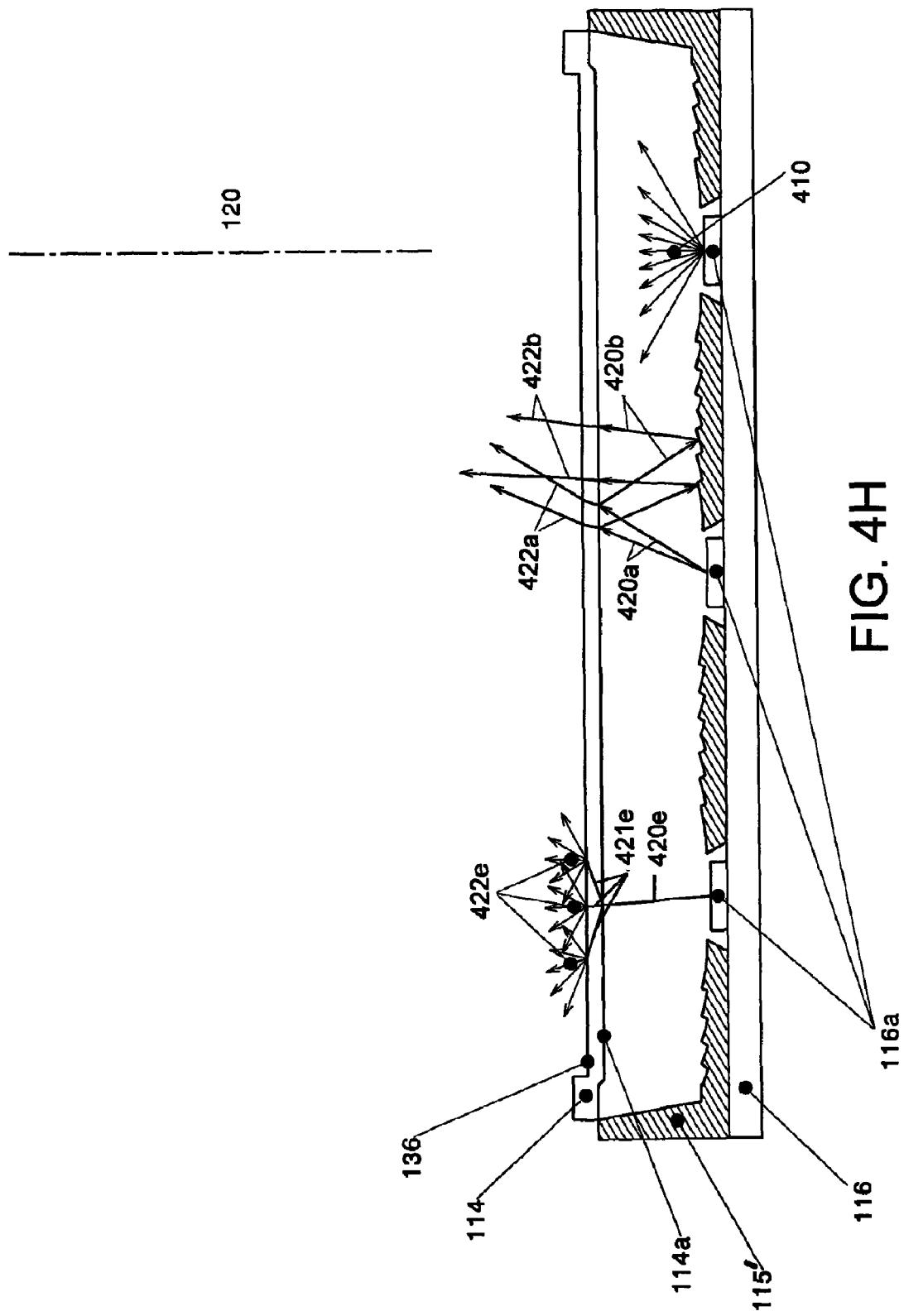
FIG. 4H is a section view of a light ray tracing for an alternative diffuser and the reflector shown in FIGS. 4F and 4G.

With further reference to FIGS. 4F, 4G and 4H there is shown another embodiment of a backlight subassembly including diffuser lens 114', reflector 115' and LEDs 116*a*. An example of a reflector 115' is shown in FIG. 4F. As illustrated, the reflector includes one optic 142*a*-142*i* for each of the light sources. Further detail of the reflector is shown if FIGS. 4G and 4H. As can be seen light rays 420*a* that pass through diffuser lens 114' are reflected and/or refracted non parallel to optical axis 120. The light rays that are refracted through the diffusing lens result in rays 422*a*. Light rays reflected off of the diffuser lens surface 114*a'* are redirected towards reflector 115' such that they are reflected off of a redirecting optic as shown by rays 420*b*, continuing through the diffusing lens as shown by rays 422*b*. As shown in FIG. 4H, light rays 420*e* pass through diffuser lens 114', through the use of a diffusing material, redirected rays 421*e* travel through diffuser lens 114' and are further deviated from the optical axis as they pass through textured surface 136', such as Charmilles finish 24, as shown by rays 422*e*. As shown, the light that is reflected off of the diffuser lens surface 114*a'* to the reflector is redirected towards the viewer to increase the uniformity and intensity of the light management subassembly.

The arrangement and function of components 111-116 are described further below with reference to FIGS. 5 and 6. As shown in FIG. 5, backlight board 116 includes a plurality of light sources 116*a* provided on a circuit board 116*b* or the like. Light sources 116*a* are preferably surface-mount LEDs that emit white light as discussed above. Circuit board 116*b* is preferably an aluminum circuit board, which helps to dissipate heat away from LEDs 116*a*. Reflector surface 115 is provided to redirect light while diffuser 114 is spaced slightly apart from backlight 116. FIG. 6 shows an enlarged portion of components 111-114 indicated by the region labeled VI in FIG. 5.

The combined optical elements shown in FIGS. 5 and 6 are provided to control the direction of light emitted from backlight assembly 116 towards the viewer's eyes. As shown in FIGS. 5 and 6 light ray 1 is refracted through and reflected off of surface 114*a* of diffuser 114 to form rays 1*a* and 1*b* and light ray 2 is similarly refracted through and reflected off of surface 114*a* to form rays 2*a* and 2*b*.

Ray 1*a* continues through diffuser 114 into second optical film 113 where a random prismatic structure 113*a* redirects the light toward the viewer's eyes to increase on-axis intensity. Ray 1*a* consists of unpolarized light until it interacts with first optical film 112, a reflective polarizer, which has the same polarization axis as second polarizer 111, such that 100 percent of light transmitted through first optical film 112 is transmitted through second polarizer 111 as shown by ray 1*aa*. This configuration results in rays of light having the polarization axis perpendicular to that of first optical film 112, which would normally be absorbed by second polarizer 111, to be reflected by first optical film 112 as shown by ray 1*ab* and recycled back into the optical system. Ray 1*ab* is converted back to unpolarized light once it interacts with second optical film 113, where the light is redirected through diffuser 114, reflected off third optical film 115, which is a nonmetallic specular surface reflector, continuing through the diffuser 114 into second optical film 113 where prismatic surface 113*a* redirects the light towards the viewer's eyes to increase on-axis intensity as shown by ray 1*ac*. The component of light for ray 1*ac* with the polarization axis perpendicular to that of second polarizer 111 is not shown, recycling of light will continue in the same path as ray 1*ab* or a similar path until the light is released from the system to increase on-axis intensity, released from the system in an undesirable direction, or released from the system at such a point that the on-axis intensity gains are negligible when compared to the output of the system.

Ray 1b is reflected off third optical film 115 continuing through diffuser 114 into second optical film 113 where a random prismatic structure 113a redirects the light towards the viewer's eyes to increase on-axis intensity. Ray 1b consists of unpolarized light until it interacts with first optical film 112, which has the same polarizing axis as second polarizer 111 such that 100 percent of light transmitted through first optical film 112 is transmitted through second polarizer 111 as shown by ray 1ba. This configuration results in rays of light having the polarization axis perpendicular to that of first optical film 112, which would normally be absorbed by second polarizer 111, to be reflected by first optical film 112 as shown by ray 1bb and recycled back into the optical system. Ray 1bb is converted back to unpolarized light once it interacts with second optical film 113, where the light is redirected through diffuser 114, reflected off third optical film 115, continuing through the diffuser 114 into second optical film 113 where prismatic surface 113a redirects the light towards the viewer's eyes to increase on-axis intensity, as shown by ray 1bc. The component of light for ray 1bc with the polarization axis perpendicular to that of second polarizer 111 is not shown, the recycling of light will continue in the same path as ray 1ab or a similar path until the light is released from the system to increase on-axis intensity, released from the system in an undesirable direction, or released from the system at such a point that the on-axis intensity gains are negligible when compared to the output of the system.

Ray 2a continues through diffuser 114 into second optical film 113 where a random prismatic structure 113a redirects the light. Ray 21 consists of unpolarized light until interacts with first optical film 112, which has the same polarization axis as second polarizer 111, such that 100 percent of light transmitted through first optical film 112 is transmitted through polarizer 111 as shown by ray 2aa. In this instance, the light ray 2aa is emitted in an undesirable direction that it is not contributing to the main on-axis intensity of the system. However, this configuration results in rays of light having the polarization axis perpendicular to that of first optical film 112, which would normally be absorbed by second polarizer 111, to instead be reflected by first optical film 112 as shown by ray 2ab and recycled back into the optical system. Ray 2ab is converted back to unpolarized light once it interacts with second optical film 113 where the light is redirected through diffuser 114 reflected off third optical film 115, continuing through diffuser 114 into second optical film 113 where prismatic surface 113a redirects the light towards the viewer's eyes to increase on-axis intensity, as shown by ray 2ac. The component of light for ray 2ac with the polarization axis perpendicular to that of second polarizer 111 is not shown, the recycling of light will continue in the same path as ray 1ab or similar path until the light is released from the system to increase on-axis intensity, released from the system in an undesirable direction, or released from the system at such point that the on-axis intensity gains are negligible when compared to the output of the system.

Ray 2b is reflected off third optical film 115 continuing through diffuser 114 into second optical film 113 where random prismatic structure 113a redirects the light towards the viewer's eyes to increase on-axis intensity. Ray 2b consists of unpolarized light until it interacts with first optical film 112, which has the same polarization axis as second polarizer 111 such that 100 percent of light transmitted through first optical film 112 is transmitted through second polarizer 111 as shown by ray 2ba. The component of light for ray 2ba with the polarization axis perpendicular to that of second polarizer 111 is not shown, the recycling of light will continue in the same path as ray 1ab or a similar path until the light is released from the system to increase on-axis intensity released from the system in an undesirable direction, or released from the system at such point that the on-axis intensity gains are negligible when compared to the output of the system.

Figure 7A:
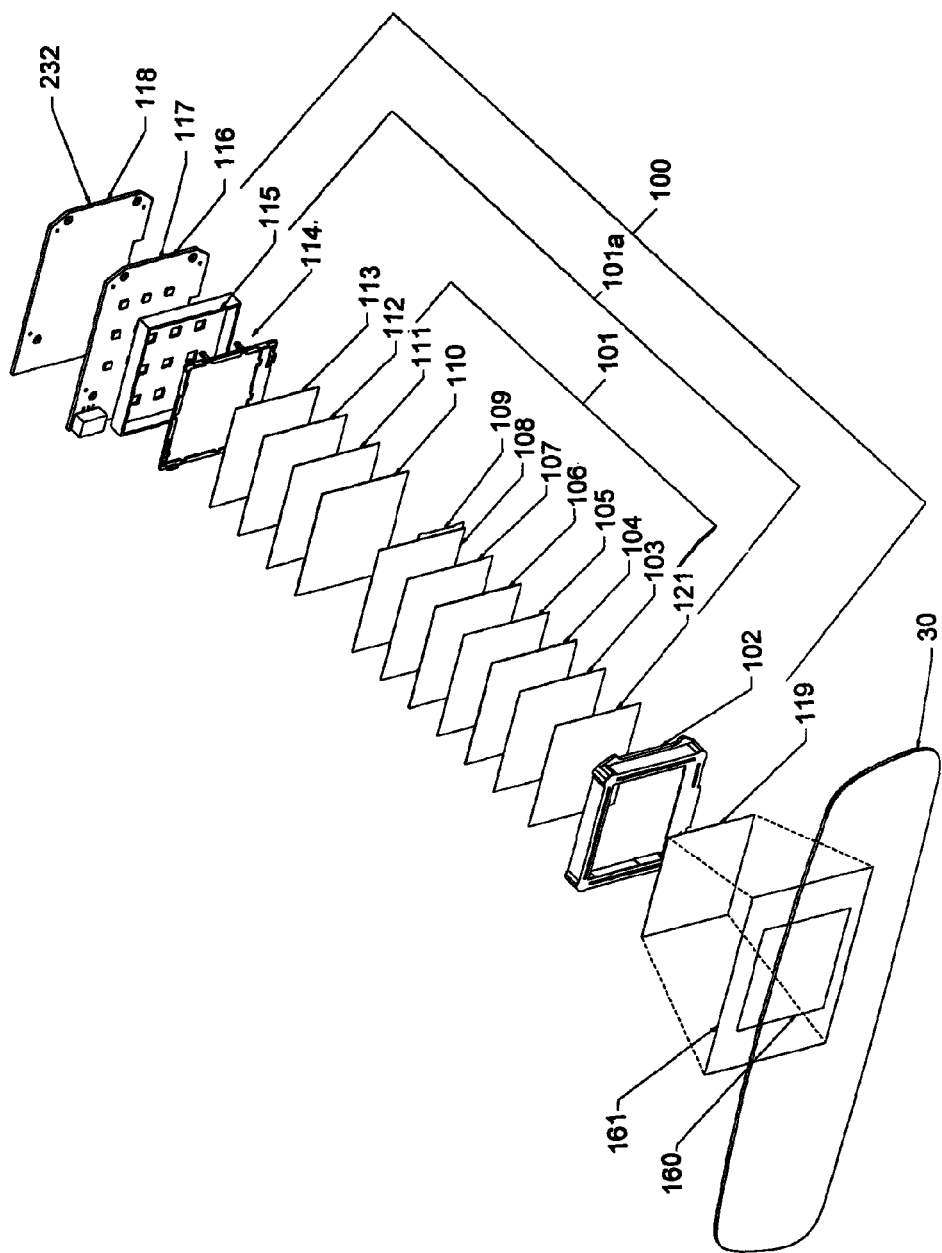
FIG. 7A is an exploded perspective view of a second embodiment of a subassembly of the rearview assembly shown in FIGS. 1A-1D wherein the subassembly includes a mirror element and a display.

FIG. 7A shows a second embodiment of a display device where the only difference from the first embodiment is the addition of a magnifying system 119 that significantly magnifies the image 160 that would otherwise be viewable by the driver to instead project the magnified image 161. Preferably, magnifying system 119 consists of at least one display device, at least one magnifying optic or a plurality of lenses used to magnify the image created by display device 100 and an imaging surface. Magnification of the image is achieved within a distance of not less than 0.5 millimeter and not exceeding 0.5 meter from the display device to the imaging surface.

Figure 7B:
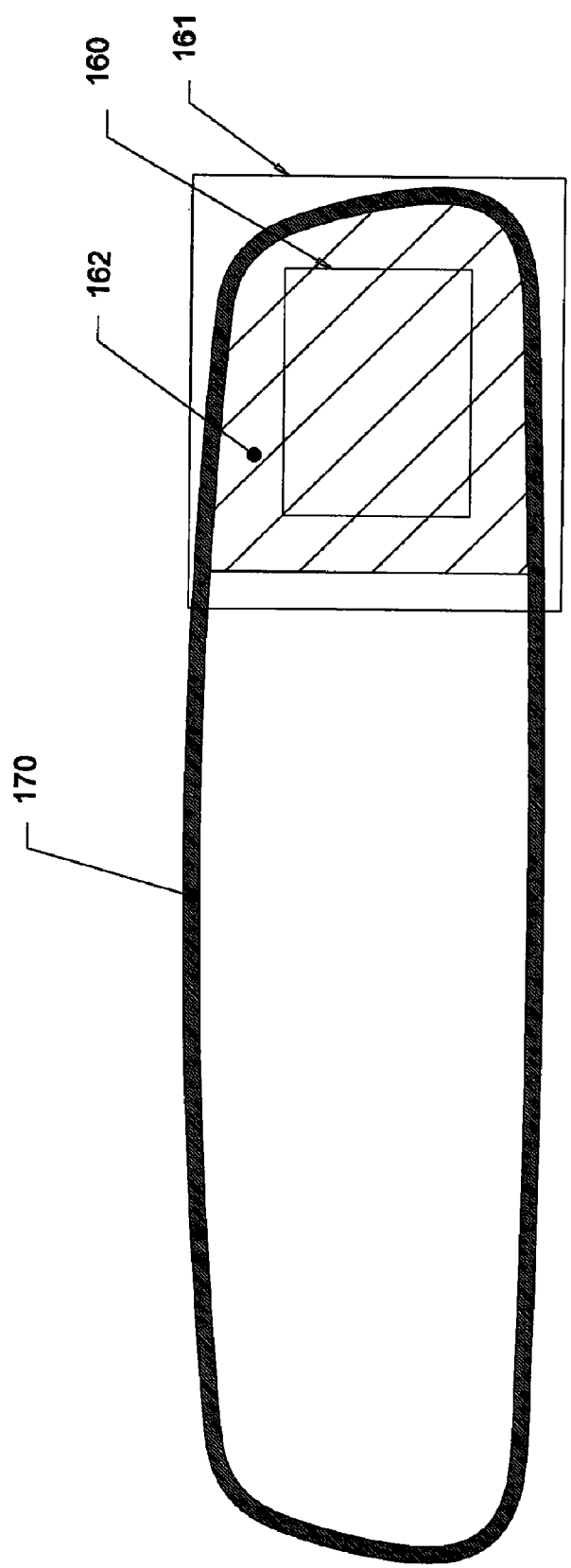
FIG. 7B is a front view of a mirror element with a trimmed enlarged image.
Figure 7C:
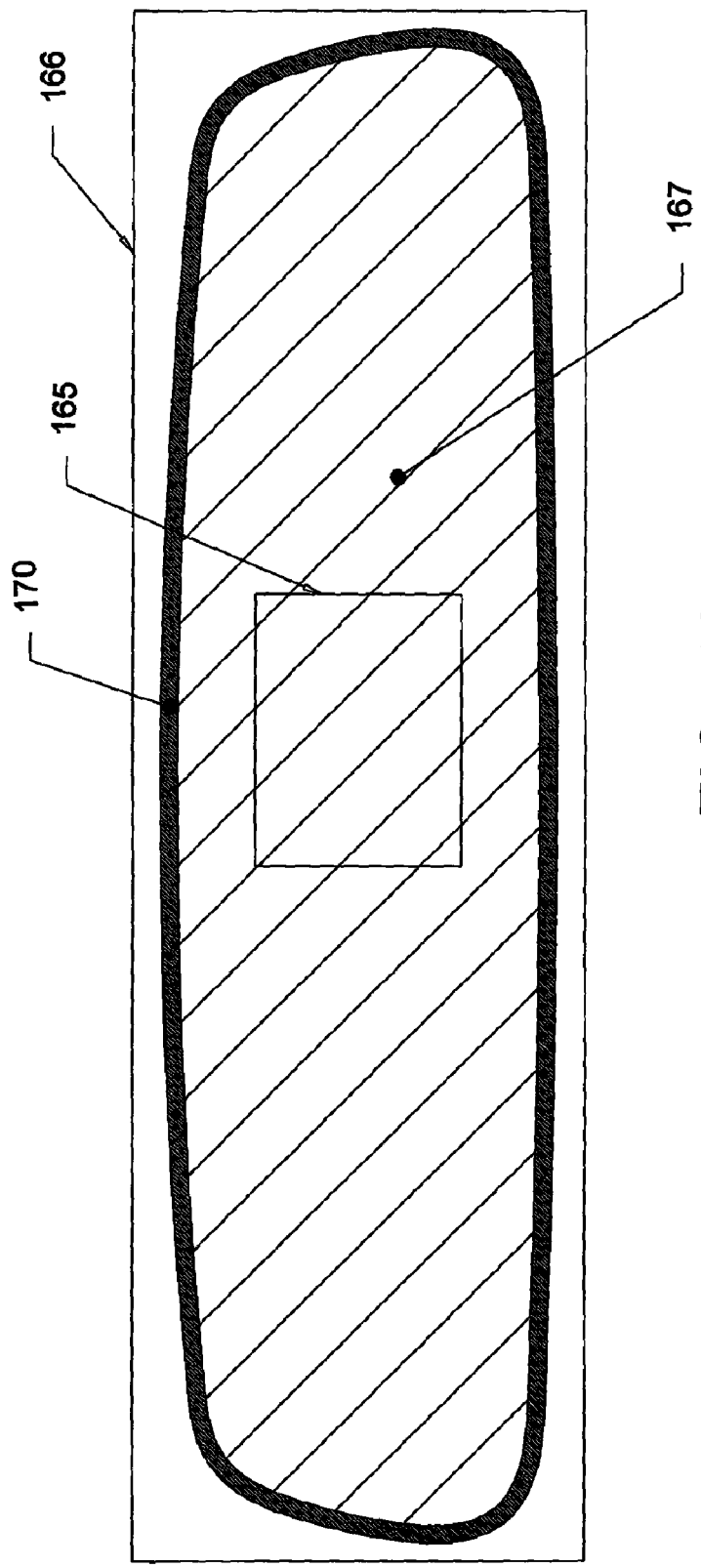
FIG. 7C is a front view of a mirror element with an enlarged image trimmed to the extents of a mirror element.
Figure 7D:
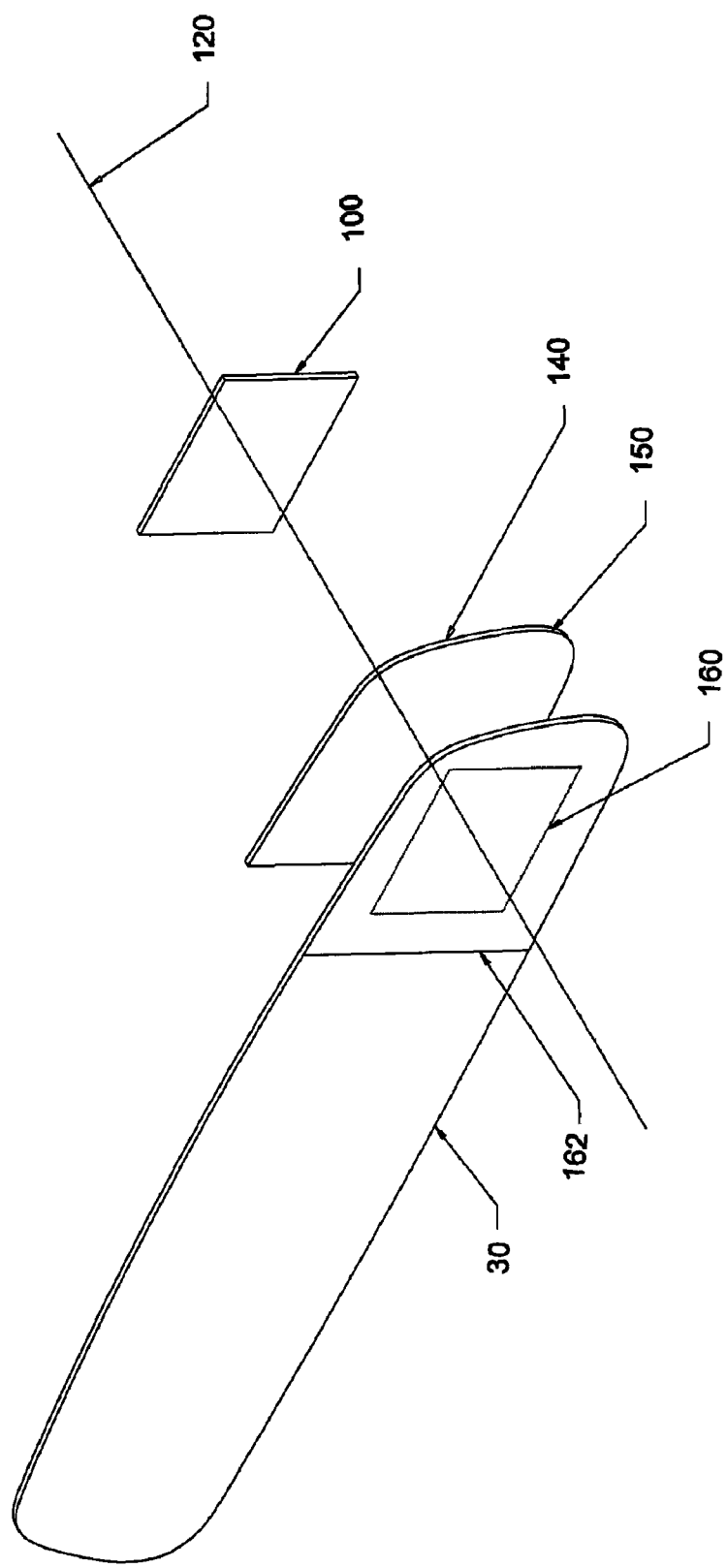
FIG. 7D is an exploded isometric view of an embodiment showing a single lens magnification system.
Figure 7E:
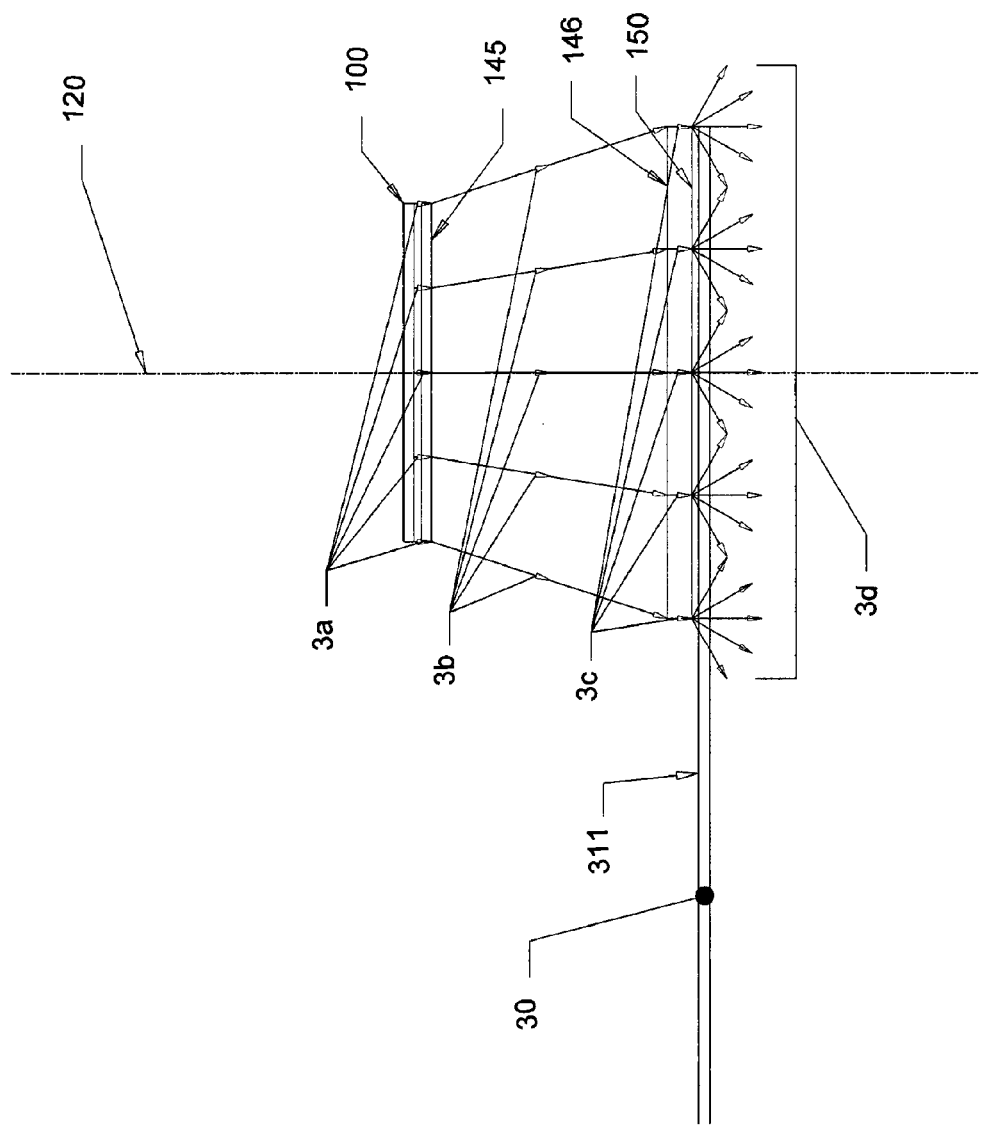
FIG. 7E is a section view showing a ray tracing through a multiple lens magnification system.

With reference to FIG. 7E, an imaging surface 150 is desired to create an image as close as practicable to or on the rearmost surface 311 of mirror element 30 that is viewable from the widest possible viewing angle through the use of lens optics, diffusing materials or a combination thereof. Methods of creating imaging surface 150 include, but are not limited to, a lenticular lens array, a micro diffusing surface treatment on the rearmost surface 311 of mirror element 30, a lens created with bulk diffusing material, a beaded diffuser lens, or diffusing films adhesively attached to the rearmost surface 311 of mirror element 30. Furthermore, imaging surface 150 can be incorporated with the final lens in a magnifying system to reduce part cost or complexity.

As shown in detail in FIG. 7B through the use of a magnification system it is possible to change the geometry of an image created by a display device. The initial image 160 created by a display device does not match the traditional boundary 170 of a rearview mirror assembly. Through the implementation of a magnification system the image can be magnified larger than the usable image surface area as shown by magnified image 161. An imaging surface can be constructed such that an image 162 is visible to the horizontal extents of the rearview mirror assembly and truncated at some vertical location in the rearview mirror device creating an aesthetically pleasing image to the viewer, which also maintains a traditional mirror boundary.

Although the display area in FIG. 7B is shown on the passenger side of the mirror, it may be desirable to place the display on the driver's side so as to move the displayed image closer to the driver's eyes and thus increase the perceived brightness of the displayed image.

Figure 7F:
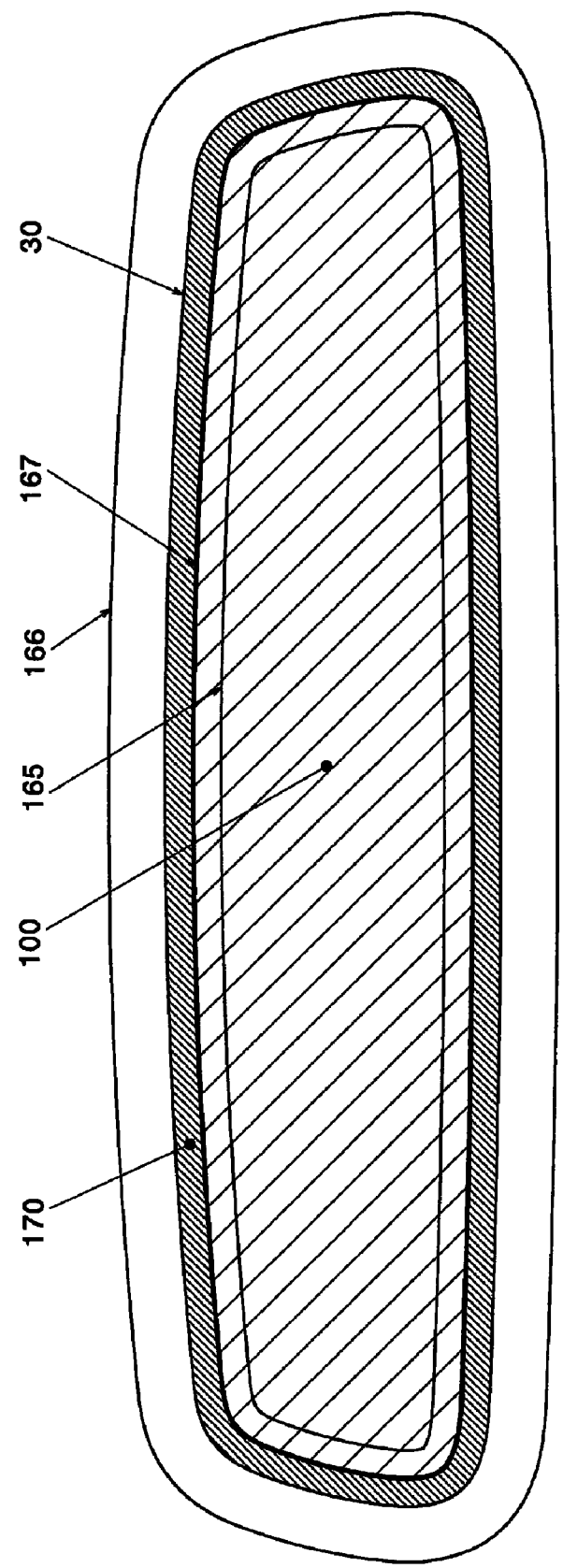
FIG. 7F is a front view of a mirror element with a conforming image.

As shown in detail in FIG. 7C through the use of a magnification system it is possible to envelop the entire glass area within the boundary of the rearview mirror assembly with the image created by a display device. The initial image 165 created by a display device does not match the traditional boundary 170 of a rearview mirror assembly. Through the implementation of a magnification system the image can be magnified larger than the usable image surface area as shown by magnified image 166. An imaging surface can be constructed such that an image 167 is visible to the extents of the rearview mirror assembly creating an aesthetically pleasing image to the viewer, which also maintains a traditional mirror boundary. Alternatively, the size of display 100 can be increased and made curved or non-rectangular in shape as shown in FIG. 7F. If this is done while also mounting display 100 nearer the imaging surface 150, increased contrast in the magnified image is possible while maintaining an aesthetically pleasing curved mirror housing shape 15. Also, by using a curved or non-rectangular display, the image may not need to be magnified to correspond to the boundaries of the mirror, thus enabling the display to be placed even closer to the mirror element.

Turning now to FIG. 7D there is shown a magnifying system incorporating display device 100, refractor lens 140, imaging surface 150 and a mirror element 30. Lens 140 is provided to magnify the light rays from display device 100 to the extents of an imaging plane 150. Lens 140 redirects the light from display device 100 to be substantially parallel to the optical axis 120. With the omission of imaging surface 150 an observer viewing the image from any direction other than optical axis 120 of magnifying system 119 would see a distorted or incomplete image. As shown the imaging surface 150 can be combined with the refractor lens 140 closest to mirror element 30. Imaging surface 150 is configured to direct substantially all of the light rays to define the viewing angle of the final image with respect to the optical axis 120 of the magnification system 119.

Turning back to FIG. 7E there is shown a section view of a multiple lens magnifying system used to reduce the required depth of the assembly incorporating display device 100, refractor lens 145, refractor lens 146, imaging surface 150 and a mirror element 30. The image created by the display device is represented by rays 3*a*. A diverging refractor lens 145 is provided to direct the light rays 3*a* from display device 100 to the extents of refractor lens 146 as shown by light rays 3*b*. Lens 146 redirects the light from refractor lens 145 to be substantially parallel to the optical axis 120, as shown by light rays 3*c*. With the omission of imaging surface 150 an observer viewing the image from any direction other than optical axis 120 of magnifying system 119 would see a distorted or incomplete image. As shown the imaging surface 150 can be combined with the refractor lens 146 closest to mirror element 30. Imaging surface 150 is configured to direct substantially all of the light rays 3*d* to define the viewing angle of the final image with respect to the optical axis 120 of the magnification system 119.

Figure 8:
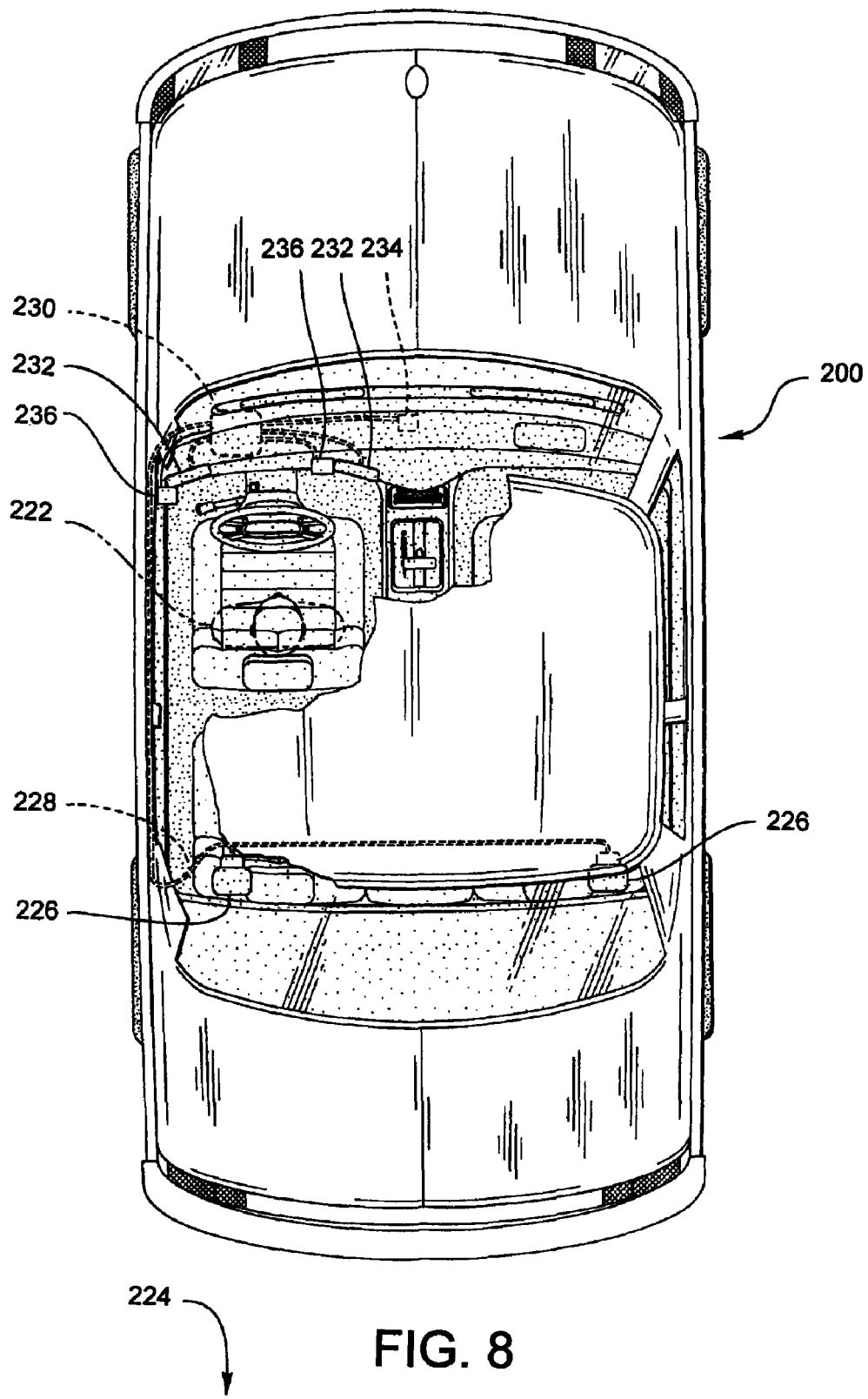
FIG. 8 is a general schematic diagram of a vehicle including a rear vision system according to one embodiment of the present invention.

FIG. 8 shows a schematic diagram of a vehicle 200 in which the present invention may be implemented. Vehicle 200 is driven by operator 222. One or more camera systems 226 are operative to view a scene 224. In the example shown, scene 224 is generally behind vehicle 200. However, camera system 226 may be oriented in a variety of ways to view scenes at other locations about vehicle 200 including, but not limited to, the sides, back, front, bottom, top, and inside. In the example shown, signals representative of the scene are sent via channel 228 to a processor system 230. Input from an ambient light sensor 234 and direct glare sensor 236 is also available to processor system 230. Processor system 230 produces an enhanced image of scene 224 on one or more display systems 232.

Camera system(s) 226 may be mounted in the tail lights of vehicle 200 or in a center-high-mounted stop light (CHMSL) assembly or as an integral component behind the rear window as disclosed in commonly assigned U.S. Pat. No. 6,550,949, the entire disclosure of which is incorporated herein by reference.

Camera system(s) 226 preferably cover a wide field of view to the back and sides so that pedestrians or other objects directly back of vehicle 200 may be seen and so than oncoming traffic from the sides may be seen. The system may thus be designed so that, when backing out of a parking spot, oncoming vehicles may be seen before backing into the lane of travel. This requires a camera system 226 with a near 180° field of view or several camera systems 226 mounted near the rear of the vehicle. An analogous system with a camera or cameras mounted near the front of the vehicle is adapted to view cross traffic at a "blind" intersection before entering the lane of travel of the cross traffic. These are desirable applications for the present invention which supplement the viewing function of conventional rearview mirrors.

Figure 9:
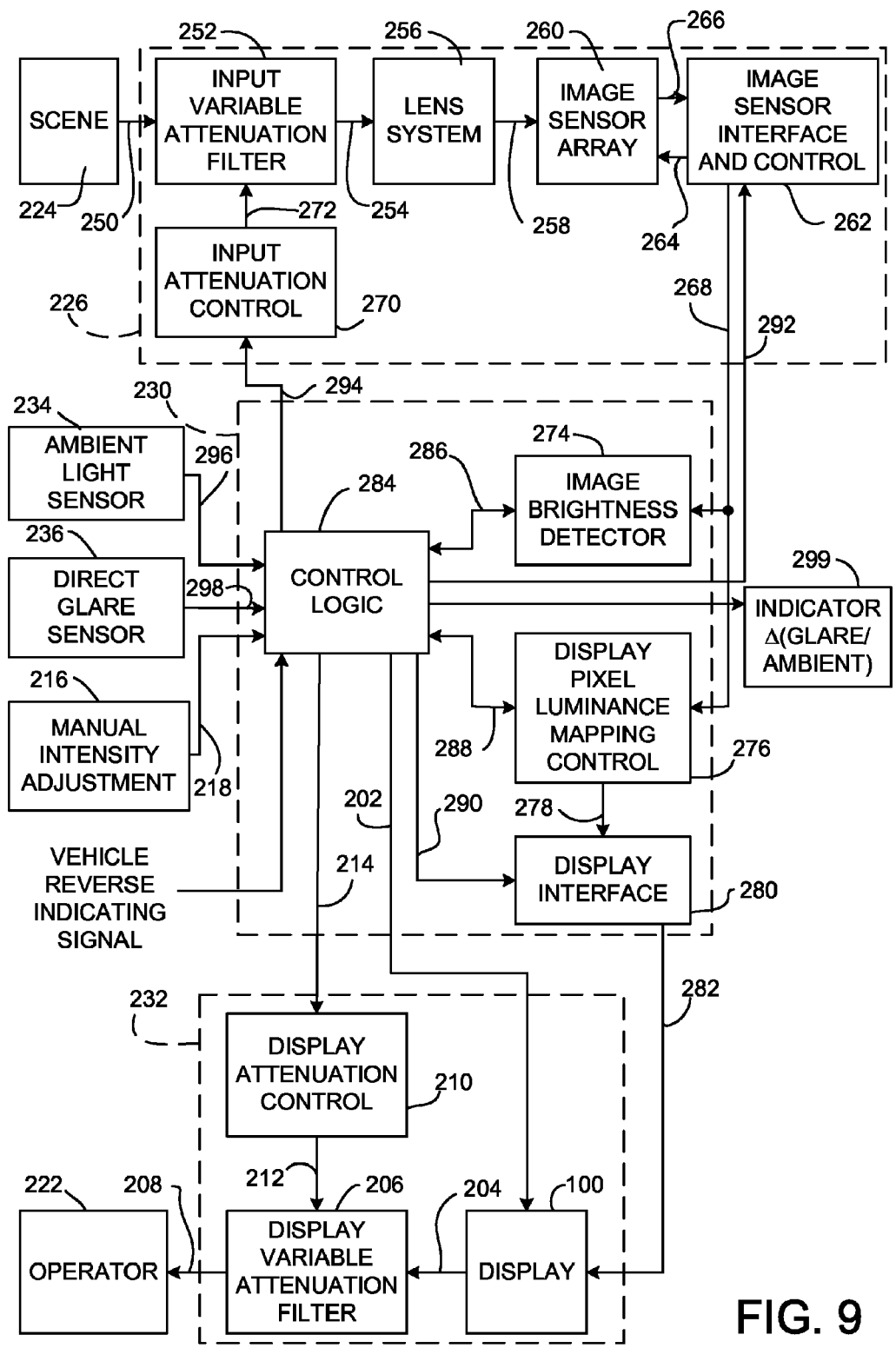
FIG. 9 is a block diagram of a rear vision system according to one embodiment of the present invention.

FIG. 9 shows a block diagram of a preferred rear vision system with which the present invention may be used. As shown in FIG. 9, camera system 226 accepts image rays 250 from scene 224. Image rays 250 pass through optional input variable attenuation filter 252 emerging as attenuated image rays 254. Rays 250 or 254 are focused by lens system 256, becoming focused rays 258. An image sensor array 260 is placed in the focal plane of lens system 256. The image sensor array is comprised of individual pixel sensors, ideally arranged in rows and columns. An image sensor interface and control unit 262 provides control signals 264 to image sensor array 260 and receives electrical signals 266 corresponding to scene 224 from image sensor array 260. Image sensor interface and control 262 may operate on signals 266, preferably including digitizing the signals, prior to forwarding the camera system output signals 268. If optional lens attenuating filter 252 is used, the amount of attenuation is controlled by lens attenuation control 270 through lens attenuation filter signal 272.

Camera system 226 is designed to handle a large dynamic range. For example, camera system 226 can capture and transmit detail in scene 224 that may otherwise be obscured due to low illumination levels or due to glare from lights such as headlamps.

One limitation on the dynamic range of camera system output is due to the pixel sensors in the image sensor array. A preferred embodiment uses complimentary metal-oxide semiconductor/metal-on-silicon (CMOS) photogate active pixel sensor (APS) cells. The photogate in each cell is used to integrate charge developed from incident light. A storage site is capable of holding the integrated charge. The storage site can be reset to a reference level indicative of pixel sensor noise. A selectable buffer circuit outputs a signal proportional to the integrated charge or reference value at the storage site. By subtracting the reference noise signal from the integrated charge signal, a significant effect of the noise can be eliminated, increasing pixel sensor sensitivity.

Another limitation on the dynamic range of camera systems has been the restriction on the length of time for integrating charge produced by incident light. Current systems limit the integration time to slightly less than the frame time. Since it is desirable to display scene 224 as near real-time, a high frame rate of preferably not less than 30 frames per second is required. Traditionally, this has resulted in integration times of no greater than 33 milliseconds.

An optical sensor combining image sensor array 260 and image sensor interface and control 262 with a wide dynamic range is described in commonly-assigned U.S. Pat. No. 6,008,486, the entire disclosure of which is incorporated herein by reference.

Even with an image sensor array 260 possessing a relatively large intra-scene dynamic range, the ambient light level over which camera system 226 must operate may be greater than can be accomplished solely with the image sensor 260. For example, there should be some visibility even in bright moonlight, and the ratio between the intensity of bright sunlight and bright moonlight is roughly 1,000,000 to one. Thus, one or more methods may be used to increase the range over which image sensor 260 can be used well beyond that provided by the wide intra-scene dynamic range of image sensor 260. To accommodate such wide inter-scene variations in lighting conditions, variable attenuation filter 252 can be used. In one embodiment, a lens with an automatic variable iris is used. However, such mechanisms are presently expensive and a lens system 256 adapted to work with an iris is likely to require more elements, working against the requirement for exceptionally high contrast and low light dispersion required to make the large dynamic range possible as described below. It is thus preferred to use a lens which has a fixed aperture. Input attenuation filter 252 may also be implemented as an electrically controlled shutter. In addition, attenuation filter 252 may be constructed to selectively filter infrared light from reaching the image sensor array. Such a filter could be constructed using an electrochromic element having electrochromic species that absorb IR radiation when in the "colored" state. Such a "colored" state may appear visibly clear, however. By providing such an IR-selective filter, the filter may be turned on during the day to block IR radiation from the sun, and turned off at night to allow the camera to sense IR radiation for night vision.

Input attenuation filter 252 may be implemented with an electrochromic window. The window transitions from substantially clear to maximum attenuation based on attenuation filter signal 272. The steady state attenuation is a reasonably stable and reproducible function of voltage so that, having experimentally determined the relationship between voltage and light attenuation, a controller may be used to set the amount of attenuation. This allows camera system 226 to employ a highly sensitive image sensor array 260 without excessive saturation in bright daylight.

A digital output from camera system 226 is desired. Image sensor interface and control 262 may use an 11- or 12-bit analog-to-digital converter (ADC) to read the pixel output which indicates the respective integrated light level received at the pixel sensor sites.

An alternative to the above ADC is a multi-range ADC having fewer bits. A dual or multiple ranging scheme may also be used including a digitized value and a range indication. A further non-linear ADC embodiment utilizes a logarithmic preamplifier or logarithmic converter to provide a greater density of quantization levels at low light levels than at high light levels.

Figure 11:
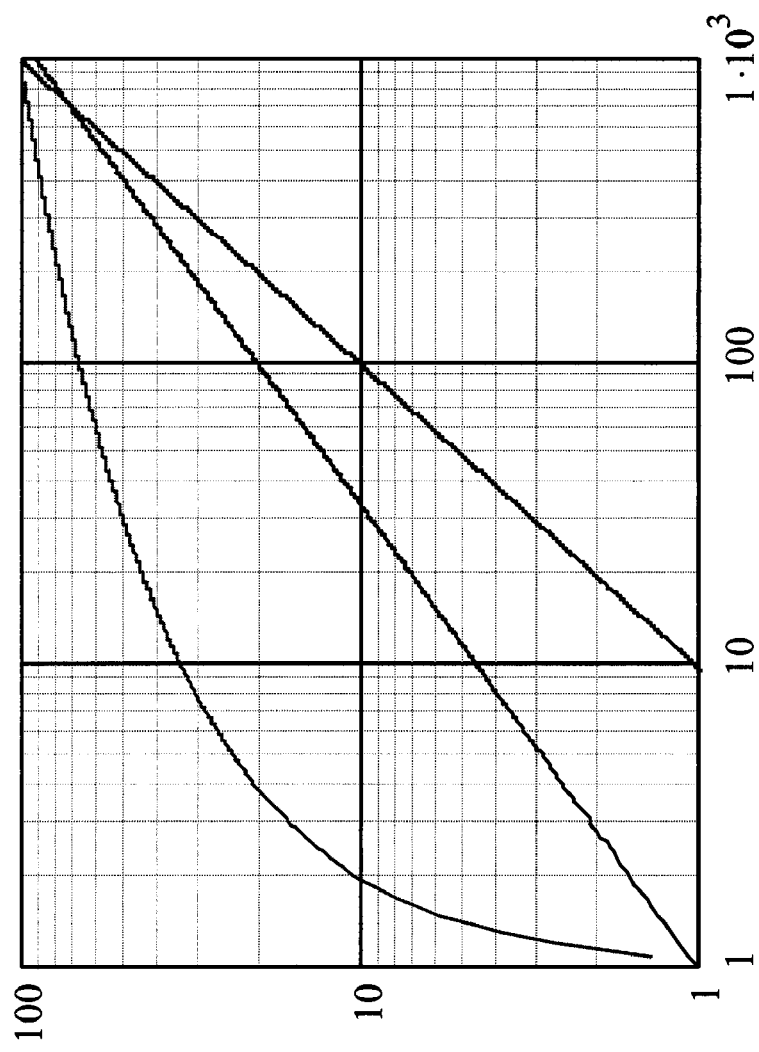
FIG. 11 is a graph showing three plots of relationships between display output and camera input contrast ranges.

Referring again to FIG. 9, processor system 230 is further described. The camera system output 268 is processed by image brightness detector 274 and display pixel luminance mapping control 276. Image brightness detector 274 may determine the brightness level of the entire image and may determine brightness levels of regions within the image. The LCD or other display is limited in the ratio of brightness levels it can produce, for instance an LCD may only be able to produce a dim pixel that is 1/100th the brightness of the brightest pixel. So it is limited to a 100:1 contrast ratio. A video camera can typically only operate over a range or contrast ratio of 256:1, being based on a 8-bit digital basis. The camera can adjust for very bright or very dark images, but there is a limit between the brightest and the dimmest pixel. Techniques described elsewhere in this description can improve the range to 1024:1 or beyond. Suffice it to say the camera has a larger contrast range capability than the display. To maximize the clarity and detail of the image, it may be desirable to compress the range of brightness to match the capability of the display. An example is shown in FIG. 11 using a camera with a range of 1000:1 and a display with 100:1 contrast ratio. The bottom right line shows an input that is truncated below 10:1000 ratio, therefore there is lost dark detail. The other two lines show methods of retaining the full range of the camera image. The "curve" or transfer function could be selected or adjusted based on the input video signal, characteristics of the video, ambient and/or glare light levels, or any combination of these. Display pixel luminance mapping control 276 may thus compress the wide dynamic range of camera system output 268 to one which is comfortably viewable by operator 222. Display pixel luminance mapping control 276 may also increase the visibility of scene 224 while limiting higher light levels which are detrimental to the night vision of operator 222. Display luminance signal 278 is processed by display interface 280 to produce display signal 282 for display system 232. Control logic 284 is in communication with image brightness detector 274 through bus 286, display pixel luminance mapping control 276 through bus 288, display interface 280 through bus 290, image sensor interface and control 262 using image sensor control signal 292, input attenuation control 270 using input attenuation control signal 294, and other elements as will be described forthwith.

In image brightness detector 274, camera system output signal 268 is sampled to obtain digitized pixel readings. From these samples, control logic 284 computes and frequently updates the average pixel brightness in the frame and also updates the number of pixels which are at maximum brightness and minimum brightness in an image frame. Control logic 284 may periodically send control signals 292 to image sensor interface and control 262 to adjust the integration time so that the desired average image brightness in camera system output signal 268 is maintained. In another embodiment, the standard deviation of the brightness in camera system output signal 268 over a frame can be computed.

As a further feature, the integration period and the resulting average brightness are decreased when too high a percentage of pixels are at their maximum brightness level. Additionally, when few pixels are saturated but a larger percentage is at minimum brightness, the integration period is increased to raise the average brightness. When scene 224 is too bright to adequately control the overall brightness of camera output signal 268 using integration period alone, input variable attenuation filter 252 is darkened using input attenuation filter signal 272 to provide the desired degree of added attenuation. An illustrative embodiment of image brightness detector 274 as well as additional details of the circuit shown in FIG. 9 is described in commonly assigned U.S. Patent Application Publication No. 2003/0103141 A1, the entire disclosure of which is incorporated herein by reference.

Camera sensitivity is controlled over a wide range of brightness primarily by changing the integration time and method in order to reasonably center the image exposure in the electrical readout range of the pixel sensors and associated electronics. This balance is approximately maintained through display pixel luminance mapping control 276 so that, without further adjustments, the average display brightness will remain nearly constant. This may not be sufficient to control the intensity of display system 232, however, since the display 100 must be much brighter to be seen in the day than in the night. Furthermore, in spite of compression and the effective limiting of the displayed level of brighter headlights, the displayed image of scene 224 still has a large dynamic range which may, for example, be 200-to-one. For operator 222 to continue to see this range of brightness without being far too bright at night, the average intensity of display system 232 may be adjusted over a very large range and the adjustment will have to be well characterized to what is required. Any system which provides only two settings such as, for example, a high intensity level with headlamps off and a low intensity level with headlamps on, may be highly inadequate. One consideration in control of the intensity of display system 232, particularly in low ambient light conditions, as detected by ambient light sensor 234, glare light sensor 236, camera system 226, or a combination of these, is that the maximum and average intensities should be maintained at levels which are generally as low as reasonable to convey the required information so that the subsequent ability of operator 222 to discern and respond to dimly lit images is not unnecessarily compromised. This is particularly important if a child or pet is hidden in shadows in an otherwise brightly illuminated scene.

The intensity of camera system 226 may be adjusted in inverse proportion to the camera sensitivity setting. The integration time calculated in processor system 230 forms the basis for determining the brightness setting. A lookup procedure can then be used to convert the integration time to a brightness setting based on display type, display mounting relative to operator 222, vehicle 200 lighting conditions, and other factors. A modification would use averages of integration times to stabilize brightness settings.

The intensity of display system 232 may also be leveled off to a minimum threshold at approximately the light level for which the integration period is at a maximum (i.e., camera system 226 is at maximum sensitivity). Under these conditions, scene 224 is likely to be dimmer than operator 222 can see in a normal mirror so that the displayed image may be enhanced over levels which would otherwise approximate the brightness of the scene being imaged.

Still another feature can be used when the lights of a trailing vehicle are adding significantly to the average rearward light level. Camera system 226 will be adjusted for lower sensitivity and, under the method of the first improvement, display system 232 will therefore be set to a higher intensity level. This higher intensity level may be too high for the forward ambient light level to which the eyes of operator 222 have become adjusted. To compensate, a second average light level is calculated omitting the values from brighter pixels. The second average is compared to a first average of all pixels and, if the second average is substantially lower than the first average, the display intensity may be reduced to correspond more nearly to the level obtained when the bright light sources are not included.

The intensity of display system 232 may be controlled using a non-linear approach based on output from camera system 226 with a dual integration architecture. Control logic 284 forms a number from the data value and range (short or long integration time) indication. This number is used as an index into a lookup table to obtain the display intensity setting. The magnitude of the intensity output for the condition where strong brightness is present should be an approximately logarithmic function of the magnitude of camera system output signal 268 brightness.

The intensity of display system 232 may alternatively or additionally be controlled using frame-based image processing. Various regions of a frame are examined and the local intensity is adjusted based on localized spatial characteristics of the scene. For example, brightness levels in brighter zones may be scaled down. Also, areas surrounding bright lights might be compressed differently and more severely than other areas in the image. Also, if an analysis shows the lighting to be very flat, particularly when headlamp glare is not present, the compression may be eliminated or brightness expansion may be used to increase contrast and help definition of detail.

The intensity of display system 232 may alternatively or additionally be controlled using ambient light signal 296 from forward facing ambient light sensor 234. The eyes of operator 222 are adapted mainly to the average light level within a generally forward facing field of view. A time average of ambient light signal 296 may be used to provide an indication of the ambient level seen by operator 222. Ambient light signal 296 may be used in place of or in addition to sensitivity settings of camera system 226 to program the average intensity of display system 232 between a minimum threshold at low ambient light levels and a high threshold for high ambient light levels. The use of forward facing ambient light sensor is described in U.S. Pat. No. 4,917,477, the entire disclosure of which is incorporated herein by reference.

The intensity of display system 232 may alternatively or additionally be controlled using glare signal 298 from direct glare sensor 236. Direct glare sensor 236 is placed so as to sense light levels falling on display system 232 which may be excessive relative to the prevailing ambient light condition. With display 100 incorporated in rearview assembly 10, a glare sensor 236 in rearview assembly 10 is particularly suitable for this purpose. The intensity of display system 232 may be increased from the otherwise normal level when these conditions are present to prevent washout.

The control logic 284 may additionally determine that the glare signal 298 and ambient light signal 296 are sufficiently different in amplitude under certain lighting conditions such that an output signal is provided to an indicator or external control device that might be used to warn a potential user of the system. Such a case might occur when operating the system in a vehicle moving in reverse from a dimly lit garage to a bright daylight environment. In this case, the rear-facing camera may or may not have the necessary dynamic range to properly reproduce the scene both near (dark) and far (bright) from the vehicle's bumper. It may be beneficial, therefore, to provide a warning to the vehicle operator to double-check the vehicle surroundings for obstacles. This warning may be accomplished through a static indicator light 299 or other means external to the system described.

In addition the display brightness could be controlled by a dedicated sensor 238 (FIG. 1C) facing rearward in the vehicle. As shown in FIG. 2, this sensor 238 would have a field of view 238a between 3 degrees to 25 degrees inclusive to ensure complete sensing for all the mirror mounting positions from various drivers. This sensor either in collaboration with the ambient light sensor or as a stand alone sensor would measure the amount of light incident upon the glass and/or the display to control electrochromic dimming to increase the contrast ratio between the LCD display and the reflective surface of the mirror. The sensor field of view can be achieved with the sensor alone or with the sensor in combination with a secondary optical lens as disclosed in U.S. Patent Application Publication No. US 2005/0024729 A1, the entire disclosure of which is incorporated herein by reference.

The optical axis of the sensor could be tilted to compensate for the mirror mounting angles as set by drivers to better detect the light incident on the face of the mirror from the drivers angle. The variation in optical axis can be achieved in the optical design of the sensor itself. This variation can also be achieved by mechanically altering the orientation of the sensor in relation to the mirror element, such as using the leadframe of the device to introduce a tilt to the sensor. Another mechanical means of altering the optical axis of the sensor is mounting the sensor on a dedicated printed circuit board (PCB) and mounting this circuit board at an appropriate orientation. Another method is coupling the sensor with a secondary optical lens that will alter the optical axis of the sensor. This secondary lens could also be used to further tune the horizontal and vertical field of view of the sensor.

In addition, the sensor could be placed behind a transflective element to reduce the dynamic range needed to implement this application. Additionally, another neutral density filter could be used in conjunction with the sensor/transflective element or with the sensor alone to accomplish the same end. The neutral density filter could be a film type commonly available from filter manufactures or the filtering effects could be achieved by injection molding a thermoplastic material. Further, the aforementioned secondary lens could be molded out of a neutral density thermoplastic material to achieve the necessary dynamic range.

The location of the dedicated sensor can greatly affect its detection characteristics. Small rear windows, rear pillars, headrests and center high mounted stop lamps (CHMSL) can all greatly influence the amount of light detected by the sensor's narrow field of view. Because of this, the sensor's location should be very near the LCD display. The rear seat headrests and rear sheet metal pillars are the greatest concern for sensor obstruction. These features tend to be located on the outer edges of the mirrors field of view. Because the LCD display is generally located on the outer edges of the mirrors field of view, these obstructions can greatly influence the amount of ambient light impressed upon the LCD viewing area. Considering this, the optimal location of dedicated sensor 238 is the inside edge of the LCD display as shown in FIG. 1C. This area is generally not obstructed by the other features in the vehicle. Placing the dedicated sensor on the outboard edge is not desirable because the sensor could easily obstructed, creating a condition where the element might not dim when additional contrast is required. Additionally, the sensor could be located in the decorative bezel 555 (FIG. 1A) directly above or below the display.

This dedicated sensor system could additionally be used to improve the electrochromic dimming performance at sunrise and sunset conditions. It is very challenging to control the mirror's dimming state when a vehicle is driving into a relatively dark sky with a bright sunrise or sunset in the rearview image of the mirror. This third sensor 238 could be used either in collaboration with the ambient light sensor 234 and/or glare sensor 236 or stand alone to appropriately adjust the amount of EC dimming required for this driving situation.

Another technique for varying the intensity of display system 232 does not require extensive calculations and may be used as a stimulus to alter the intensity of display system 232. When proportions of saturated and dark pixels are both small, an image of lower contrast is indicated and a lower degree of compression or expansion may be used.

Yet a further method for stimulating the modification of display system 232 intensity is to estimate or determine the standard deviation of brightness over the image frame.

Image brightness detector 274, display pixel luminance mapping control 276, and control logic 284 are closely related. Either or both of detector 274 and luminance mapping control 276 may be partially or completely merged into control logic 284. Further control logic 284 may modify camera system output 268 prior to use in either detector 274 or luminance mapping control 276. This modification could include filtering and feature extraction.

Referring again to FIG. 9, display system 232 is further described. Display signal 282 from display interface 280 is fed to display 100. Display rays 204, generated by display 100, pass through optional display variable attenuation filter 206 and emerge as filtered display rays 208. Filtered display rays 208 representing scene 224 are viewed by operator 222. If optional display attenuating filter 206 is used, the amount of attenuation is controlled by display attenuation control 210 through display attenuation filter signal 212.

Many displays do not have the brightness range necessary to cover a good dynamic range within one frame in addition to a very large total brightness range for use in ambient light conditions which range from darkness to bright sunlight. To reduce the requirements on display 100, a display variable attenuation filter 206 may be used. In the preferred embodiment, attenuation filter 206 is implemented with an electrochromic window. The attenuation filter is controlled by processor system 230 through display attenuation control signal 214. A method for controlling filter 206 is described in more detail in commonly assigned U.S. Patent Application Publication No. 2003/0103141 A1, the entire disclosure of which is incorporated herein by reference.

Control of the intensity of display system 232 may be done solely with display attenuation filter 206, with control of display 100 backlight brightness, LCD display transmission, or with a combination of any or all of these techniques.

To compensate for variations in preferences of individual operators, a manual brightness adjustment 216 can be included. Manual brightness signal 218 is used by processor system 230 to modify calculated brightness levels. Optionally, a brightness control built into display 100 may be used as a supplement or alternate to display pixel luminance mapping control 276. However, some automatic brightness adjustment is likely to still be desired to meet the widely varying requirements of vehicle ambient lighting conditions.

In addition to controlling the brightness of rays 204 from display system 232, it may be desirable to control the color in low-light conditions. Studies have indicated that blue light is more disruptive than red light to human night vision. If display 100 has full or partial color, it may be advantageous to modify the color balance in rays 208 observed by operator 222 in low ambient light conditions. One method is to vary the color balance of display 100 so as to shift displayed color away from the shorter blue wavelengths. Another method is to provide a blue blocking filter in display variable attenuation panel filter 206 such that, as the amount of attenuation increases in filter 206, the shorter wavelength visible light is attenuated to a greater extent than longer wavelength visible light. Both methods may be implemented in the same system. Additionally the backlight of the LCD could be changed. The backlight could be a tri-color or other combination of discrete spectrum light sources. This way the display could be shifted entirely to red in order to preserve night vision.

The system described in FIG. 9 may be implemented as hardware, software, or a combination of both. Also the video processing can be done as a combination of analog circuitry with digital control. Signal paths may be implemented as discrete wiring, optical cabling, buses, and other channels and mediums as is well known in the art. Buses may be implemented as serial or parallel connections, and various buses may be combined. Furthermore, elements described may be combined or further partitioned within the spirit and scope of this invention.

As described in more detail in commonly assigned U.S. Patent Application Publication No. 2003/0103141 A1, the entire disclosure of which is incorporated herein by reference, the camera exposure may be adjusted so that, when adequate light is available, the image exposure is generally made as high as possible just short of saturating an undesirable high number of the pixel illuminance readings. This has the advantage of providing the greatest resolution for pixels in the readout range of the camera and also of clipping the often over-bright light levels from pixels which are saturated. For example, enough saturated pixels would normally be tolerated to allow the saturation of the very few pixels on which the image of the headlamps of a trailing vehicle have been projected.

If all of the camera pixel illuminance levels were mapped to the display when the scene itself does not posses a very high contrast, the contrast of the displayed scene would be very low and detail would be lost, appearing "washed out" on the display. Thus, the available mapping function with the highest contrast which spans the range from the lower illuminance pixels to the highest non-saturated pixel readings should be used. The available mapping functions should, in turn, include a reasonable range of contrast levels without being so extreme on either the high or low contrast ends of the scale so as to yield display images which are more difficult rather than easier to interpret.

The present invention may be used either with a black and white camera or with a color camera, in which case the encoding may be of the type for which the camera pixel illuminance and display pixel luminance are indicated by one component of the video signal and the color by other components. In this form, the processing described above is applied to the illuminance component from the camera and the color components may be left unaltered.

Note that, where possible with the exemplary display, the full brightness range is used to show variations of illuminance within the scene. Even then, the wide dynamic range of the camera may be compressed. It may be undesirable to additionally use the pixel luminance control to vary the overall display intensity over the wide range desired for viewing over the huge range in ambient light level encountered in driving. Thus, the primary control of the overall display brightness is handled by other methods which may include variation in back lighting intensity for a transmissive display, such as that discussed above, or by use of a variable attenuation filter 206 for the display. These methods along with others may be used separately or in combination, in which case the processor determines the cumulative effect and apportions display control signal 202 and display attenuation control signal 214 accordingly to achieve the required viewing brightness of the display. This does not rule out use of pixel luminance to control the brightness but only emphasizes the fact that most displays do not have the dynamic range to adequately combine control of both the scene luminance range and the overall luminance level of the display into the one controlling mechanism.

For display variable attenuation filter 206, the camera exposure control in combination with image brightness detector 274 and display pixel luminance mapping control 276 serve to maintain the display at a relatively stable luminance level until the scene is so dark that the camera can no longer detect large portions of the scene. Thus, the function of display brightness control is primarily to vary the overall brightness to match the display brightness to the ambient light conditions. The best measurement of the ambient light level is obtained from ambient light sensor 234 which is positioned to view essentially the same field that the driver normally sees. Thus, the ambient light sensor provided in a rearview assembly is a particularly suitable location. This light level is preferably subjected to a time average of, for example, 15 seconds to derive the stabilized ambient light level used to determine the required display brightness.

When mirror element 30 is an electrochromic mirror element, the electrochromic medium will change from a colorless medium to a colored medium. Accordingly, it may be advantageous to adjust the hues of the displayed image to compensate for any coloration imparted on the image by the electrochomic medium. Thus, by providing control logic 284 with the signal provided to the electrochromic mirror element, control logic may anticipate color changes of the electrochromic medium and adjust the hues of the displayed image. Such a hue adjustment may be made by sending a control signal to the camera system 226, which can independently adjust the gains on the RGB color channels provided by the camera system 226. Alternatively, the color adjustment may be performed in processor system 230 or in display system 232.

Processing system 230 may be wholly or partially incorporated with the camera system 226 or the display system 232, split amongst the camera and display systems, or provided separate from the camera and display systems. Processing system 230 may perform various tasks such as: de-warping/fisheye correction of the image; contrast enhancement; edge recognition of objects in the image; image sharpening; color processing to correct color; high dynamic range synthesis to preserve image detail; color/audible warning on various events (such as detection of certain objects); detecting when the camera is blocked or obstructed and providing an indication to the driver; and/or picture-in-picture processing. Such processing tasks may be performed in a camera module or in a display module that may be incorporated in a rearview assembly.

The images captured by the camera(s) may alternatively or additionally be used for other purposes. For example, the images may be processed for collision avoidance, lane departure warning, headlamp control, traffic sign recognition, pedestrian crossing detection, or detecting objects in or around the vehicle. Also, the images may be fed to a black box for storage and subsequent retrieval. If used for lane departure, the camera(s) may be rearward-facing, forward-facing or both.

Processing system 230 may also receive input from various other sensors such as ultrasonic back up sensors or radar to provide a back-up warning if an object is within the path of the vehicle. In such a case, the warning may be provided in the rearview assembly, by selective activation of an indicator symbol overlayed in the displayed image. The warning may also be provided by changing the tint of the displayed image to a red color or the like.

Other graphic overlays are possible including showing the relative distances to objects in the scene, showing a graphic image of the perimeter of the vehicle superimposed on the scene, showing one or more lines indicating a projected path of vehicle travel through the displayed scene, disclaimer language such as "objects in the mirror may be closer than they appear", diagnostic information (for example, if no video the display may be blue), audio system information, turn-by-turn navigation instructions, other navigation, climate control, tire pressure information, vehicle performance information, trip computer information, points of interest, and compass heading and outside temperature.

Connection between the various components of the system shown in FIG. 9, may be by any one combination of wired, wireless, analog, digitial, and fiber optic.

Other schemes for controlling camera system 226 and display 100 are disclosed in commonly assigned U.S. Pat. No. 6,550,949, the entire disclosure of which is incorporated herein by reference.

In a preferred embodiment, the intensity of the display device 100 is varied by automatically controlling the intensity of the backlighting as a function of an ambient light sensor, a glare light sensor or both the glare light sensor and the ambient sensor. The output of camera system 226 may also be used to determine an ambient light level (e.g., by averaging some or all of the outputs of the pixels) that may be used not only to control the display intensity, but also to control the reflectivity of the mirror element. When the display is positioned behind an automatically dimming electro-optic mirror element, the display backlighting intensity is preferably a function of the reflectivity of the automatically dimming element in addition to, or in lieu of, the ambient and, or, glare light sensor. The intensity of the backlighting may be incrementally controlled in a series of discrete steps, substantially continuous or a combination thereof as a function of the parameters mentioned above. A daytime intensity function may be different than a night time intensity function. A useful intensity control algorithm is described in commonly assigned U.S. Pat. No. 6,700,692, the entire disclosure of which is incorporated herein by reference.

In a preferred embodiment, the backlighting will be automatically controlled such that between approximately 250 and approximately 2000 cd/m$^2$ is emitted from the first surface of the associated element during day light conditions and between approximately 10 and approximately 200 cd/m$^2$ is emitted during dark, or night time, conditions. Most preferably, approximately 1500 cd/m$^2$ is emitted from the first surface during day light conditions and approximately 15 cd/m$^2$ is emitted during night time conditions.

Although one embodiment has been described to have nine LEDs, more or fewer LEDs may be used without deviating from the scope of the present invention. It should be understood that radiation emitters other than LEDs may be used for backlighting, such as, incandescent lights, light emitting polymers, light emitting plasmas and gas discharge lamps. Additionally, through hole LED mounting may be used in lieu of surface mount technology. It should be understood that lighting may be positioned at an edge, or edges of the LCD such that the LCD is sidelit or "light pipes" may be added to redirect the light from the edge to the back of the LCD. The display backlighting may be mounted on a side of a circuit board opposite the side of the circuit board the display is mounted with holes through the circuit board aligned with the backlighting such that light rays emitted by the backlighting passes through the associated hole in the circuit board. The LEDs may also include, either as separate components or as additional LED chips within the illustrated LEDs, infrared (IR) emitting LEDs. Such LEDs may be activated to pre-heat the LCD. Thus, the IR LEDs may be activated prior to vehicle ignition, such as, for example, when a door unlock signal is received from a keyfob. In addition, a defroster may be provided in front of any one or more of the cameras of the vehicle and such defrosters may also be activated upon receipt of a door unlock signal is received from a keyfob. This clears the field of view for the cameras of fog or frost as soon as possible.

One advantage associated with using LCDs is the associated ability to reconfigure the information being displayed via software in a related controller and/or display driver. Utilizing a display driver with excess capacity in combination with a backlit LCD and multicolor backlighting such as red/green/blue, or bluegreen/amber, provides the ability to change color as well as change the actual information. In one embodiment, graphics overlays may be generated over the image of the scene 224 or generated adjacent the image of the scene and be incorporated with multicolor backlighting to produce a display with the ability to flip, or scroll, through various information as well as having various colors and/or flashing. This embodiment is applicable to warning type displays; for example low fuel, door ajar, engine over temperature, etc.; wherein the information display is normally not illuminated, or is displaying other information, and then automatically displays the warning information upon the occurrence of a programmed threshold or in response to a sensor input, as well as to other informational displays such as temperature, clock and compass displays.

As shown in FIG. 9, control logic 284 may also receive input from the vehicle bus including a vehicle reverse indicating signal, which indicates when the vehicle has been placed in reverse. If the display is being used as a back-up assist, control logic 284 may respond to this signal by activating display 100 as it may not always be desirable to have the display activated in forward or other gears. If the display is a full-time rear vision system that displays a rearward view all the time, control logic 284 may respond to the reverse signal by either switching to a view from a back-up assist camera (which may be a different camera aimed downward immediately behind the vehicle) or going to a picture-in-picture mode to show the image from the back-up assist camera. The display may remain activated so long as the vehicle is in reverse gear or may be deactivated after a predetermined time period of, for example, five minutes. This time period may be reset each time the vehicle is placed in reverse so as to keep the display on in the event someone is trying to hook up a trailer. Alternatively, the time the display is on may be based on the number of times the mirror is cycled in and out of reverse in a given time frame. If there is a concern that hackers might cycle the vehicle in and out of reverse to keep the display on, one may wish to discourage such hackers by adding a hardware circuit that initially charges a capacitor the first time the vehicle is in reverse over a given time frame or while the display is on. This way, the charge on the capacitor can be used to time out the display regardless of how many times the vehicle has been placed in reverse. In other words, control logic 284 may determine after a reset that the capacitor is still charged and thus it will know that the vehicle has only been taken out of reverse for an instant and would not restart the display time period.

Another desirable functionality would be to have a mechanism for allowing the system to go into a diagnostic mode following a series of certain customer actions. During the diagnostic mode, the display may be turned on for a given time. This would help stop returns of the system for problems not related to the display or mirror assembly, such as problems with the camera or wire harness.

The camera system 226 may include one or more cameras. Such cameras may provide a stereoscopic view. Also, one or more of the cameras could have different lens options, that may be installed or dynamically varied in use. The camera(s) may use a simple lenses or multi-element lenses. Diffractive optics may also be used on the cameras. In addition, a hydrophobic coating may be provided on the outside of a protective window in front the camera(s). Although the various features of the present invention have been discussed above with respect to cameras that provide either full time rear vision or back-up assist images, the camera(s) may be mounted and aimed in different/additional directions. For example, the camera may be aimed to view the interior of the vehicle, aimed forward of the vehicle, or aimed along or out towards the side of the vehicle. Additionally, the side mirror assemblies may be configured with a display to supplement or replace the sideview mirrors. The camera(s) may be infra-red (IR)/night vision camera(s).

Figure 10:
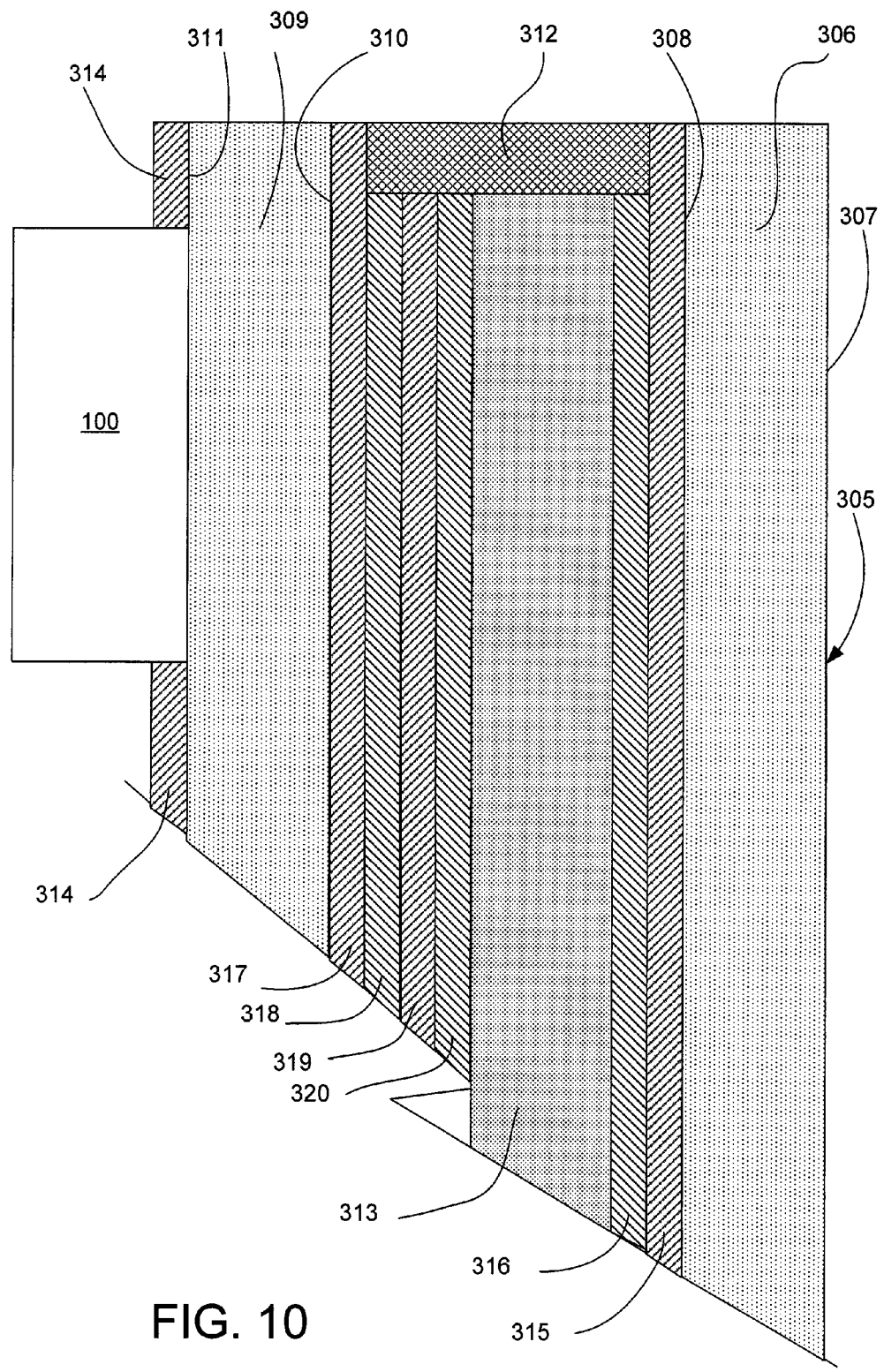
FIG. 10 is a cross-sectional view of a portion of an electro-optic mirror element that may be utilized in the rearview assembly shown in FIGS. 1A-1D.

Turning now to FIG. 10, display 100 is depicted in relation to an electro-optic mirror element 305. Element 305 is shown to comprise a first substantially transparent substrate 306 and a second substantially transparent substrate 309 in a spaced apart relationship with seal 312 positioned therebetween near the perimeter to define a chamber containing electrochromic medium 313. As further depicted in FIG. 10, first substrate 306 comprises a first surface 307 and a second surface 308. Second surface 308 is coated with a first layer 315 and a second layer 316 of materials to form a substantially transparent electrically conductive coating on the second surface. With further reference to FIG. 10, second substrate 309 is depicted to have a base layer 317, a conductive layer 318, a transflective layer 319 and an optional flash layer 320 defining a coating on the third surface 310.

In one embodiment, the electro-optic mirror element 305 comprises a base layer 317 of silicon (Si) that is approximately 120-150 Å, a conductive layer 318 of ITO that is approximately 200-250 Å and a transflective layer 318 of a gold-silver alloy (approximately Ag7%/Au93%) that is approximately 250-300 Å; there is no flash layer 320. Another embodiment has a conductive layer 318 of ITO that is approximately 600-800 Å and a transflective layer 318 of a gold-silver alloy (approximately Ag7%/Au93%) that is approximately 250-300 Å; there is no flash layer 320. It should be understood that a single layer may be employed or additional layers may be added on third surface 310 without deviated from the scope of the present invention. In this embodiment, a second ITO layer may be disposed over the transflective layer 318 to serve as flash layer 320 in which event transflective layer 318 may be made of silver rather than a silver alloy. Such a layer stack is known as an IMI stack.

In another embodiment, the element 305 comprises only a first layer 315 of indium tin oxide (ITO) that is approximately 1500 Å applied to the second surface 308; there is no second layer 316. It should be understood that a single layer may be employed or additional layers may be added on the second surface 308 without deviated from the scope of the present invention. It should be understood that some or all layers may cover substantially the entire associated surface while other layers will not extend to the surface under and/or beyond the associated seal.

The fourth or rearmost surface 311 of substrate 309 is depicted in FIG. 10 to comprise a substantially opaque material 314 thereon. In a preferred embodiment, material 314 is a substantially opaque shatterproof tape P/N 637-0152 available from Action Fabricators, Kentwood, Mich. A portion of material 314 is removed to define an information display area corresponding to display 100. It should be understood that a substantially opaque paint, epoxy, or other suitable material may be used for material 314. The substantially opaque material functions to mask portions of the mirror element 305 from transmitting light rays there through other than in the information display area(s). It should be understood that multiple display areas may be defined by removal of additional sections of material 314.

It should be understood that any of the layers 317, 318, 319, 320 may be applied to the fourth surface 311 in lieu of, or in addition to, being applied to the third surface 310. In one embodiment, a transflective layer 319 is applied to the fourth surface 311 and then covered with a protective coating of lead-based paint to prevent oxidation. The third surface comprises a substantially transparent conductive layer 318. Optionally, the third surface may comprise a base layer 317 and, or, a flash layer 320. It should be understood that this "fourth surface reflector", reflective element, may comprise more or fewer layers in accordance with the scope of the present invention.

Although display 100 may be configured as an effective full color display to display light over the entire visible spectrum, display device 100 may be configured to emit light within two or more discrete wavebands that mix to form other colors including white, or that emit light in a single band. By emitting light in two or more bands to obtain a mix of the two or more colors, the display may be configured to more efficiently emit light through an electrochromic medium, that would otherwise absorb a significant amount of light in a particular waveband emitted from the display (see, for example, commonly assigned U.S. Pat. No. 6,700,692, the entire disclosure of which is incorporated herein by reference). The display may also be monochromatic such as black and white.

Display 100 may be configured to emit light rays with a predominant wavelength of approximately 630 nm and the element is optimized to transmit wavelengths of approximately 630 nm and/or more in the red spectrum than in the blue spectrum. Certain embodiments may employ reflective elements that have transmission characteristics that are not optimally matched to the given information display. However, in other embodiments the transmission characteristics of the element will be optimized to transmit greenish (approximately 480 to approximately 520 nm), green (approximately 500 nm), bluish (approximately 460 to approximately 480 nm), blue (approximately 475 nm), bluegreen (approximately 485 nm), yellow (approximately 570 nm), yellowish (approximately 520 to 590 nm), white (wavelengths falling substantially on a blackbody curve from approximately 3000 to 20,000), amber light (approximately 580 nm), approximately 380 to approximately 460 nm or approximately 620 to approximately 780 nm.

Mirror element 30 may be optimized by selecting specific layers 315, 317, 318, 319 to transmit light rays of a predetermined spectral band that is matched to the predominant wavelength of light emitted from the display 100. It should be understood that a single layer on the second surface 308 and a single layer on the third surface 310 may be employed or additional layers may be added to either surface without deviating from the scope and spirit of the present invention.

Transparent electrodes made of ITO or other transparent conductors have been optimized at thicknesses to maximize the transmission of visible light (typically centered around 550 nm). These transmission optimized thicknesses are either very thin layers (<300 Å) or layers optimized at what is commonly called ½ wave, full wave, 1½ wave, etc. thickness. For ITO, the ½ wave thickness is about 1400 Å and the full wave thickness is around 2800 Å. Surprisingly, these thicknesses are not optimum for transflective (i.e., partially transmissive, partially reflective) electrodes with a single underlayer of a transparent conductor under a metal reflector such as silver or silver alloys. The optimum thicknesses to achieve relative color neutrality of reflected light are centered around ¼ wave, ¾ wave, 1¼ wave, etc. optical thicknesses for light of 500 nm wavelength. In other words the optimal optical thickness for such a layer when underlying a metal reflector such as silver or silver alloy is $(m*\lambda)/4$, where $\lambda$ is the wavelength of light at which the layer is optimized (e.g., 500 nm for example) and m is an odd integer. These optimum thicknesses are ¼ wave different from the transmission optima for the same wavelength. Such a single layer may have a thickness of between 100 Å and 3500 Å and more preferably between 200 Å and 250 Å, and a sheet resistivity of between about 3Ω/□ and 300Ω/□ and preferably less than about 100Ω/□.

Referring again to FIG. 10, a chamber, as defined by the first substantially transparent substrate 306, the second substantially transparent substrate 309 and an inner circumferential wall of seal 312, contains an electrochromic medium 313. Electrochromic medium 313 is preferably capable of selectively attenuating light traveling there through and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium 313 preferably includes electrochromic anodic and cathodic materials that can be grouped into the following categories:

Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912; U.S. Pat. No. 6,188,505; U.S. Pat. No. 6,262,832; U.S. Pat. No. 6,137,620; U.S. Pat. No. 6,195,192; U.S. Pat. No. 6,392,783; and U.S. Pat. No. 6,249,369 disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled or International Patent Application No. PCT/US98/05570 the entire disclosures of which are incorporated herein by reference.

At least three electroactive materials, at least two of which are electrochromic, can be combined to give a pre-selected color as described in U.S. Pat. No. 6,020,987 the entire disclosure of which is incorporated herein by reference. This ability to select the color of the electrochromic medium is particularly advantageous when designing displays with associated elements, particularly since the electrochromic medium may be configured to not absorb light within the wavelengths emitted from the display.

The anodic and cathodic materials can be combined or linked by a bridging unit as described in International Application No. PCT/WO97/EP498, the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 U.S. Pat. No. 6,002,511, or International Patent Application No. PCT/US98/05570 the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201. The entire disclosure of this U.S. patent is incorporated herein by reference.

First and second substantially transparent substrates 306 and 309 may be any material which is transparent and has sufficient strength to be able to operate in the environmental conditions to which the device will be exposed. Substrates 306 and 309 may comprise any type of borosilicate glass, soda lime glass, float glass, or any other material, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. Elements 28 and 30 are preferably made from sheets of glass.

Additionally, substrates 306 and 309 may be treated or coated as is described in U.S. Pat. No. 6,239,898, U.S. Pat. No. 6,193,378, and U.S. Pat. No. 6,816,297, the entire disclosures of which are incorporated herein by reference. Other treatments, such as anti-reflectance coatings, hydrophilic coatings, low-E coatings, and UV-blocking layers are also envisioned. Also, such coatings may be applied to elements 306 and 309 in this and other embodiments. Of particular interest is the application of an anti-reflective coating to first surface 307 to reduce secondary reflections from the first surface and thus improve the perceived contrast ratio of the display 100.

Commonly assigned U.S. Pat. Nos. 5,940,201, 6,193,379, 6,195,194, 6,246,507, and U.S. patent application Publication No. 2004/0061920 A1, the disclosures of which are incorporated in their entireties herein by reference, describe a host of reflective elements for use with the present invention. It should be understood that the specific reflective element configuration as depicted in FIG. 10 is one embodiment and that a plurality of embodiments are disclosed herein and in the references incorporated herein by reference.

Suitable materials for use as layers 315, 316, 317, 318, 319, and 320 are disclosed in commonly assigned U.S. Pat. Nos. 6,356,376, 6,512,624, 6,512,624, and 6,700,692; the disclosures of which are incorporated in their entireties herein by reference.

In at least one preferred embodiment, the element is designed to be preferentially transmissive with regard to a narrow band of wavelengths of light. U.S. Pat. Nos. 5,619,375, 5,619,374, 5,528,422, 5,481,409, D363,920, 5,361,190, 5,355,284, 5,207,492, 5,128,659, 5,014,167 and 5,005,009, the disclosures of which are incorporated herein in their entireties by reference, describe a host of single band pass elements for use with the present invention.

Mirror element 305 may be designed to be preferentially transmissive with regard to more than one narrow band of wavelengths of light. In one embodiment, an element comprises twelve layers of materials is provided. The first layer is titanium-oxide ($TiO_2$) approximately 599 Å thick, the second layer is silicon-oxide ($SiO_2$) approximately 1066 Å thick, the third layer is titanium-oxide ($TiO_2$) approximately 235 Å thick, the fourth layer is silicon-oxide ($SiO_2$) approximately 262 Å thick, the fifth layer is titanium-oxide ($TiO_2$) approximately 1560 Å thick, the sixth layer is silicon-oxide ($SiO_2$) approximately 727 Å thick, the seventh layer is titanium-oxide ($TiO_2$) approximately 487 Å thick, the eighth layer is silicon-oxide ($SiO_2$) approximately 926 Å thick, the ninth layer is titanium-oxide (TiO$_2$) approximately 546 Å thick, the tenth layer is silicon-oxide (SiO$_2$) approximately 1625 Å thick, the eleventh layer is titanium-oxide (TiO$_2$) approximately 892 Å thick, and the twelve layer is silicon-oxide (SiO$_2$) approximately 985 Å thick. This stack of layers is optimized to transmit two narrow bands of light ray wavelengths, the first at approximately 490 nm (Blue-Green spectrum) and the second at approximately 655 nm (Amber spectrum). Preferably, this dichroic stack is applied to the fourth surface 311 of element 305, however, it should be understood that a layer 320 of a substantially transparent conductive material may be applied as a thirteenth layer and the stack may be applied to the third surface 310. Also, it should be understood that this stack may be applied to an element comprising a single substantially transparent substrate on either the first or second surface 307, 308, respectively.

In another embodiment, mirror element 305 may comprise fourteen layers of materials is provided. The first layer is titanium-oxide (TiO$_2$) approximately 345 Å thick, the second layer is silicon-oxide (SiO$_2$) approximately 979 Å thick, the third layer is titanium-oxide (TiO$_2$) approximately 485 Å thick, the fourth layer is silicon-oxide (SiO$_2$) approximately 837 Å thick, the fifth layer is titanium-oxide (TiO$_2$) approximately 2070 Å thick, the sixth layer is silicon-oxide (SiO$_2$) approximately 760 Å thick, the seventh layer is titanium-oxide (TiO$_2$) approximately 392 Å thick, the eighth layer is silicon-oxide (SiO$_2$) approximately 483 Å thick, the ninth layer is titanium-oxide (TiO$_2$) approximately 356 Å thick, the tenth layer is silicon-oxide (SiO$_2$) approximately 2620 Å thick, the eleventh layer is titanium-oxide (TiO$_2$) approximately 767 Å thick, the twelve layer is silicon-oxide (SiO$_2$) approximately 1460 Å thick, the thirteenth layer is titanium-oxide (TiO$_2$) approximately 509 Å thick and the fourteenth layer is silicon-oxide (SiO$_2$) approximately 905 Å thick. This stack of layers is optimized to transmit three narrow bands of light ray wavelengths, the first at approximately 465 nm (Blue spectrum), the second at approximately 545 nm (Green spectrum) and the third at approximately 655 nm (Red spectrum). Preferably, this dichroic stack is applied to the fourth surface 311 of element 305, however, it should be understood that a layer 320 of a substantially transparent conductive material may be applied as a fifteenth layer and the stack may be applied to the third surface 310. Also, it should be understood that this stack may be applied to an element comprising a single substantially transparent substrate on either the first or second surface 307, 308, respectively.

In yet another embodiment, a six layer stack of materials is provided comprising a first layer of titanium-oxide (TiO$_2$) approximately 600 Å thick, a second layer of Silver (Ag) approximately 27945 Å thick, a third layer of titanium-oxide (TiO$_2$) approximately 235 Å thick, a fourth layer of Silver (Ag) approximately 6870 Å thick, a fifth layer of titanium-oxide (TiO$_2$) approximately 1560 Å thick and a sixth layer of Silver (Ag) approximately 19063 Å thick. This stack of layers is optimized to transmit three narrow bands of light ray wavelengths, the first at approximately 490 nm (Blue spectrum), the second at approximately 550 nm (Green spectrum) and the third at approximately 655 nm (Red spectrum). It should be understood that this stack may be applied to the third of fourth surface 310, 311, respectively, of element 305. Also, it should be understood that this stack may be applied to an element comprising a single substantially transparent substrate on either the first or second surface 307, 308, respectively.

An advantage of applying a stack to an element that is preferentially transmissive in two or three narrow bands, especially in the R/G/B or Amber/Blue-Green combinations, is that the individual narrow bands of light wavelengths may be transmitted from LEDs to create a substantially white light appearance. Therefore, the described stacks function to transmit white light, as well as, reflect white light. In a related embodiment of an information display, the associated emitted light rays will be associated with one or more of the transmissive bands of the element.

In related embodiments, a high transmission of light may be transmitted while providing a high reflectivity. In one embodiment, a white light information display is provided by emitting either R/G/B or Amber/Blue-Green light, and the element will have a high broad band reflection characteristic. These embodiments are especially useful for vehicle rearview mirrors. It should be understood that other combinations of narrow band transmitting elements are within the scope of the present invention.

It should be understood that preferentially absorptive materials, such as iron-oxides, may be incorporated with any of the above stacks to enhance the overall transmission, reflection and ghosting preventive characteristics of a given element.

Because many light emitting displays, such as an LCD or any other display assembly mounted such that there is an air gap between surface 311 and the front surface of display 100, typically include at least one specular surface, light reflected back at the specular surface(s) of display 100 is reflected off the specular surface back through the associated element 305, transflective layer 319, electrochromic medium 313, layers 315, 316, 317, 318 and 320, and element 305. This spurious reflection off of the specular surface of display 100 may create a ghost image that is viewable by the vehicle occupants. Additional spurious reflections occur at the outer surface 307 of element 305 due to the differences in refractive indices of element 305 and the air surrounding the element. Thus, light rays are reflected back into the mirror from surface 308 and are subsequently reflected off of transflective layer 319 back though medium 313, layers 315, 316, 317, 318 and 320, and element 305. It is therefore desirable to implement various measures that eliminate or reduce the intensity of these spurious reflections and thereby eliminate the annoying ghost images that are visible to the vehicle occupants. Various modifications that may be made to reduce these spurious reflections. It should be noted that these spurious reflections are always lower in brightness than the nonreflected image.

One approach to improving the clarity of the display without eliminating spurious reflections is to control the display brightness such that the intensity of the secondary images are below the visual perception threshold. This brightness level will vary with ambient light levels. The ambient light levels can be accurately determined by light sensors in the mirror. This feedback can be used to adjust the information display and/or backlighting intensity so the secondary images are not bright enough to be objectionable. Anti-reflective means may be provided for reducing or preventing reflections from the specular surface and front surface 307 of element 305, may include an anti-reflective film applied to the rear surface of element 305 or to any and all specularly reflecting surfaces of display assembly 100. Anti-reflective means may also include a light absorbing mask applied to rear surface 311 or the specular surface of display assembly 100. Such a masking layer may be made to cover substantially the entirety of the specular surface, with the exception of those regions lying directly over a light emitting segment of display 100. The masking may be made with any light absorbing material, such as black paint, black tape, black foam backing, or the like. If the anti-reflective means is formed as an anti-reflective layer, substantially any known anti-reflective film may be employed for this purpose. The anti-reflective film need only be constructed to prevent reflections at the particular wavelength of the light emitted from display 100.

By providing anti-reflective means as described above, any light that is reflected back from transflective layer 319 toward the specular surface of display 100 is either absorbed or transmitted into display 100, such that it cannot be reflected from the specular surface through the element towards the eyes of the vehicle occupants. It should be noted that anti-reflective means may also include any other structure capable of reducing or preventing the reflection of light from the specular surface. Further, the anti-reflective means may include a combination of an anti-reflective film and a masking layer and may be incorporated on any specularly reflective surface that could reflect light reflected off an associated reflector, for example, either the back surface of substrate 309, the front surface of display 100, or any internal surface in display 100.

To reduce the spurious reflections from the air interface with surface 311 of element 305, an anti-reflective film may be provided on surface 311. The anti-reflective film may be formed of any conventional structure. A circular polarizer inserted between the transflective coating and the display is also useful in reducing spurious reflections.

An alternative solution to the problems relating to the reflection of light from display 100 off of transflective layer 319 and the specular surface of the display is that display 100 is preferably selected from those displays that do not include any form of specular surface. Examples of such displays are available from Hewlett Packard and are referenced as the HDSP Series. Such displays generally have a front surface that is substantially light absorbing, such that little if any light would be reflected off the forward-facing surface of the display.

Another example of a display construction that would not have a specularly reflecting surface (such as between glass and air) would be a back lit LCD that is laminated directly onto the back surface of the element 311 to eliminate the air gap or air interface between the display and the element. Eliminating the air gap is an effective means of minimizing the first surface reflection of all display devices. If the type of LCD used was normally opaque or dark such as with a twisted nematic LCD with parallel polarizers or a phase change or guest host LCD with a black dye, the reflected light would be absorbed by the display and not re-reflected back toward the viewer. Another approach would be to use a back lit transmissive twisted nematic LCD with crossed polarizers. The entire display area would then be illuminated and contrasted with black digits.

An alternative solution is whereby display 100 is mounted in back of rear surface 311 of element 305, such that the specular surface is inclined at an angle to rear surface 311. If the angle of the display is great enough, the beam could be directed toward an absorbing surface such as a black mask applied to the back of a mirror. It should be noted that, rather than angling the display, the reflected beam could be deflected by some other means such as by laminating a transparent wedge shape on the front of the display, the goal being to redirect the reflected light out of the viewing cone of the display or to an absorbing media or surface.

Another useful technique to reduce spurious reflections is to reflect the display image off of a mirror surface (preferably a first surface mirror) at about a 45° angle and then through the transflective layer 319. The image reflected off the transflective layer 319 can then be redirected away from the specular surfaces on the display by slightly angling the relationship of the display to the transflective layer.

It should be understood that any interfacing surface of a given component of a display may comprise an anti-reflective coating or the surfaces themselves may comprise anti-reflective textures. In a preferred embodiment, each surface of the diffuser, the LCD, the element and each layer with the element, or any subcombination thereof, may comprise anti-reflective materials or surface texture.

Preferably, a standard surface mount LED is used for the display backlighting, however, any of the illuminators disclosed in commonly assigned U.S. Pat. Nos. 5,803,579, 6,335,548, and 6,521,916 may be employed; the disclosures of each of these patents are incorporated in their entireties herein by reference. As shown herein, only nine LED devices are utilized. Prior displays had utilized upwards of 60 LED devices.

If an electro-optic mirror element 30 is utilized such as the electrochromic element 305, the mirror element transmission may be purposefully decreased during daylight hours to decrease the amount of ambient light that is reflected off of the transflective layer that would otherwise washout the displayed image and decrease the control contrast ratio. Although decreasing the transmission of the mirror element causes more of the light emitted from the display to be absorbed by the electrochromic medium, more than twice the amount of ambient light is absorbed as such reflected ambient light must pass through the electrochromic medium twice, while the light from the display only passes through once. In fact, the light is absorbed more as a square function of the distance through the electrochromic medium when it passes through twice, thus further increasing the contrast ratio of the light emitted from the display relative to the ambient light reflected from the mirror element. In other words, if the ambient light incident on the mirror has an intensity a, the intensity b of the ambient light reflected from the mirror will be $b=a \times (EC\ transmission)^2 \times (reflectance\ of\ transflective\ layer)$, whereas the intensity d of the display will be $d=c \times (EC\ transmission) \times (transmittance\ of\ transflective\ layer)$, where c is the intensity of light from the display that is incident on mirror element 30. Thus, by decreasing the EC transmission, the contrast ratio (d:b) may be increased. As mentioned above, in addition to adjusting the EC transmission, the backlight brightness can be adjusted to increase c, and thus d, and give additional control of the relative contrast ratio. Various techniques for improving contrast ratio of a display are disclosed in U.S. Pat. No. 6,700,692, the entire disclosure of which is incorporated by reference.

It is also possible to segment one or both of the two electrodes of the electrochromic mirror such that the area in front of the displayed image is separately dimmable relative to the rest of the mirror element. In this way, the area of the electrochromic mirror in front of the display may be separately dimmed to improve the display contrast ratio while not dimming the rest of the electrochromic element. To achieve this, the mirror element may be formed in a conventional manner, but before the two substrates are sealed together, at least one of them undergoes an etching procedure such as a laser etching, to etch the electrode coating around the perimeter of the display area so as to provide a break in the electrical continuity between the display area and the rest of the mirror area. In addition, the bus bar may be clipped at the etched juncture to allow power to separately be supplied to the two electrode areas provided on one or both of the substrates.

Other transflective layers that may be utilized include those disclosed in commonly assigned U.S. Patent Application No. 60/779,369, filed on Mar. 3, 2006, by William L. Tonar et al., and entitled "IMPROVED COATINGS AND REARVIEW ELEMENTS INCORPORATING THE COATINGS," the entire disclosure of which is incorporated herein by reference.

Yet another transflective layer that may be utilized is the polarized reflector layer such as that disclosed above or in commonly assigned U.S. Patent Application Publication No. 2006/0007550 A1, the entire disclosure of which is incorporated by reference. In this case, the transflective layer may be configured to permit the polarized light output from display 100 to be transmitted therethrough at nearly 100% transmittance, while reflecting substantially all light that is not polarized in the same polarization state as the LCD display 100.

Figure 12:
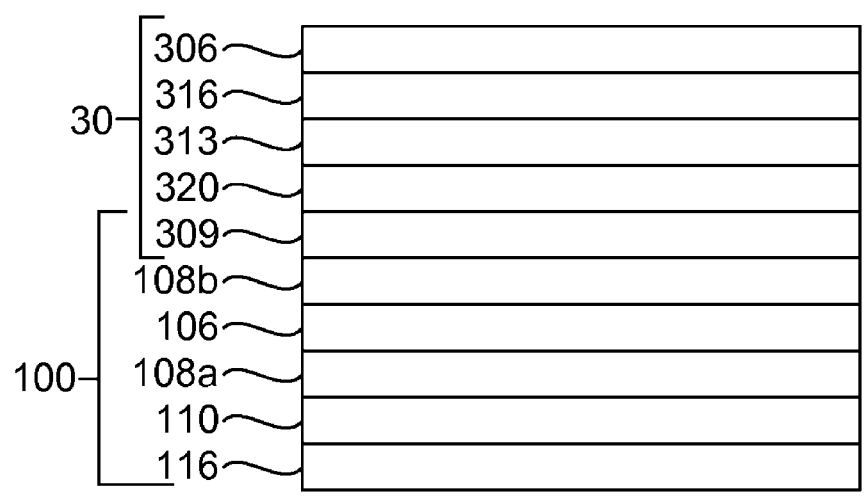
FIG. 12 is a cross-sectional view of a portion of an alternative display/mirror element construction that may be utilized in the rearview assembly shown in FIGS. 1A-1D.

FIG. 12 shows another embodiment of the present invention in which the mirror element 30 and the display 100 are formed as one integral structure. Specifically, the mirror element 30 and the display 100 share a common substrate. When the mirror element 30 is an electrochromic mirror element, the structure comprises from back to front, a backlight subassembly 116; a first substrate 110 having a front surface and a rear surface; a first electrode 108a; a liquid crystalline material 106; a second electrode 108b; a second substrate 309 having a front surface and a rear surface; a specularly reflective coating (310, 317, 318, 319, 320) applied to the front surface of the second substrate; an electrochromic medium 313; a third electrode 316; and a third substrate 306 having a front surface and a rear surface.

In addition to sharing a common substrate, the mirror element 30 and display may share a reflective polarizer 103b as a common functional element. Specifically, the front polarizer of an LCD may be replaced with a reflective polarizer, which could also serve to replace or supplement the reflector of the mirror element 30. Thus the reflective polarizer could be included in the display as the front polarizer, or may be included within the mirror element 30. It is also possible that the display and mirror element remain separate, but with either the mirror element including the reflective polarizer as a reflector and the display not including a front polarizer, or the mirror element may not include any reflector or a partial reflector while the display includes the reflective polarizer 103b as a front polarizer. Because typical LCDs come with a nonreflective front polarizer, one could modify the LCD by removing the nonreflective polarizer and replacing it with a reflective polarizer. If a reflective polarizer is incorporated into an LCD, it is possible that the reflective LCD may eliminate the need for any mirror element. In such a case, a non-reflective electrochromic element may be disposed in front of the reflective LCD if desired for attenuating glare light and for increasing contrast.

Turning back to FIGS. 1A and 2, a mirror assembly 10 is shown to comprise a bezel 555 and a case 556. The bezel and the case combine to define mirror housing 15 for incorporation of features in addition to mirror element 30 and display 100. Commonly assigned U.S. Pat. Nos. 6,102,546, D410,607, 6,407,468, 6,420,800 and 6,471,362, the disclosures of which are incorporated in their entireties herein by reference, describe various bezels, cases and associated button construction for use with the present invention.

As depicted in FIGS. 1A and 2, the mirror assembly may comprise one or more microphone assemblies 561. Examples of microphone assemblies for use with the present invention are described in commonly assigned U.S. Pat. Nos. 5,988,935 and 6,882,734, the disclosures of which are incorporated in their entireties herein by reference. As depicted in FIGS. 1A and 2, the microphone or microphones may be mounted on the top of the rearview assembly 10, although they may also be mounted on the bottom of the mirror assembly, on the backside of the mirror case, or any where within the mirror case or bezel. These systems may be integrated, at least in part, in a common control with display 100 and/or may share components with the display 100. In addition, the status of these systems and/or the devices controlled thereby may be displayed on the display 100.

With further reference to FIG. 1A, mirror assembly 10 may include first and second illumination assemblies 567, 571. Various illumination assemblies and illuminators for use with the present invention are described in commonly assigned U.S. Pat. Nos. 5,803,579, 6,335,548, and 6,521,916, the disclosures of which are incorporated in their entireties herein by reference. Most preferably there are two illumination assemblies with one generally positioned to illuminate a front passenger seat area and the second generally positioned to illuminate a driver seat area. There may be only one or may be additional illuminator assemblies such as one to illuminate a center console area, overhead console area or an area between the front seats.

With further reference to FIG. 1A, mirror assembly 10 may include first and second switches 575, 577. Suitable switches for use with the present invention are described in detail in commonly assigned U.S. Pat. Nos. 6,407,468, 6,420,800, 6,471,362, and 6,614,579, the disclosures of which are incorporated in their entireties herein by reference. These switches may be incorporated to control the illumination assemblies, the display 100, the mirror reflectivity, a voice activated system, a compass system, a telephone system, a highway toll booth interface, a telemetry system, a headlight controller, a rain sensor, etc. Any other display or system described herein or within the documents incorporated by reference may be incorporated in any location within the associated vehicle and may be controlled using the switches.

Mirror assembly 10 may further include first and second indicators 580, 583. Various indicators for use with the present invention are described in commonly assigned U.S. Pat. Nos. 5,803,579, 6,335,548, and 6,521,916, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

Mirror assembly 502 may include glare light sensor 236 and ambient light sensor 234. Preferred light sensors for use within the present invention are described in detail in commonly assigned U.S. Pat. Nos. 5,923,027 and 6,313,457, the disclosures of which are incorporated in their entireties herein by reference. The glare sensor and/or ambient sensor automatically control the reflectivity of a self dimming mirror element 30, 305 as well as the intensity of information displays and/or backlighting. The glare sensor 236 is used to sense headlights of trailing vehicles and the ambient sensor is used to detect the ambient lighting conditions that the system is operating within. In another embodiment, a sky sensor may be incorporated positioned to detect light levels generally above and in front of an associated vehicle; the sky sensor may be used to automatically control the reflectivity of a self-dimming element, the exterior lights of a controlled vehicle and/or the intensity of display 100. Preferably, the glare light sensor 236 and the ambient light sensor 234 are active light sensors as described in commonly assigned U.S. Pat. Nos. 6,359,274 and 6,402,328, the disclosures of which are incorporated in their entireties herein by reference. The details of various control circuits for use herewith are described in commonly assigned U.S. Pat. Nos. 5,956,012;

6,084,700; 6,222,177; 6,224,716; 6,247,819; 6,249,369; 6,392,783 and 6,402,328, the disclosures of which are incorporated in their entireties herein by reference. These systems may be integrated, at least in part, in a common control with display 100 and/or may share components with display 100. In addition, the status of these systems and/or the devices controlled thereby may be displayed on the display.

With further reference to FIG. 1A, mirror assembly 10 includes first, second, third and fourth operator interfaces 590, 591, 592, 593, 594 located in mirror bezel 555. Each operator interface is shown to comprise a backlit information display "A," "AB," "A1" and "12". It should be understood that these operator interfaces can be incorporated any where in the associated vehicle, for example, in the mirror case, accessory module, instrument panel, overhead console, dash board, seats, center console, etc. Suitable switch construction is described in detail in commonly assigned U.S. Pat. Nos. 6,407,468 and 6,420,800, as well as, commonly assigned U.S. Pat. Nos. 6,471,362 and 6,614,579, the disclosures of which are incorporated in their entireties herein by reference. These operator interfaces may control the illumination assemblies, the display, the mirror reflectivity, a voice activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 1A, it should be understood that fewer or more individual devices may be incorporated in any location within the associated vehicle and as described within the references incorporated herein.

FIG. 2 shows mounting structure 20, which includes housing 15 and mirror mount 20, and an accessory module 658. The mirror mount 20 and/or an accessory module 658 may comprise compass sensors, a camera, a headlight control, an additional microprocessor, a rain sensor, additional information displays, additional operator interfaces, etc. These systems may be integrated, at least in part, in a common control with display 100 and/or may share components with display 100. In addition, the status of these systems and/or the devices controlled thereby may be displayed on the display.

A compass sensor module may be mounted to a circuit board within housing 15 or accessory module 658, it should be understood that the sensor module may be located within mount 20, or at any location within an associated vehicle such as under a dash board, in an overhead console, a center console, a trunk, an engine compartment, etc. Commonly assigned U.S. Pat. Nos. 6,023,229, 6,140,933, and 6,968,273, as well as, commonly assigned U.S. Patent Application Publication No. 2004/0254727 A1, the disclosures of which are incorporated in their entireties herein by reference, describe in detail various compass systems for use with the present invention. These systems may be integrated, at least in part, in a common control with display 100 and/or may share components with display 100. In addition, the status of these systems and/or the devices controlled thereby may be displayed on display 100.

Mirror assembly 10 may comprise a controller, such as a microprocessor (not shown in FIGS. 1A or 2). The microprocessor may, for example, receive signal(s) from the compass sensor module and process the signal(s) and transmit signal (s) to the display to indicate the corresponding vehicle heading. As described herein and within the references incorporated by reference herein, the controller may receive signal(s) from light sensor(s), rain sensor(s) (not shown), automatic vehicle exterior light controller(s) (not shown), microphone (s), global positioning systems (not shown), telecommunication systems (not shown), operator interface(s) and a host of other devices, and control the display to provide appropriate visual indications.

The controller (or controllers) may, at least in part, control the mirror reflectivity, exterior lights, rain sensor, compass, information displays, windshield wipers, heater, defroster, defogger, air conditioning, telemetry systems, voice recognition systems such as digital signal processor based voice actuation systems, and vehicle speed. The controller (or controllers) may receive signals from switches and or sensors associated with any of the devices described herein and in the references incorporated by reference herein to automatically manipulate any other device described herein or described in the references included by reference. The controller may be, at least in part, located outside the mirror assembly or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6008,486; 6,130,421; 6,130,448; 6,255,639; 6,049,171; 5,837,994; 6,403,942; 6,281,632; 6,281,632; 6,291,812, 6,469,739; 6,399,049; 6,465,963; 6,621,616, 6,587,573; 6,653,614; 6,429,594; 6,379,013; 6,861,809; and 6,774,988, as well as U.S. Patent Application Publication Nos. 2004/0143380 A1 and 2004/0008410 A1, the disclosures of which are incorporated in their entireties herein by reference, may be incorporated in accordance with the present invention. These systems may be integrated, at least in part, in a common control with display 100 and/or may share components with the display. In addition, the status of these systems and/or the devices controlled thereby may be displayed on the display.

Moisture sensors and windshield fog detector systems are described in commonly assigned U.S. Pat. Nos. 5,923,027 and 6,313,457, the disclosures of which are incorporated in their entireties herein by reference. These systems may be integrated, at least in part, in a common control with display 100 and/or may share components with the display. In addition, the status of these systems and/or the devices controlled thereby may be displayed on the display.

Commonly assigned U.S. Pat. No. 6,262,831, the disclosure of which is incorporated herein by reference in its entirety, describes power supplies for use with the present invention. These systems may be integrated, at least in part, in a common control with display 100 and/or may share components with the display. In addition, the status of these systems and/or the devices controlled thereby may be displayed on the display.

Although the present invention has been described above with respect to an inside rearview mirror assembly, it will be appreciated by those skilled in the art that the display device 100 and/or any of the other components mounted above, may be mounted in an outside rearview mirror assembly or even in some other location such as an overhead console, a mini-console on the windshield, or an instrument panel.

Various features are described above. It is contemplated that any one or more of these features may be used in combination with any others so long as it is not physically impossible to do so.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. A rearview assembly for a vehicle comprising:
   a mirror element having a partially reflective, partially transmissive coating;
   a video display having a plurality of pixels and positioned behind said mirror element such that a display image is directly viewable through said partially reflective, partially transmissive coating, said video display having an output intensity such that the viewable display image has an intensity of at least 250 cd/m2;
   a depolarizing device formed using an polycarbonate positioned between the video display and the mirror element;
   at least one polarizing device positioned between a light emitting diode (LED) backlight assembly and the depolarizing device for increasing an on-axis brightness of the video display;
   a diffuser spaced from an plurality of LED devices mounted to a substrate of the LED backlight assembly such that light from said plurality of LED devices is refracted through said diffuser and reflected back towards said substrate;
   a reflector provided over said substrate and around and between said plurality of LED devices so that at least one LED device is aligned with an optic formed using a plurality of reflectors;
   wherein light reflected back from said diffuser is reflected by said optic towards said diffuser; and
   a baffle positioned between at least one segmented area of the diffuser for separating areas associated with the at least one LED device from areas associated with other LED devices that are not energized.

2. The rearview assembly of claim 1, wherein said partially reflective, partially transmissive coating has a reflectance of at least 45 percent.

3. The rearview assembly of claim 2, wherein said intensity of the viewable display image is at least 750 cd/m2.

4. The rearview assembly of claim 2, wherein said intensity of the viewable display image is at least 1000 cd/m2.

5. The rearview assembly of claim 2, wherein said intensity of the viewable display image is at least 1500 cd/m2.

6. The rearview assembly of claim 2, wherein said intensity of the viewable display image is at least 2000 cd/m2.

7. The rearview assembly of claim 2, wherein said intensity of the viewable display image is at least 2750 cd/m2.

8. The rearview assembly of claim 2, wherein said intensity of the viewable display image is at least 3500 cd/m2.

9. The rearview assembly of claim 1, wherein said intensity of the viewable display image is at least 750 cd/m2.

10. The rearview assembly of claim 1, wherein said intensity of the viewable display image is at least 1000 cd/m2.

11. The rearview assembly of claim 1, wherein said intensity of the viewable display image is at least 1500 cd/m2.

12. The rearview assembly of claim 1, wherein said intensity of the viewable display image is at least 2000 cd/m2.

13. The rearview assembly of claim 1, wherein said intensity of the viewable display image is at least 2750 cd/m2.

14. The rearview assembly of claim 1, wherein said intensity of the viewable display image is at least 3500 cd/m2.

15. The rearview assembly of claim 1, wherein said video display comprises at least one liquid crystal display component.

16. The rearview assembly of claim 15, wherein said at least one liquid crystal display component comprises:
   a first substrate component having a front surface and a rear surface; and
   a second substrate component having a front surface and a rear surface, the front surface of said second substrate component and the rear surface of said first substrate component being juxtaposed in spaced relation with a liquid crystalline material component disposed therebetween.

17. The rearview assembly of claim 16, wherein the at least one polarizing device acts as a reflective polarizer and is disposed on a surface of said second substrate component of said at least one liquid crystal display component.

18. A rearview assembly for a vehicle as in claim 1, wherein the at least one polarizing device acts as a reflective polarizer.

19. The rearview assembly of claim 18 further comprising said reflective polarizer is provided on a front surface of said video display.

20. The rearview assembly of claim 19, wherein said reflective polarizer is provided on a rear surface of said mirror element.

21. The rearview assembly of claim 19, wherein said mirror element is an electrochromic mirror element comprising:
   a first substrate having a front surface and a rear surface; and
   a second substrate having a front surface and a rear surface, the front surface of said second substrate and the rear surface of said first substrate being juxtaposed in spaced relation with an electrochromic medium disposed therebetween.

22. The rearview assembly of claim 21, wherein said reflective polarizer is provided on the rear surface of said second substrate of said electrochromic mirror element.

23. The rearview assembly of claim 21, wherein said reflective polarizer is provided on the front surface of said second substrate of said electrochromic mirror element.

24. The rearview assembly of claim 21, wherein said reflective polarizer is disposed on one of the surfaces of said second substrate of said electrochromic mirror element.

25. The rearview assembly of claim 1, wherein said mirror element is an electrochromic mirror element.

26. A rearview assembly for a vehicle as in claim 1, wherein the LED backlight assembly is comprised of a first subassembly on a first circuit board and a second subassembly on a second circuit board.

27. A rearview assembly for a vehicle as in claim 26, wherein the first subassembly is comprised of the plurality of LED devices and the second subassembly is comprised of a driver.

28. A rearview assembly as in claim 1, wherein the plurality of reflectors of the optic are concentric reflectors, each having a substantially conic surface.

29. A rearview assembly as in claim 1, wherein the plurality of reflectors of the optic are concentric reflectors configured to reduce the light intensity at their center for creating a uniformly lit appearance across the diffuser.

30. A rearview assembly as in claim 1, wherein light rays reflected by the reflector are directed to a refracting portion of the diffuser.

31. A rearview assembly as in claim 1, wherein the plurality of reflectors of the optic are concentric reflectors and wherein the LED devices are mounted to the substrate in a predetermined pattern such that the plurality of concentric reflectors are arranged in the predetermined pattern.

32. A rearview assembly as in claim 1, wherein said reflector includes a sidewall configured to support the diffuser, such that a top edge of the diffuser supports the diffuser, and the sidewall is reflective.

33. A rearview assembly as in claim 1, wherein said diffuser includes at least one deviator portion for directing light rays emitted off an optical axis of the at least one LED device to a predetermined portion of said diffuser.

34. A rearview assembly as in claim 1, wherein light passing through said diffuser is reflected and/or refracted non-parallel to an optical axis, and light that is reflected off of the diffuser is redirected towards and reflected off of said reflector and continues through said diffuser.

35. A display comprising:
a display device having a plurality of pixels for generating a polarized display image that is directly viewable;
a depolarizing device formed using an polycarbonate positioned between the display device and a mirror element;
at least one polarizing device positioned between a light emitting diode (LED) backlight assembly and the depolarizing device for increasing an on-axis brightness of the display device;
a diffuser spaced from an plurality of LED devices mounted to a substrate of the LED backlight assembly such that light from said plurality of LED devices is refracted through said diffuser and reflected back towards said substrate;
a reflector provided over said substrate and around and between said plurality of LED devices so that at least one LED device is aligned with an optic formed using a plurality of reflectors and light reflected back from said diffuser is reflected by said optic towards said diffuser;
wherein the reflector includes a sidewall configured to support the diffuser; and
a baffle positioned between at least one segmented area of the diffuser for separating areas associated with the at least one LED device from areas associated with other LED devices that are not energized.

36. The display of claim 35, wherein said display device comprises a liquid crystal display.

37. The display of claim 35, wherein said polycarbonate is provided on a front surface of said display device.

38. The display as in claim 35, wherein the at least one polarizing device acts as a reflective polarizer.

39. A display as in claim 35, further comprising at least one brightness enhancement film for increasing the brightness of the display in at least one plane.

40. A display as in claim 39, wherein the at least one plane includes a first plane that is substantially vertical and a second plane is substantially horizontal.

41. A display as in claim 35, wherein the LED backlight assembly is comprised of a first subassembly on a first circuit board and a second subassembly on a second circuit board.

42. A display as in claim 41, wherein the first subassembly comprises the plurality of LED devices and the second subassembly comprises a driver.

43. A display as in claim 35, wherein the plurality of reflectors of the optic are concentric reflectors, each having a substantially conic surface.

44. A display as in claim 35, wherein the plurality of reflectors of the optic are concentric reflectors configured to reduce the light intensity at their center for creating a uniformly lit appearance across the diffuser.

45. A display as in claim 35, wherein light rays reflected by the reflector are directed to a refracting portion of the diffuser.

46. A display as in claim 35, wherein the LED devices are mounted to the substrate in a predetermined pattern such that the plurality of concentric reflectors are arranged in the predetermined pattern.

47. A rearview assembly for a vehicle comprising:
a housing;
a video display having a plurality of pixels and positioned in said housing for generating a polarized display image;
a depolarizing device positioned in front of said video display for depolarizing the polarized display image;
at least one polarizing device positioned between a light emitting diode (LED) backlight assembly and the depolarizing device for increasing an on-axis brightness of the display device;
at least one brightness enhancement film for increasing the brightness of the display in at least one plane;
a substrate having a plurality of LED devices mounted thereto in a predetermined pattern;
a diffuser spaced from said plurality of LED devices mounted to said substrate such that light from said plurality of LED devices is refracted through said diffuser and reflected back towards said substrate;
a reflector provided over said substrate and around and between said plurality of LED devices so that at least one LED device is aligned with an optic formed using a plurality of reflectors;
wherein light reflected back from said diffuser is reflected by said optic towards said diffuser; and
a baffle positioned between at least one segmented area of the diffuser for separating areas associated with the at least one LED device from areas associated with other LED devices that are not energized.

48. A rearview assembly for a vehicle as in claim 47, wherein the at least one plane includes a first plane that is substantially vertical and the second plane is substantially horizontal.

49. A rearview assembly as in claim 47, wherein the at least one plane includes a first plane that is substantially vertical and a second plane is substantially horizontal.

50. A rearview assembly for a vehicle as in claim 47, wherein the LED backlight assembly is comprised of a first subassembly on a first circuit board and a second subassembly on a second circuit board.

51. A display as in claim 50, wherein the first subassembly comprises the plurality of LED devices and the second subassembly comprises a driver.

52. A rearview assembly as in claim 47, wherein the plurality of reflectors of the optic are concentric reflectors, each having a substantially conic surface.

53. A rearview assembly as in claim 47, wherein the plurality of reflectors of the optic are concentric reflectors configured to reduce the light intensity at their center for creating a uniformly lit appearance across the diffuser.

54. A rearview assembly as in claim 47, wherein light rays reflected by the reflector are directed to a refracting portion of the diffuser.

55. A rearview assembly as in claim 47, wherein the LED devices are mounted to the substrate in a predetermined pattern such that the plurality of concentric reflectors are arranged in the predetermined pattern.

* * * * *

UNITED STATES PATENT AND TRADEMARK OFFICE
CERTIFICATE OF CORRECTION

PATENT NO. : 8,339,526 B2
APPLICATION NO. : 11/684366
DATED : December 25, 2012
INVENTOR(S) : Danny L. Minikey, Jr. et al.

It is certified that error appears in the above-identified patent and that said Letters Patent is hereby corrected as shown below:

In the Claims:

Column 39
Claim 1, line 34, "cd/m2" should be --$cd/m^2$--.
Claim 1, line 42, "an" should be --a--.
Claim 3, line 61, "cd/m2" should be --$cd/m^2$--.
Claim 4, line 63, "cd/m2" should be --$cd/m^2$--.
Claim 5, line 65, "cd/m2" should be --$cd/m^2$--.
Claim 6, line 67, "cd/m2" should be --$cd/m^2$--.

Column 40
Claim 7, line 2, "cd/m2" should be --$cd/m^2$--.
Claim 8, line 4, "cd/m2" should be --$cd/m^2$--.
Claim 9, line 6, "cd/m2" should be --$cd/m^2$--.
Claim 10, line 8, "cd/m2" should be --$cd/m^2$--.
Claim 11, line 10, "cd/m2" should be --$cd/m^2$--.
Claim 12, line 12, "cd/m2" should be --$cd/m^2$--.
Claim 13, line 14, "cd/m2" should be --$cd/m^2$--.
Claim 14, line 16, "cd/m2" should be --$cd/m^2$--.

Column 41
Claim 35, line 43, "an" should be --a--.

Signed and Sealed this
Twenty-sixth Day of November, 2013

Margaret A. Focarino
*Commissioner for Patents of the United States Patent and Trademark Office*